US011241005B2

(12) United States Patent
Ellsworth

(10) Patent No.: US 11,241,005 B2
(45) Date of Patent: Feb. 8, 2022

(54) CROP SPRAYING VEHICLE

(71) Applicant: Mark S. Ellsworth, Tempe, AZ (US)

(72) Inventor: Mark S. Ellsworth, Tempe, AZ (US)

( * ) Notice: Subject to any disclaimer, the term of this patent is extended or adjusted under 35 U.S.C. 154(b) by 141 days.

(21) Appl. No.: 15/582,020

(22) Filed: Apr. 28, 2017

(65) Prior Publication Data
US 2020/0205393 A1 Jul. 2, 2020

(51) Int. Cl.
*A01M 7/00* (2006.01)
*B05B 1/20* (2006.01)

(52) U.S. Cl.
CPC .............. *A01M 7/0075* (2013.01); *B05B 1/20* (2013.01)

(58) Field of Classification Search
CPC .. A01M 7/005; A01M 7/0063; A01M 7/0057; A01M 7/0071; A01M 7/0075; A01M 7/0078; A01M 7/0053; B05B 1/20; B66F 11/044
See application file for complete search history.

(56) References Cited

U.S. PATENT DOCUMENTS

| | | | | |
|---|---|---|---|---|
| 4,561,591 A | * | 12/1985 | Ballu | A01M 7/0053 239/159 |
| 4,880,160 A | * | 11/1989 | Patterson | A01M 7/0053 239/167 |
| 6,131,821 A | * | 10/2000 | Nejsum | A01M 7/0053 239/168 |
| 9,049,854 B2 | * | 6/2015 | Ellsworth | A01M 7/0053 |
| 9,090,140 B2 | * | 7/2015 | Ballu | B60G 9/022 |
| 2002/0020760 A1 | * | 2/2002 | Beggs | A01M 7/0071 239/166 |
| 2007/0289298 A1 | * | 12/2007 | Thompson | E02F 9/2217 60/469 |

* cited by examiner

*Primary Examiner* — Alex M Valvis
(74) *Attorney, Agent, or Firm* — Schmeiser, Olsen & Watts LLP

(57) ABSTRACT

A self-leveling crop spraying apparatus is carried by a prime mover. The crop spraying apparatus includes first and second masts, and first and second opposed pendulum arm frame members slidingly engaged to the first and second masts. A pendulum arm extends through the first and second opposed pendulum arm frame members. The first and second pendulum assemblies are coupled to opposed ends of the pendulum arm, and a carriage assembly is carried by the first and second pendulum assemblies. The carriage assembly is rotatable relative to the first and second masts and first and second opposed pendulum arm frame members.

10 Claims, 52 Drawing Sheets

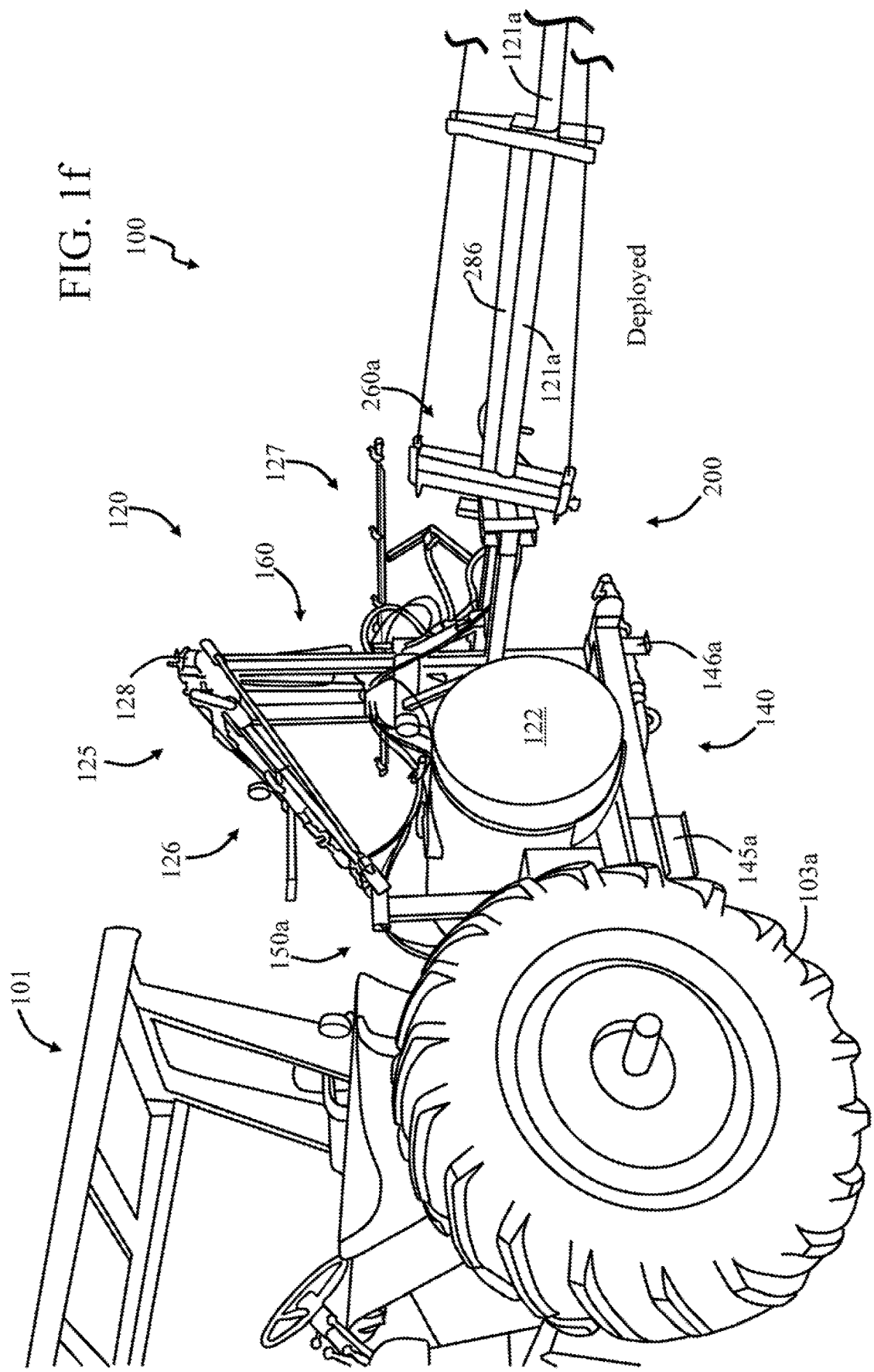

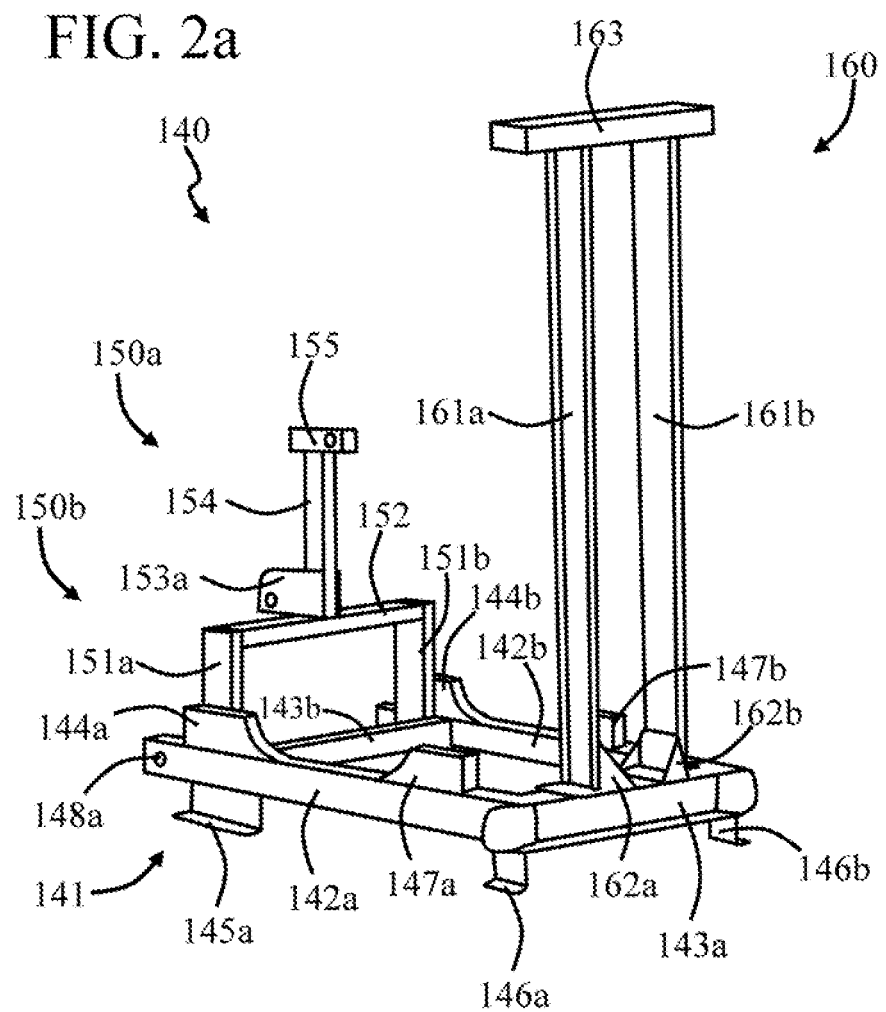

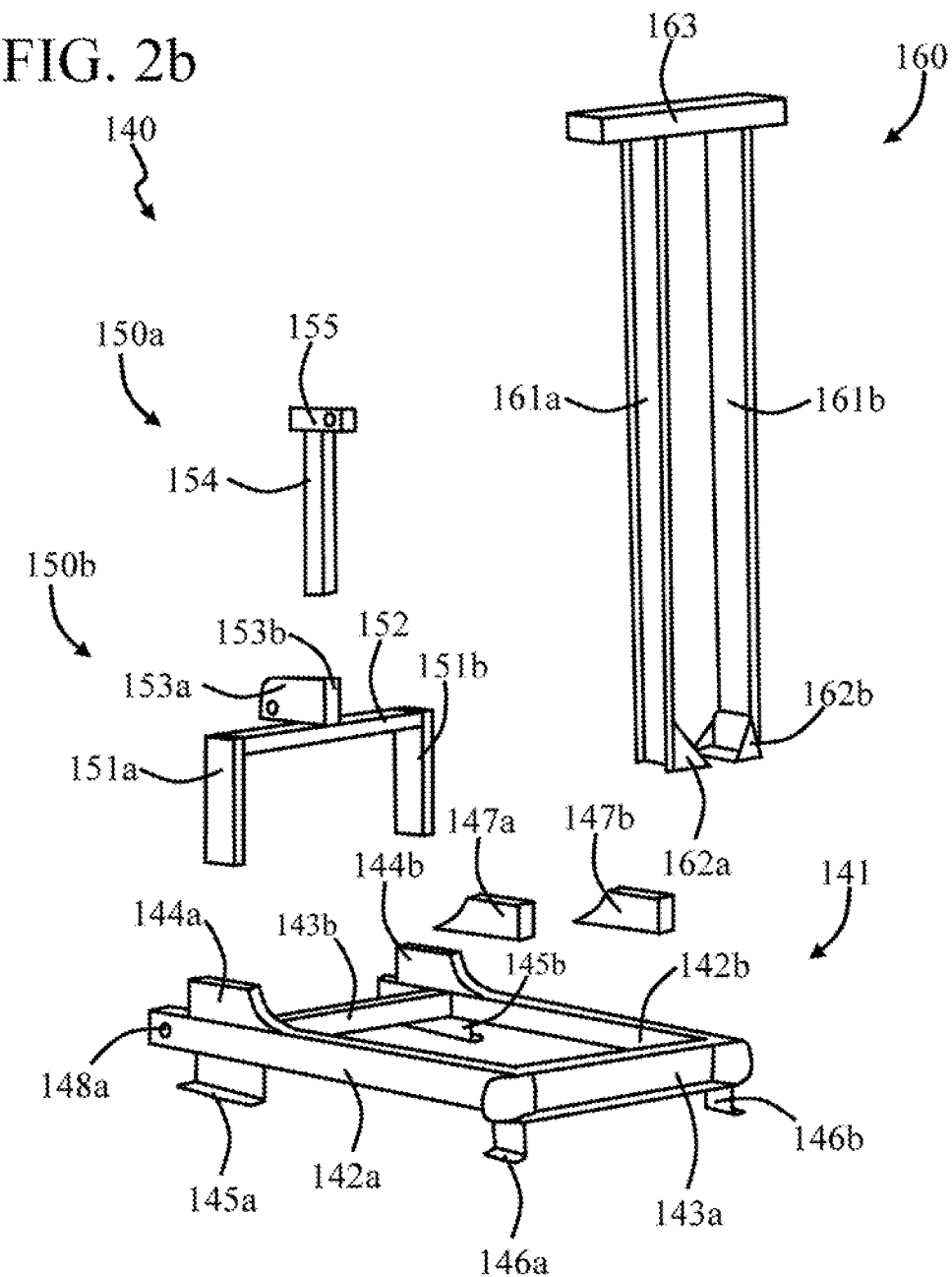

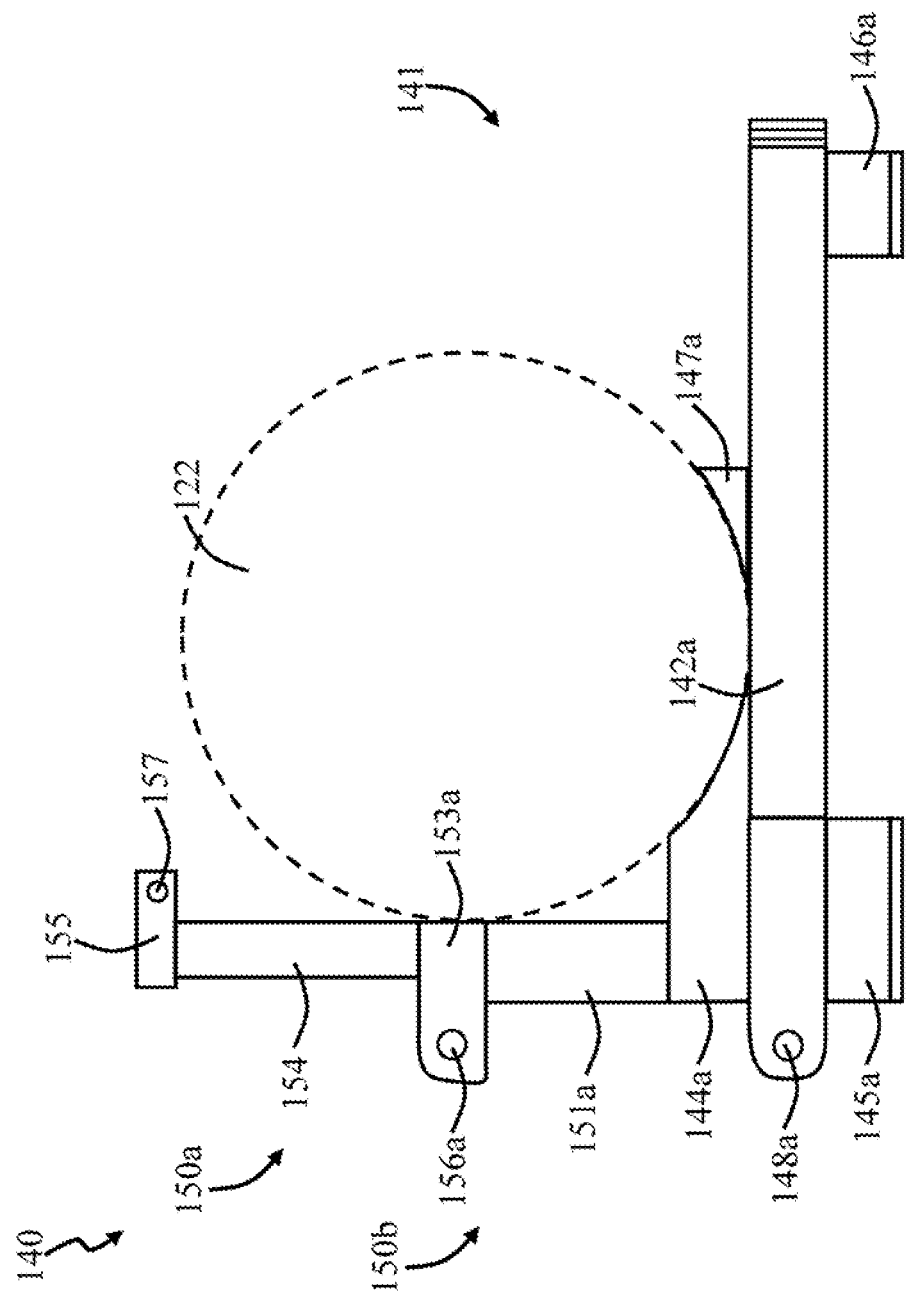

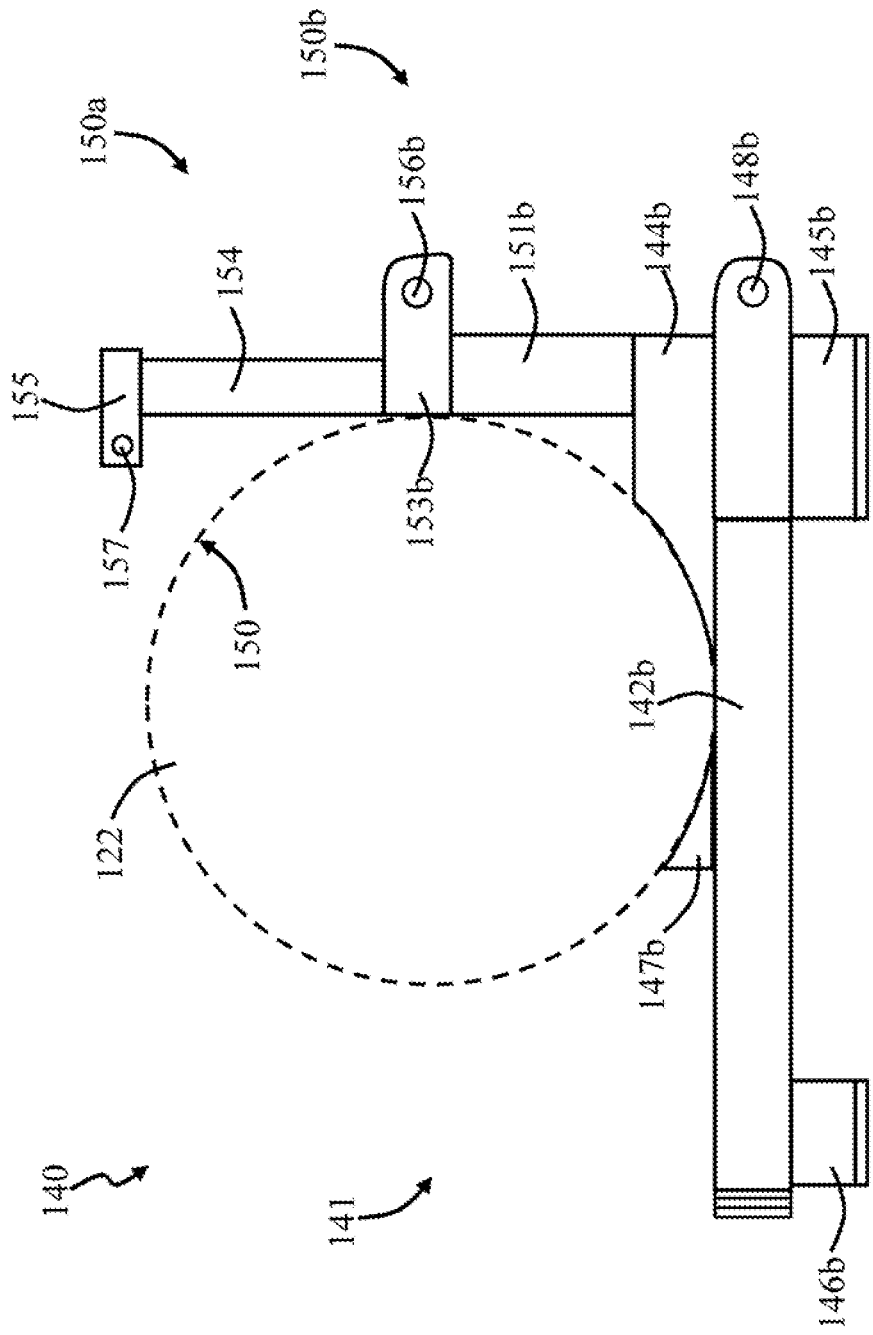

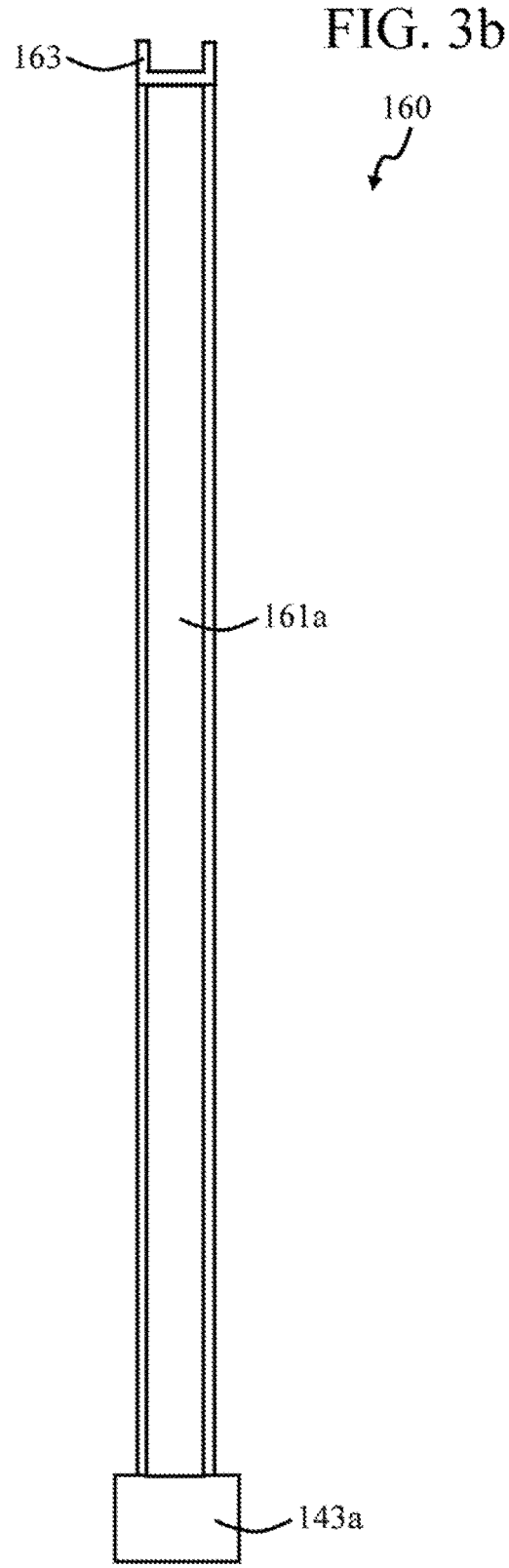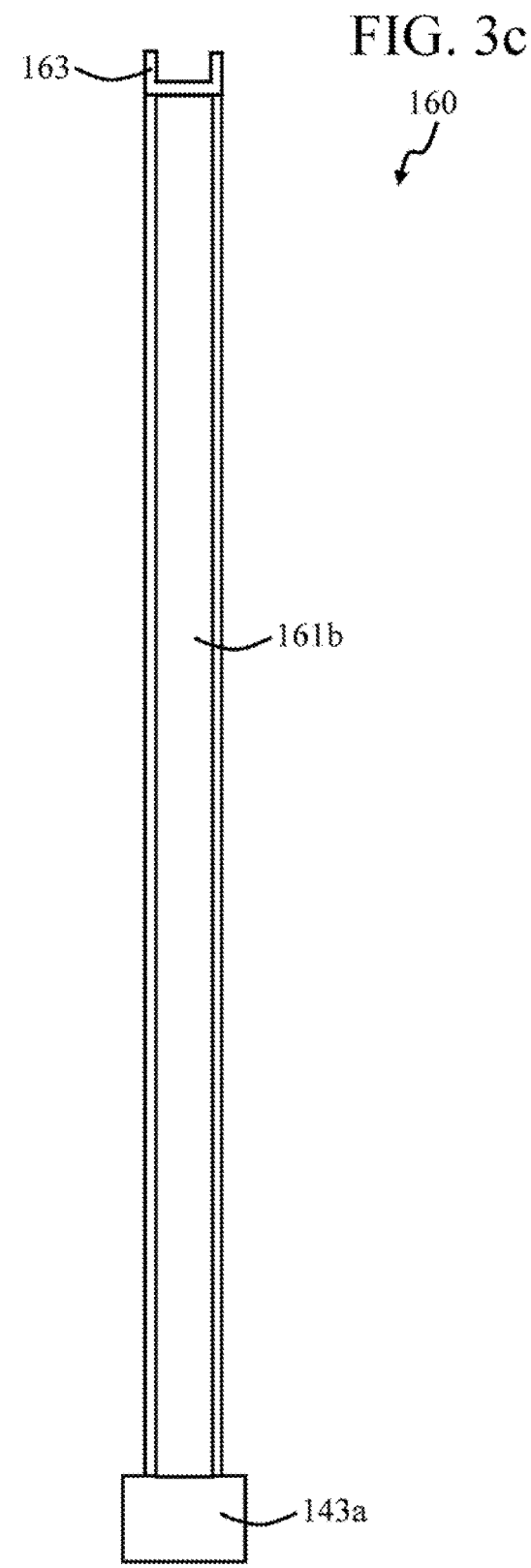

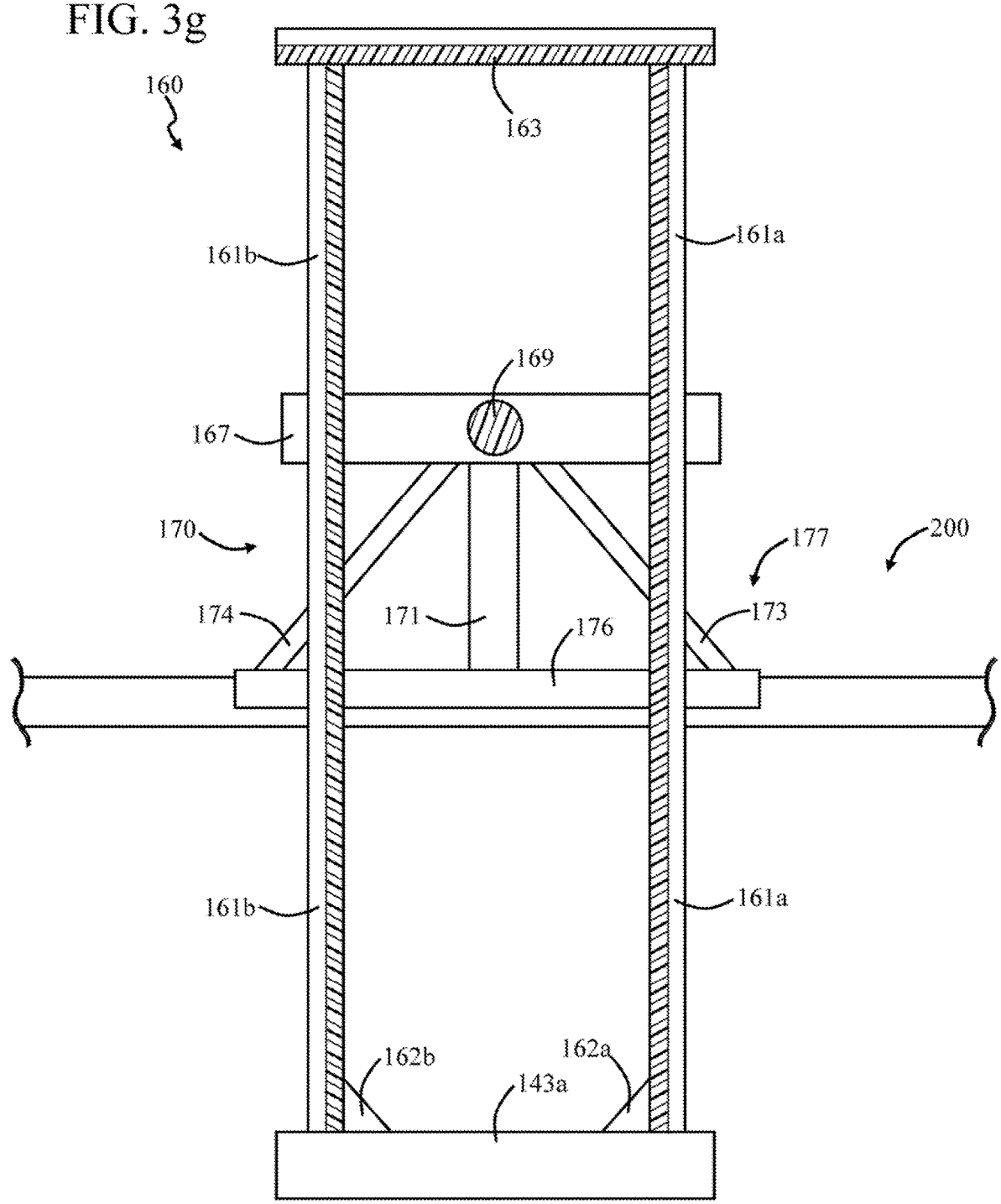

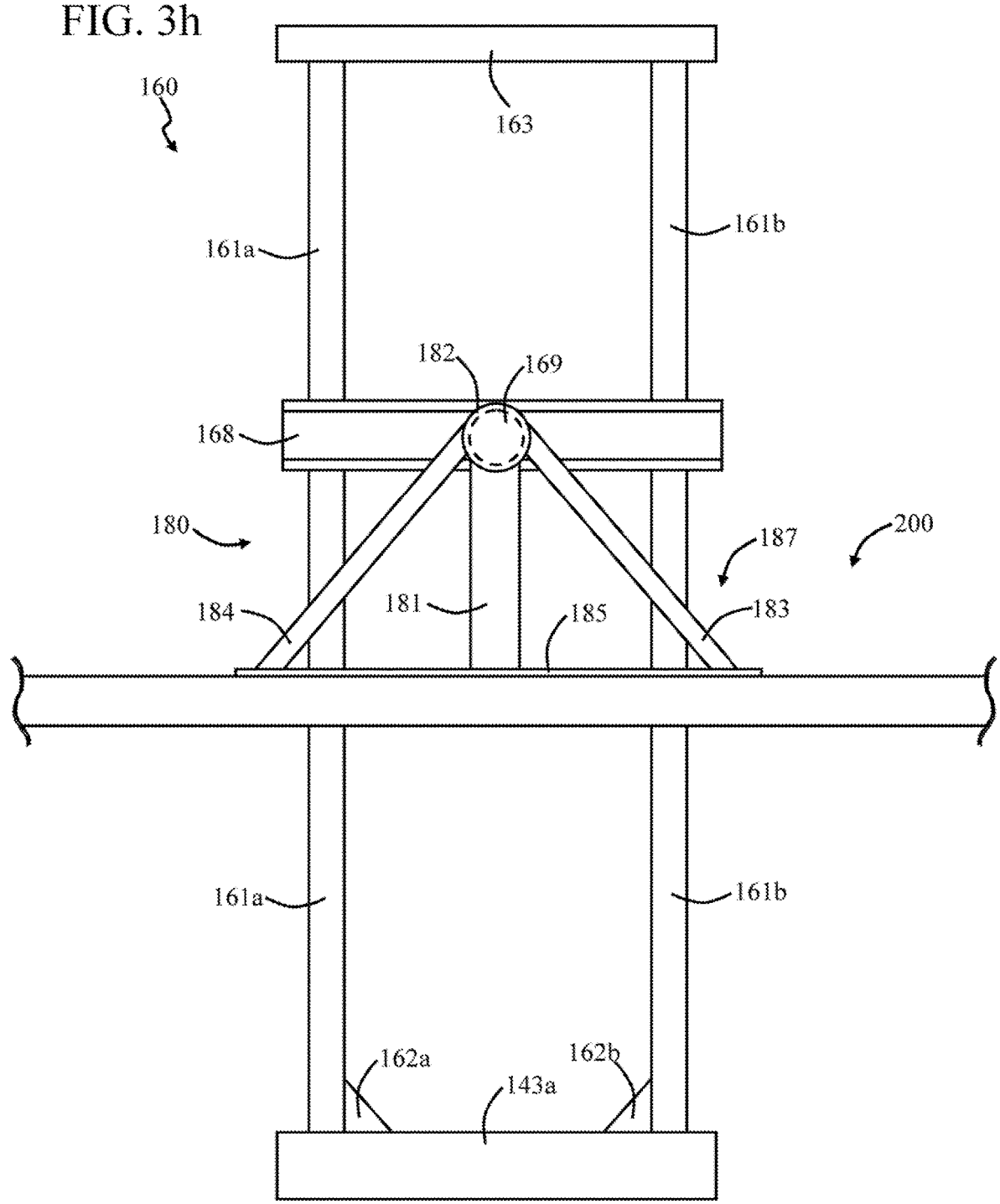

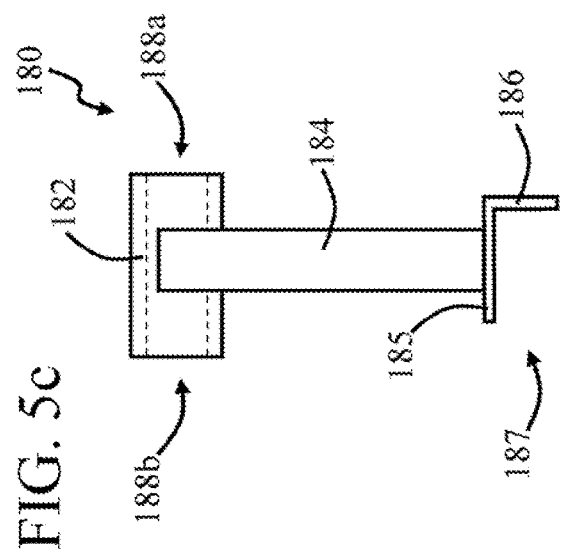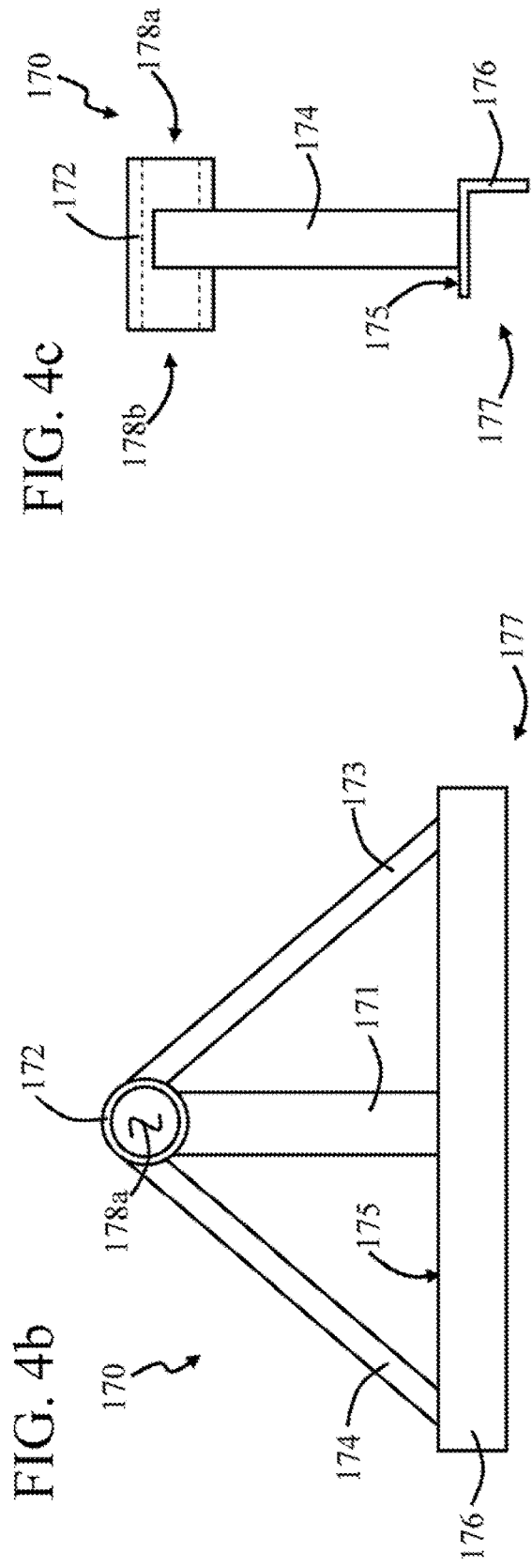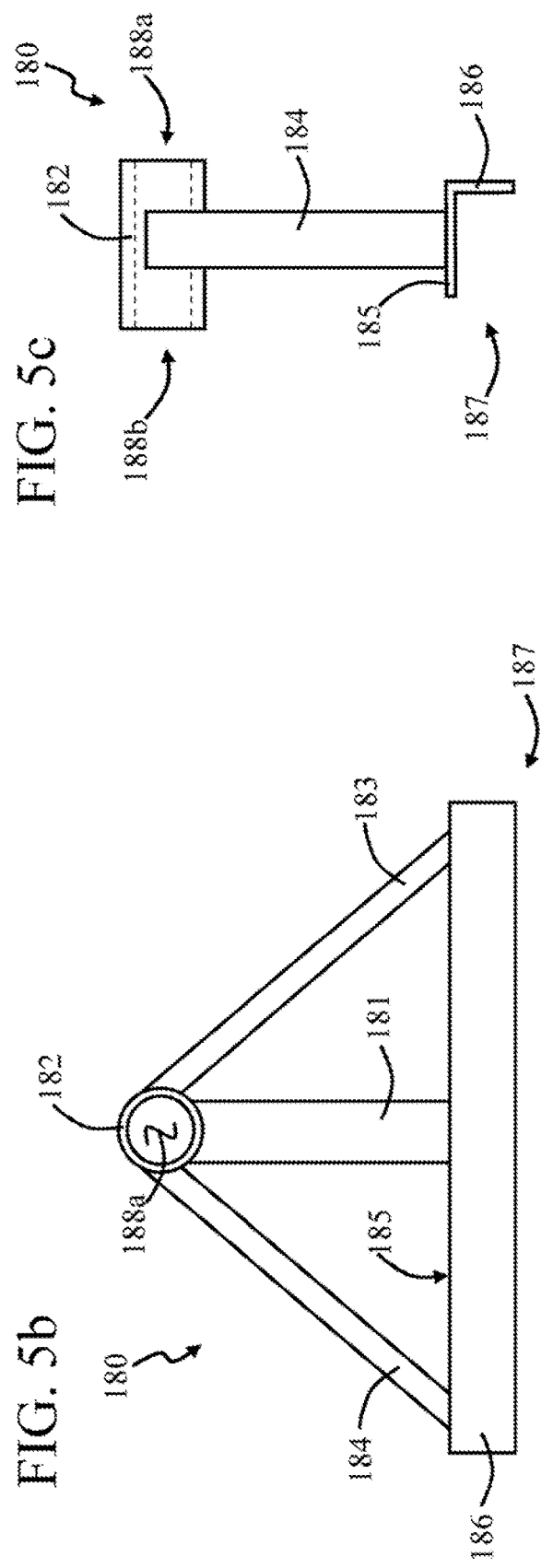

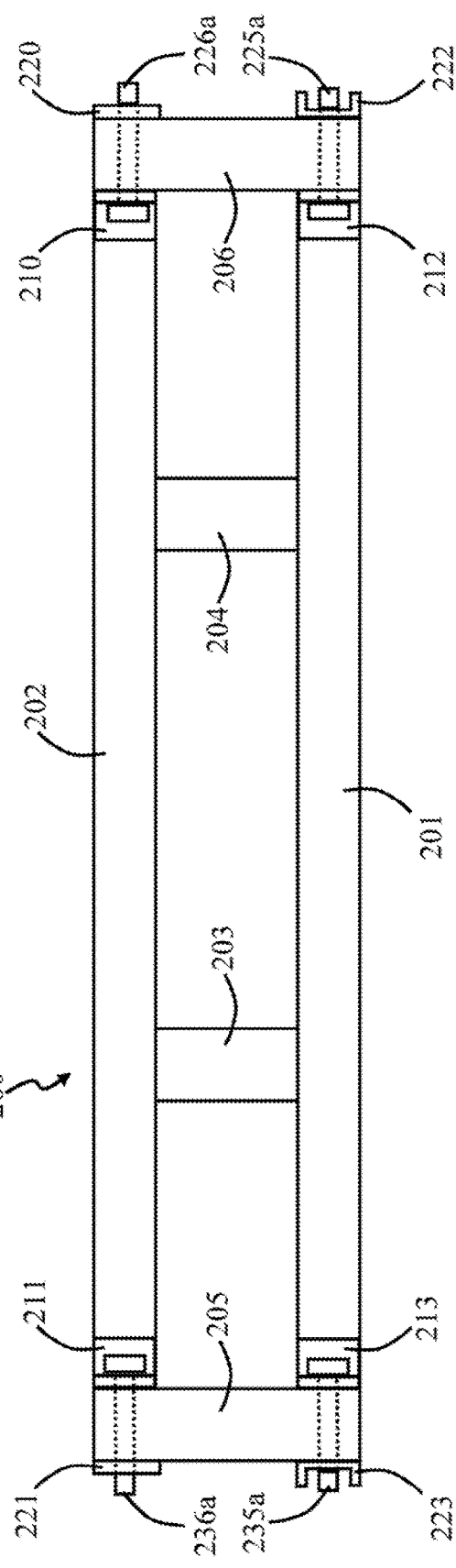
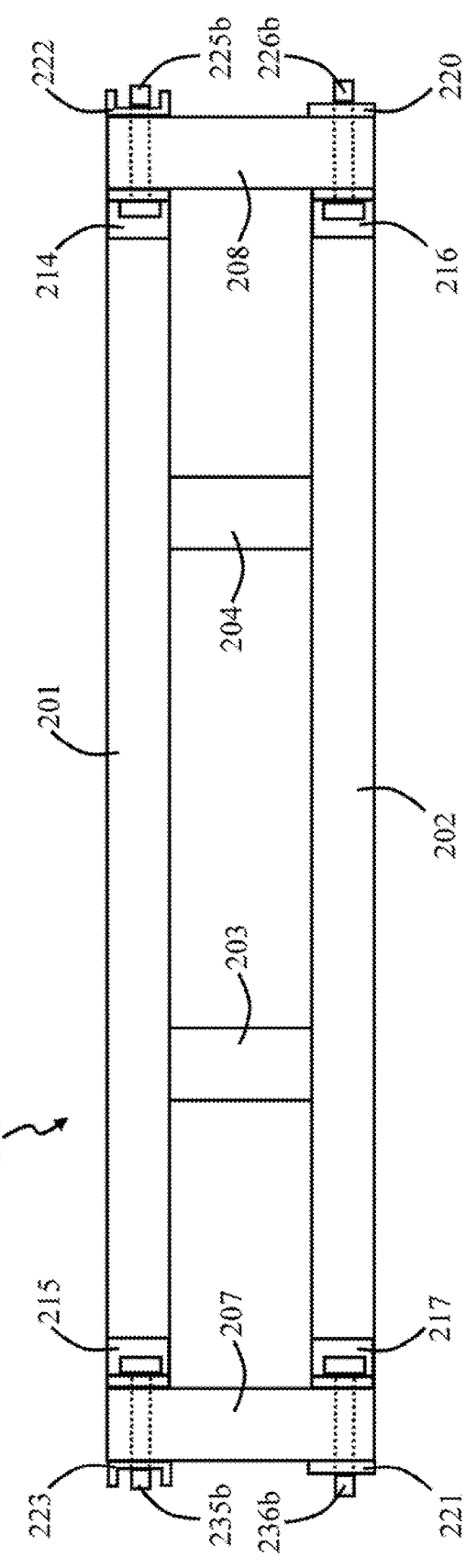
FIG. 6a
FIG. 6b

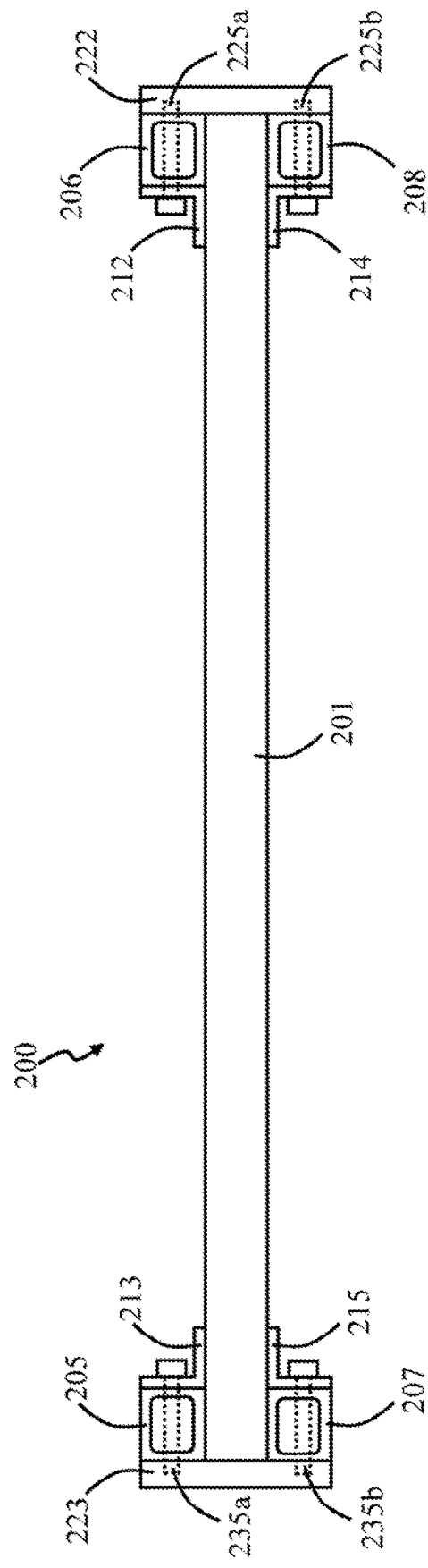
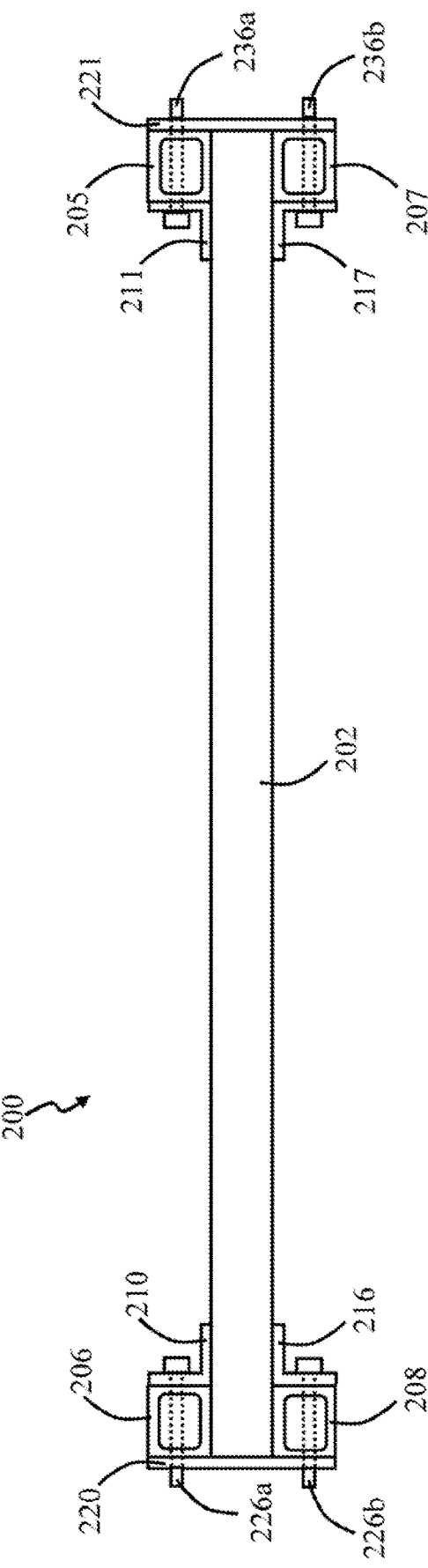

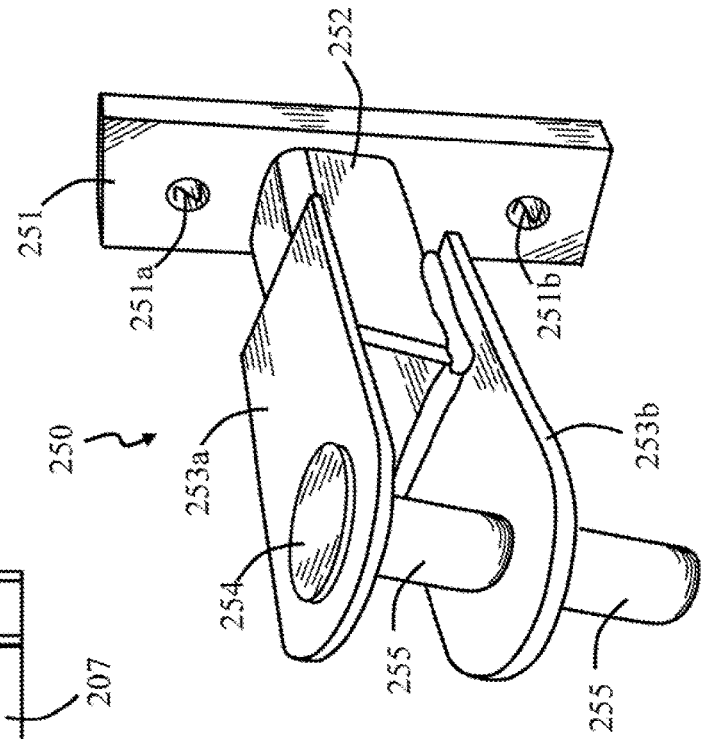
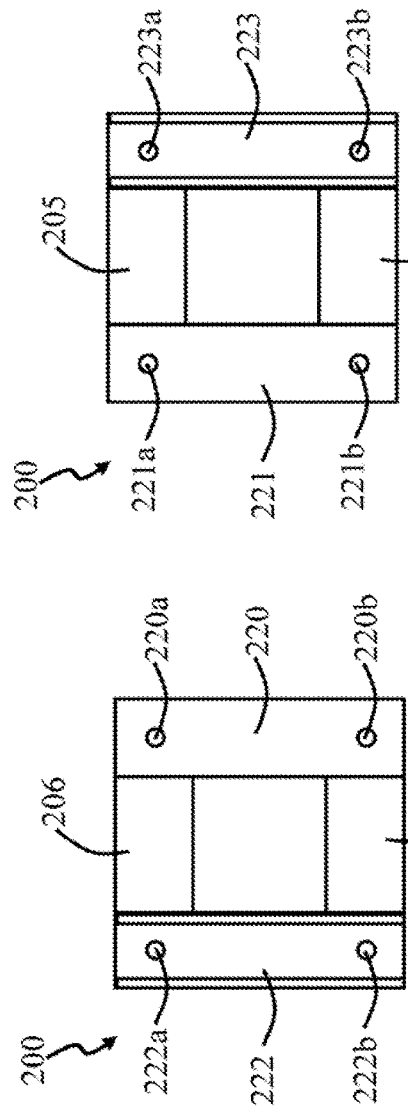
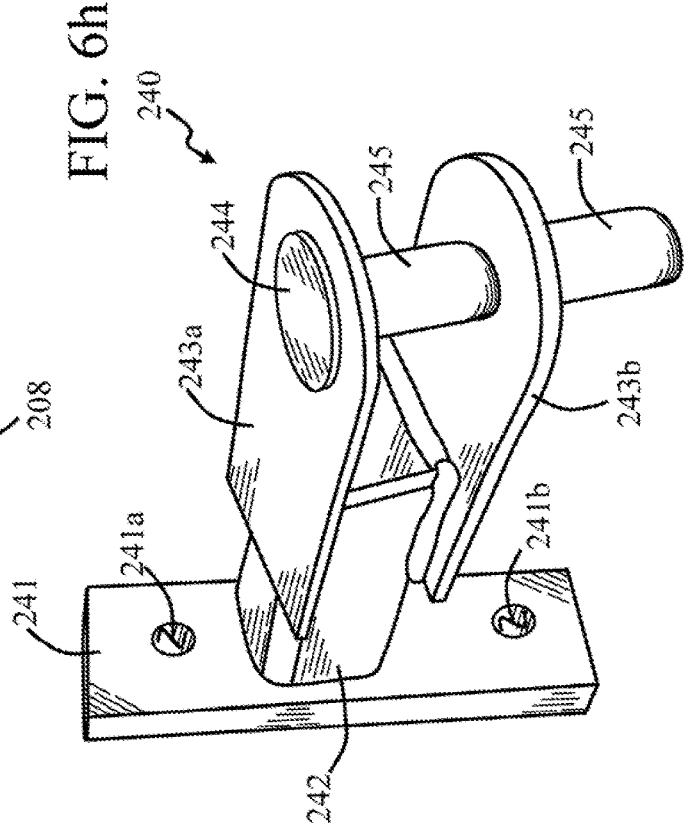

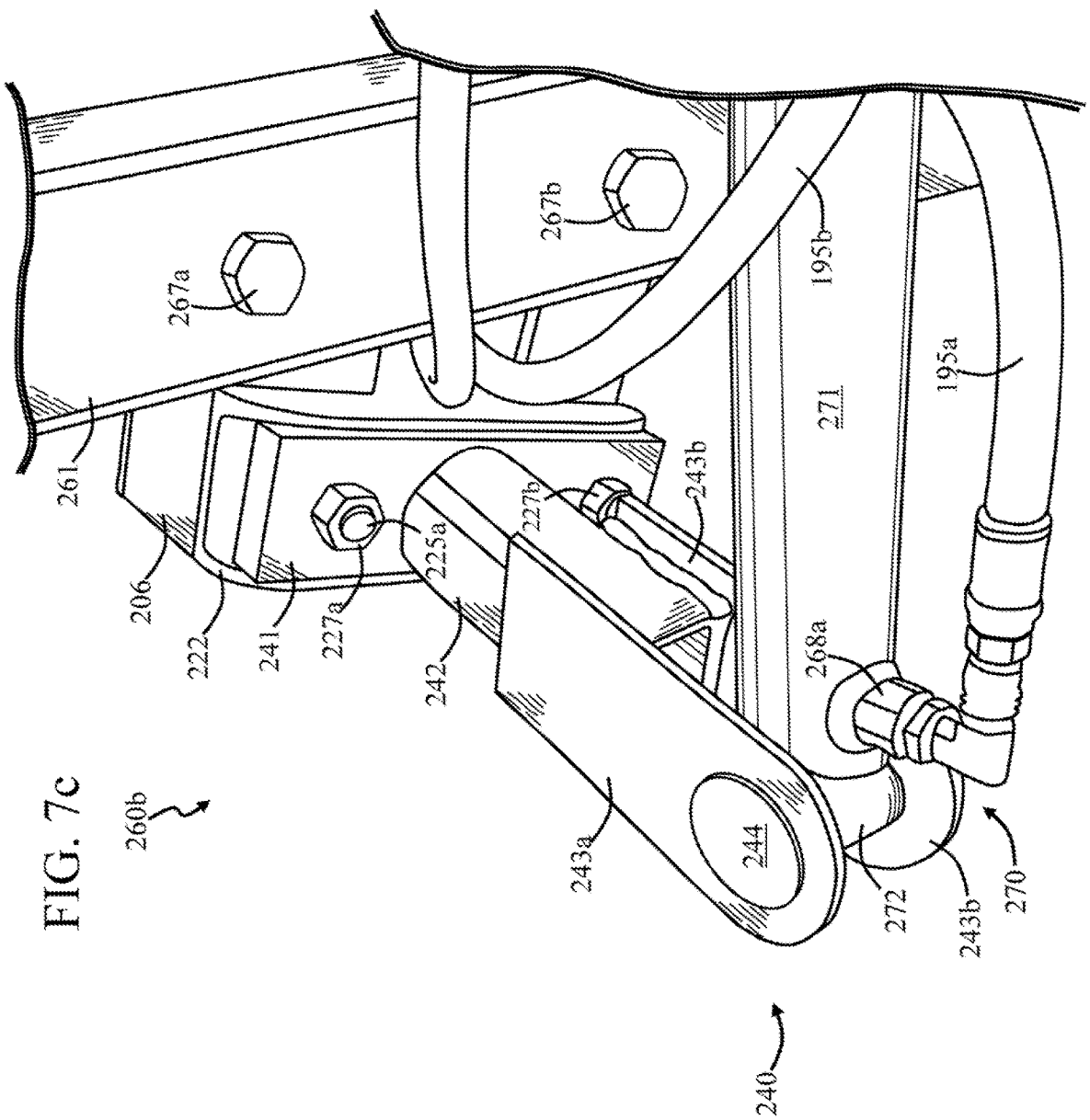

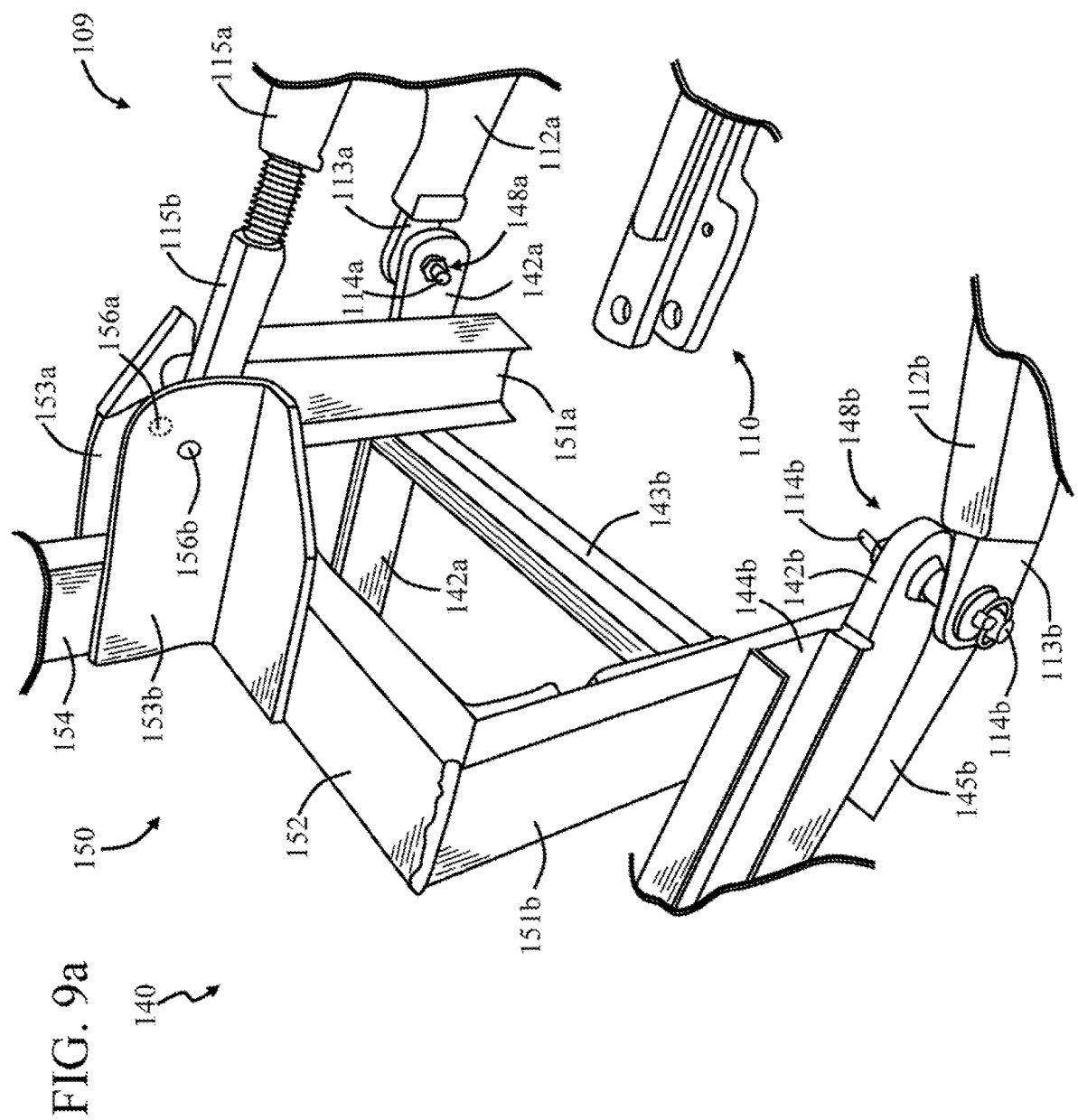

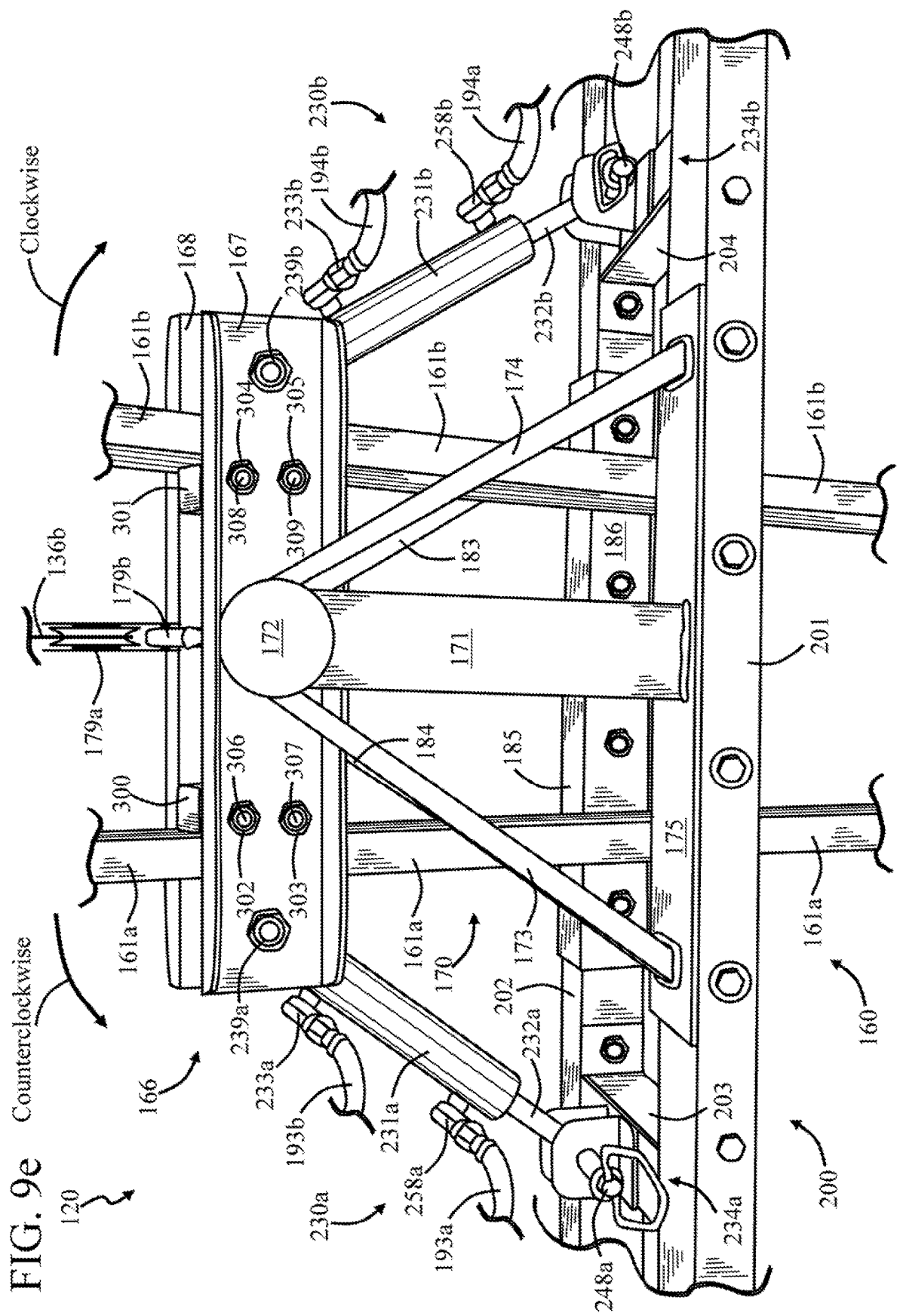

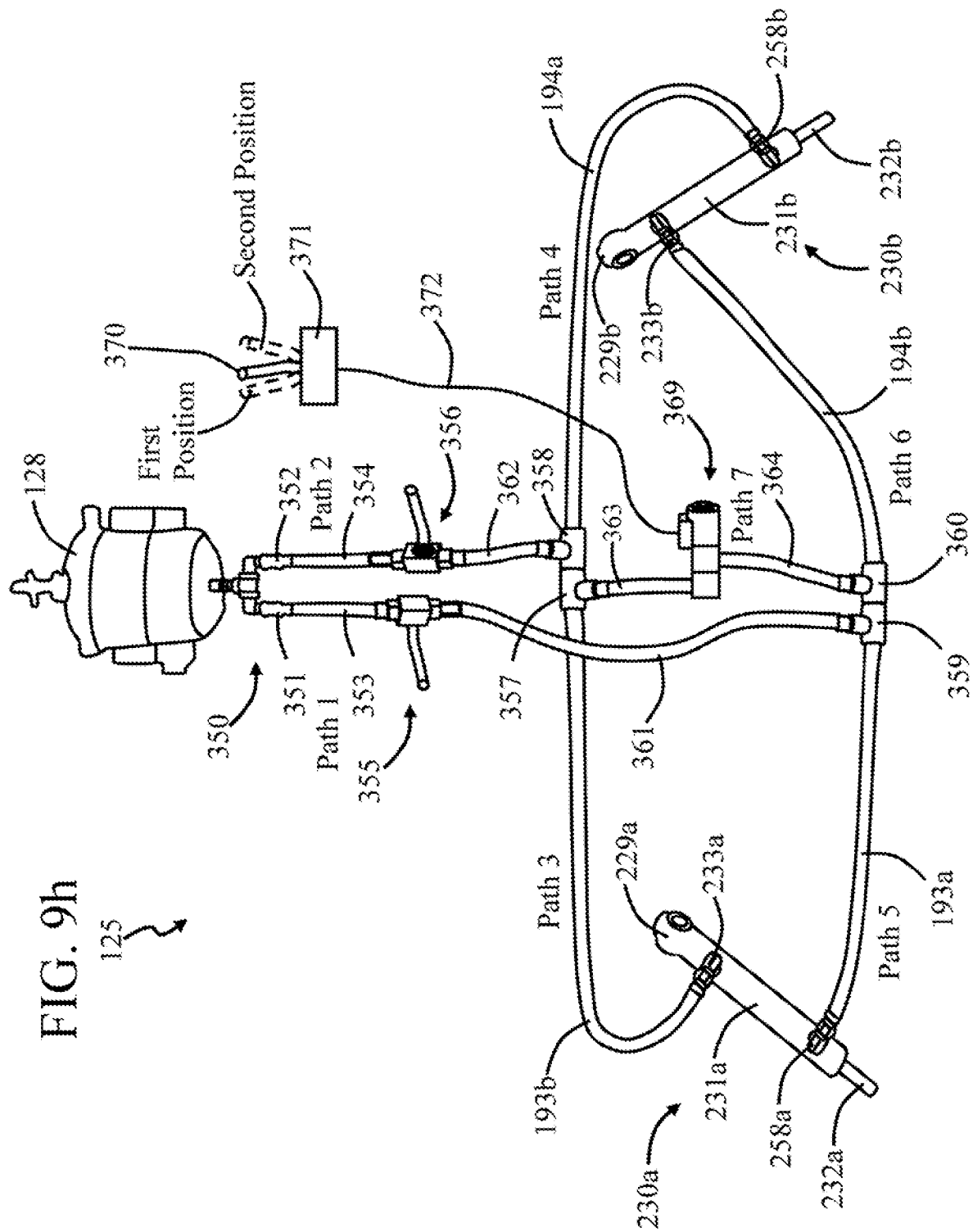

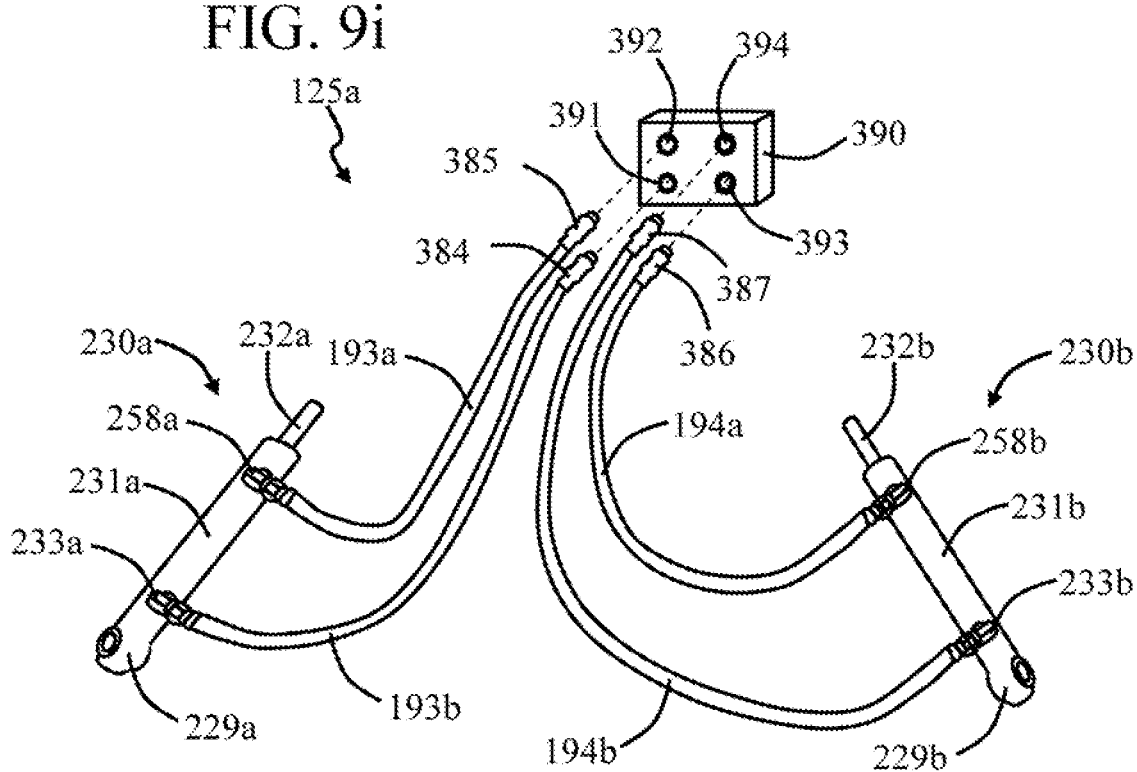
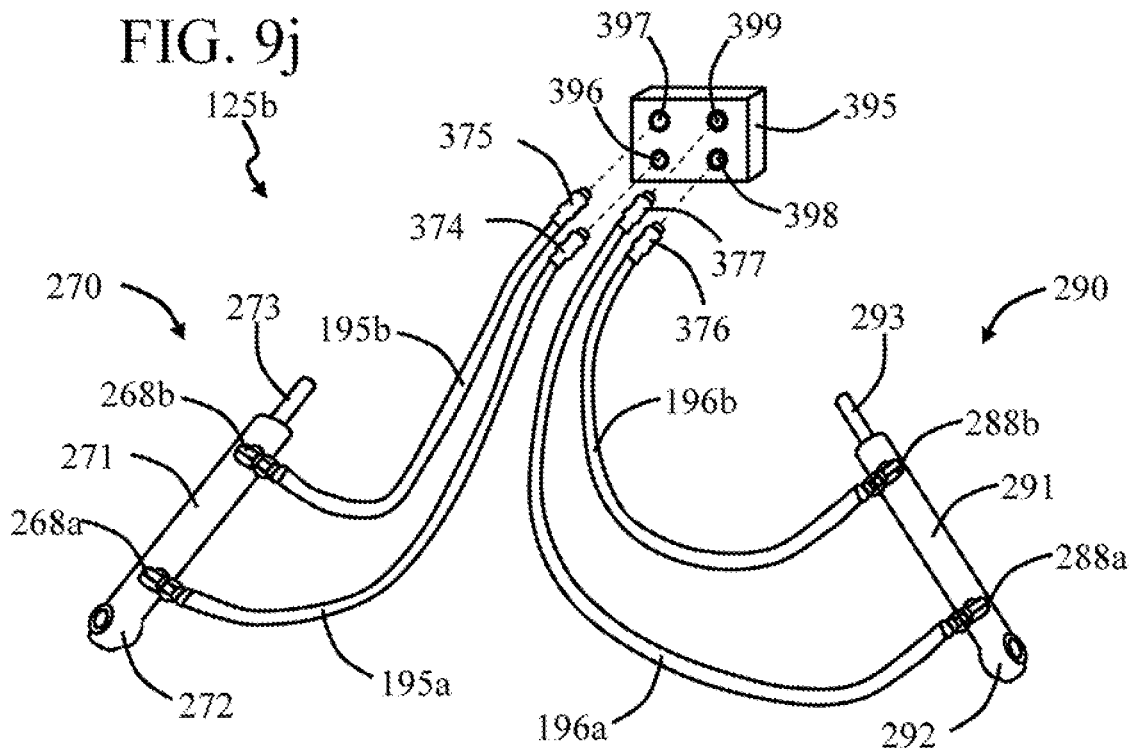

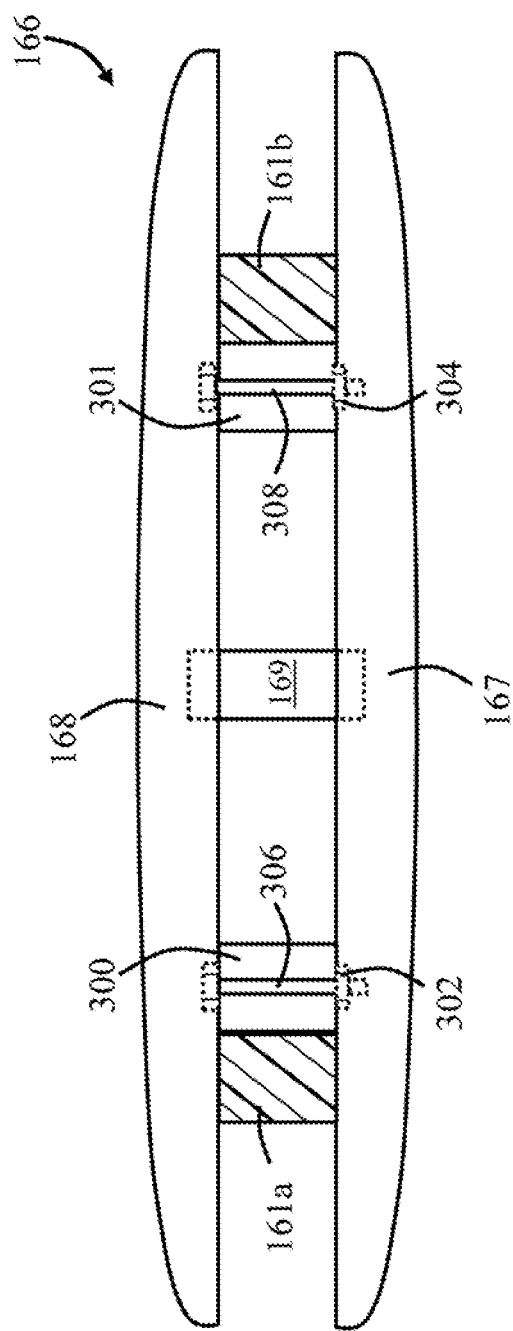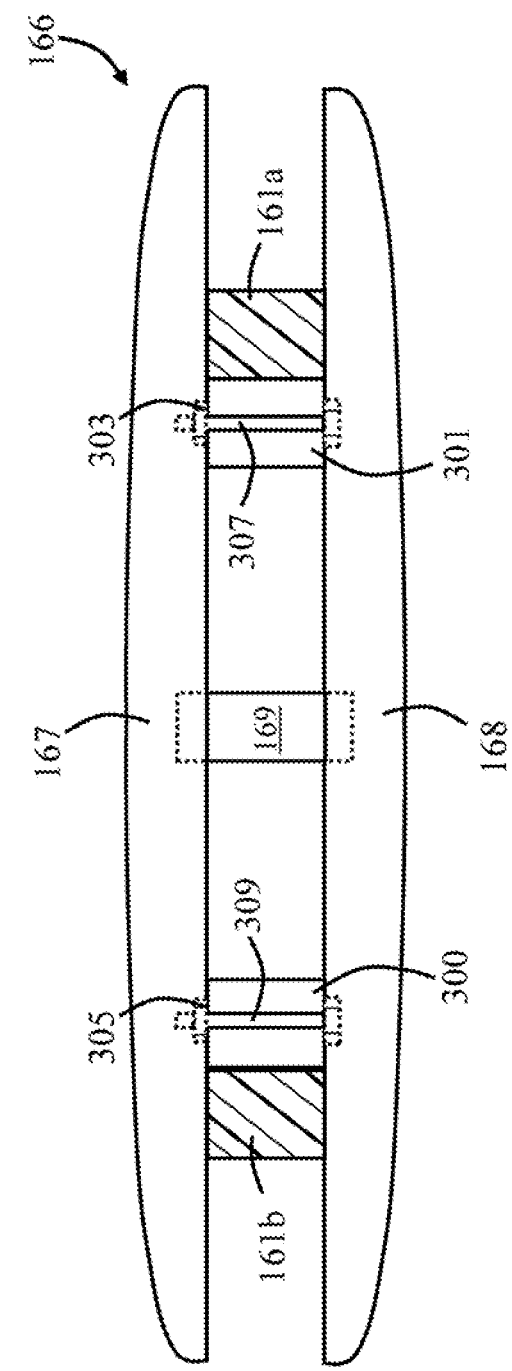

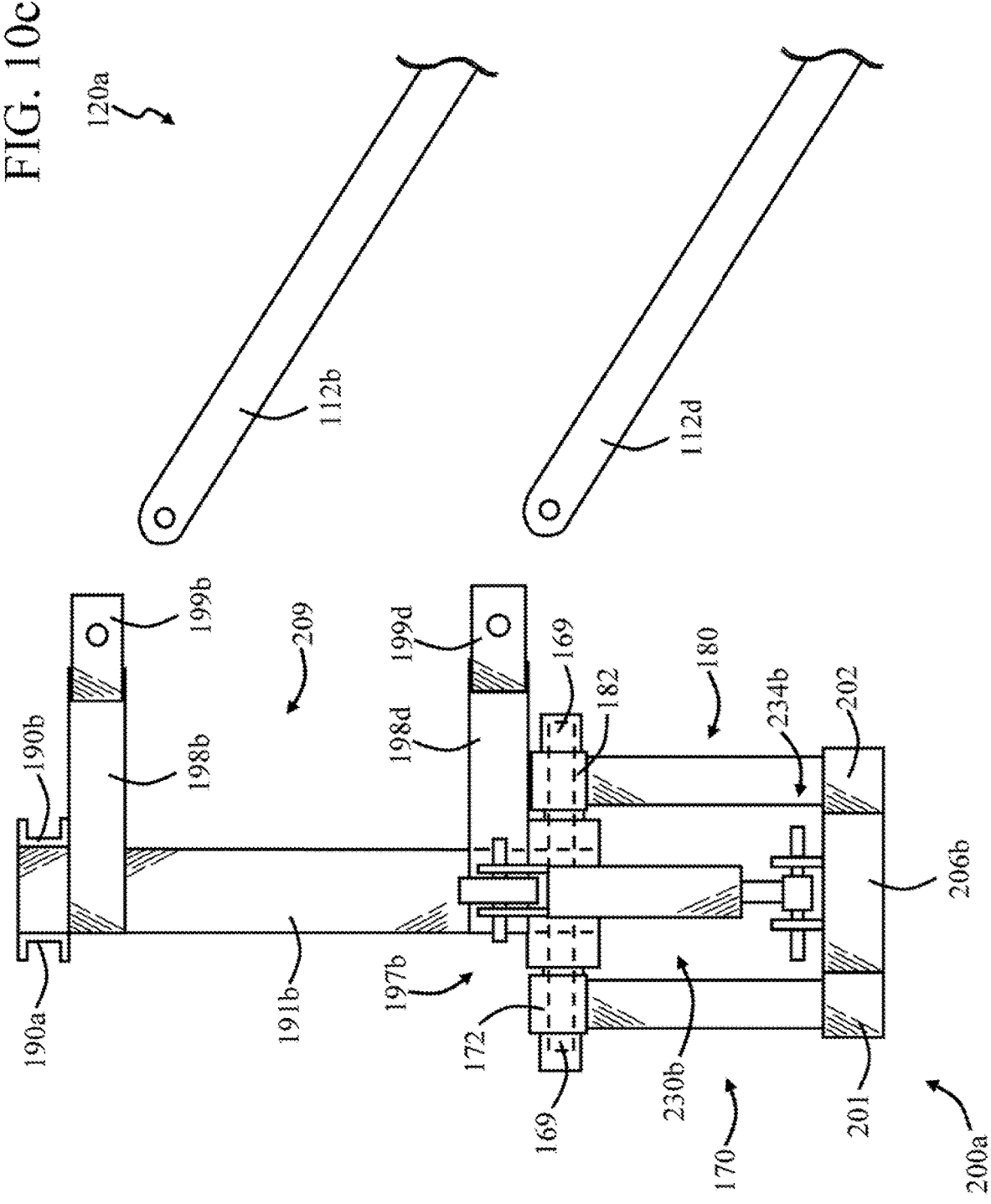

CROP SPRAYING VEHICLE

BACKGROUND OF THE INVENTION

Field of the Invention

This invention relates generally to a crop spraying vehicle which carries a rotatable crop spraying apparatus.

Description of the Related Art

There are many different types of crop spraying vehicles used to spray a field with a chemical. The chemical typically protects the crops from pests, fungi and/or weeds. The chemical is often sprayed as the crop spraying vehicle moves on the field. Crop spraying vehicles typically include a crop spraying apparatus and prime mover, which carries the crop spraying apparatus. The prime mover can be of many different types, such as a tractor.

Examples of crop spraying vehicles include those disclosed in U.S. Pat. No. 2,738,226 to Bals, U.S. Pat. No. 3,371,879 to Dijkhof, U.S. Pat. No. 4,200,255 to Schmidt, et al., U.S. Pat. No. 4,221,353 to Kuhn, et al., U.S. Pat. No. 4,561,591 to Ballu, U.S. Pat. No. 4,650,117 to Dudley. U.S. Pat. No. 4,834,249 to Dahl, U.S. Pat. No. 4,880,160 to Patterson, et al., U.S. Pat. No. 5,000,385 to Trusty, et al., U.S. Pat. No. 6,131,821 to Nejsum and U.S. Pat. No. 6,234,407 to Knight, et al., U.S. Design Pat. No. D344,737 appears to show a prime mover capable of carrying a crop spraying apparatus. Another example of a crop spraying vehicle is the SPRACOUPE, which is manufactured by AGCO Corporation.

Some of the crop spraying apparatuses disclosed in the above references include a complicated mechanical assembly which carries opposed booms. The mechanical assemblies allow the opposed booms to rotate relative to the prime mover. A rotatable crop spraying apparatus is useful because the prime mover often moves on uneven terrain, such as a field, and it is useful to level the opposed booms so that the chemical is applied evenly. However, it is desirable to have a simpler crop spraying apparatus.

BRIEF SUMMARY OF THE INVENTION

The present invention employs a self-leveling crop spraying apparatus carried by a prime mover. These and other features, aspects, and advantages of the present invention will become better understood with reference to the following drawings and description.

BRIEF DESCRIPTION OF THE DRAWINGS

It should be noted that like reference characters axe used throughout the several views of the drawings.

FIG. 1f is a left side perspective view of the crop spraying vehicle of FIG. 1a, wherein the crop spraying apparatus in a deployed condition.

FIG. 2a is a rear perspective view of a frame assembly of the crop spraying apparatus of FIGS. 1a-1f, wherein the frame assembly includes a support frame and mast assembly.

FIG. 2b is an exploded rear perspective view of the frame assembly of FIG. 2a.

FIGS. 2c and 2d are opposed side views of the support frame of FIG. 2a.

FIGS. 3b and 3c are opposed side views of the mast assembly of FIG. 3a.

FIG. 3g is a rear cut-away view of the mast assembly of FIG. 3b, taken in a direction along a cut-line 3e-3e of FIG. 3e, showing the rearward pendulum assembly.

FIG. 3h is a front view of the mast assembly of FIG. 3b showing the forward pendulum assembly.

FIG. 4b is a rear side view of the rearward pendulum assembly of FIG. 4a.

FIG. 4c is a side view of the rearward pendulum assembly of FIG. 4a.

FIG. 5b is a rear side view of the forward pendulum assembly of FIG. 5a.

FIG. 5c is a side view of the forward pendulum assembly of FIG. 5a.

FIGS. 6a and 6b are top and bottom views, respectively, of a carriage assembly of the frame assembly of FIGS. 1a-1d.

FIGS. 6c and 6d are opposed side views of the carriage assembly of FIG. 6a.

FIGS. 6e and 6f are opposed end views of the carriage assembly of FIG. 6a.

FIG. 6h is a perspective view of the boom cylinder coupler of FIG. 6g.

FIG. 6j is a perspective view of the boom cylinder coupler of FIG. 6i.

FIG. 7a is a side view of a boom hinge assembly of the crop spraying apparatus of FIG. 1a.

FIG. 7b is a rear perspective view of the boom hinge assembly of FIG. 7a.

FIG. 7c is a front perspective view of the boom hinge assembly of FIG. 7a.

FIG. 7d is an opposed rear perspective view of the boom hinge assembly of FIG. 7a.

FIG. 8a is a side view of an opposed boom hinge assembly of the crop spraying apparatus of FIG. 1a.

FIG. 8b is a rear perspective view of the opposed boom hinge assembly of FIG. 8a.

FIG. 8c is a front perspective view of the opposed boom hinge assembly of FIG. 8a.

FIG. 8d is an opposed rear perspective view of the opposed boom hinge assembly of FIG. 8a.

FIG. 9a is a front perspective view of the frame assembly of FIG. 2a coupled to the prime mover of FIG. 1a.

FIG. 9b is a perspective view of a hoist apparatus of the crop spraying apparatus of FIG. 1a.

FIG. 9c is a side view of an upper portion of the frame assembly of FIG. 2a.

FIG. 9e is a side view of the rearward and forward pendulum assemblies of FIG. 3d coupled to the carriage assembly of FIG. 6a.

FIGS. 9f and 9g are opposed side views of the rearward and forward pendulum assemblies of FIG. 3d coupled to the carriage assembly of FIG. 6a.

FIG. 9h is a perspective view of a hydraulic system of the crops spraying apparatus of FIG. 1a.

FIG. 9i is a perspective view of a portion of the hydraulic system of FIG. 9h, which is connected to a prime mover hydraulic system and the first and second carriage rotation cylinders.

FIG. 9j is a perspective view of a hydraulic system, which is connected to the prime mover hydraulic system and the first and second boom fold cylinders.

FIGS. 9l and 9m are top and bottom views, respectively, of the rearward and forward pendulum arm frame members of FIG. 9e.

FIGS. 10c and 10d are opposed side views of the embodiment of the mastless crop spraying apparatus of FIGS. 10a and 10b.

DETAILED DESCRIPTION OF THE INVENTION

Disclosed herein is a crop spraying vehicle, which includes a crop spraying apparatus carried by a prime mover. More information regarding crop spraying vehicles can be found in U.S. patent application Ser. No. 10/290,567, filed on Nov. 7, 2002, Ser. No. 11/733,703, filed on Apr. 10, 2007, and Ser. No. 14/733,914 filed on Jun. 8, 2015, the contents of all of which are incorporated by reference as though fully set forth herein. The crop spraying apparatus includes opposed booms, which are repeatably moveable between stowed and deployed positions. In the stowed position, the opposed booms extend substantially parallel to a longitudinal axis of the prime mover. In the deployed position, the opposed booms are moved outwardly from the longitudinal axis of the prime mover. The booms are used to carry nozzles connected to a container of chemicals through piping. The chemicals are applied to the crops by flowing them from the container, through the piping and spraying them through the nozzles over a spray area.

The crop spraying apparatus is repeatably rotatable relative to the prime mover. The crop spraying apparatus is repeatably rotatable relative to the prime mover tor many different reasons. One reason the crop spraying apparatus is repeatably rotatable relative to the prime mover is because a typical field is uneven. Hence, the crop spraying apparatus is allowed to rotate relative to the prime mover so dial the crop spraying apparatus remains substantially level while the prime mover rocks back and forth in response to moving on the field.

It is desirable to keep the crop spraying apparatus level for many different reasons. One reason it is desirable to keep the crop spraying apparatus level is so that the chemicals are more evenly applied to the field. Another reason it is desirable to keep the crop spraying apparatus level is so that the chemicals are less likely to be blown away from the field by wind. A spray boom that does not rock with the carrying vehicle can be maintained closer to the spray target, so that more spray in applied to the target and less spray is lost through drift and evaporation.

The spray area can be increased by increasing the length of the opposed booms. It is desirable to increase the spray area so that the field can be sprayed more efficiently. The field is sprayed more efficiently as the spray area is increased because the crop spraying vehicle requires a fewer number of passes to cover the field with chemicals. Hence, it is desirable to keep the crop spraying apparatus level because, as the length of the opposed booms increase, they are more likely to hit the field in response to the prime mover moving on the field.

Figure 1A:
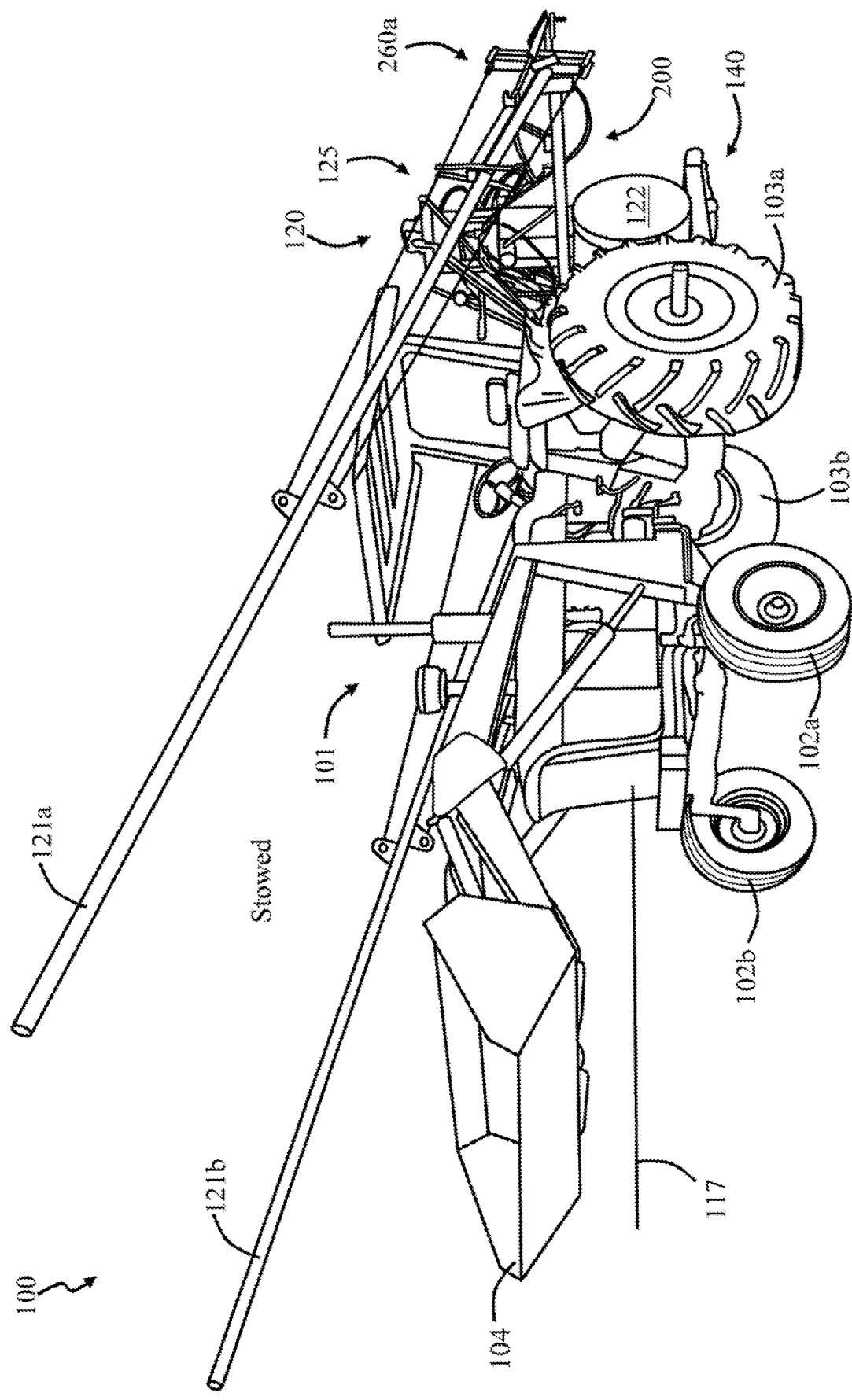
FIG. 1a is a left front perspective view of a crop spraying vehicle, which includes a crop spraying apparatus carried by a prime mover, wherein the crop spraying apparatus is repeatably rotatable relative to the prime mover.
Figure 1B:
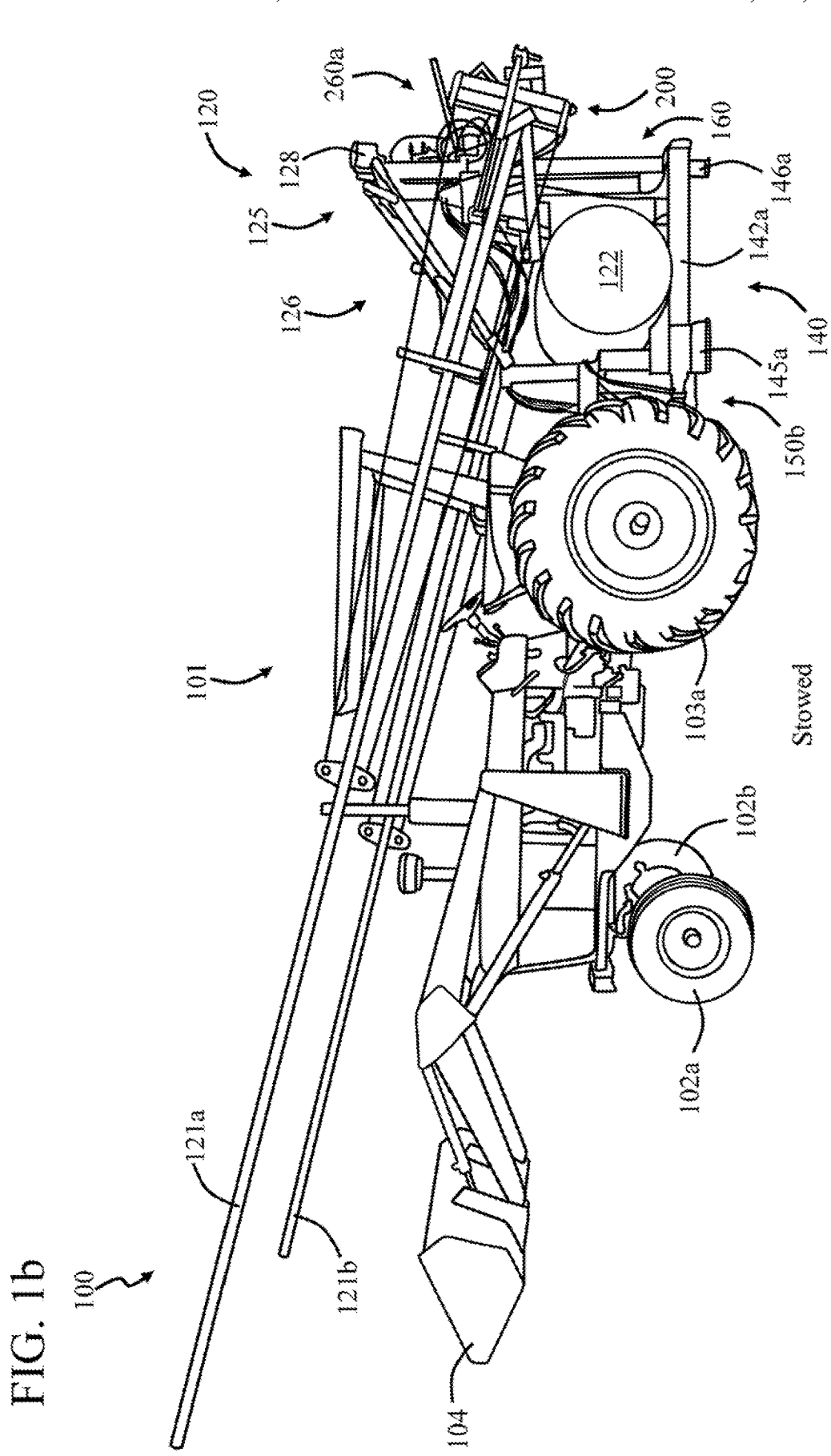
FIG. 1b is a left side view of the crop spraying vehicle of FIG. 1a, wherein the crop spraying apparatus is in a stowed condition.
Figure 1C:
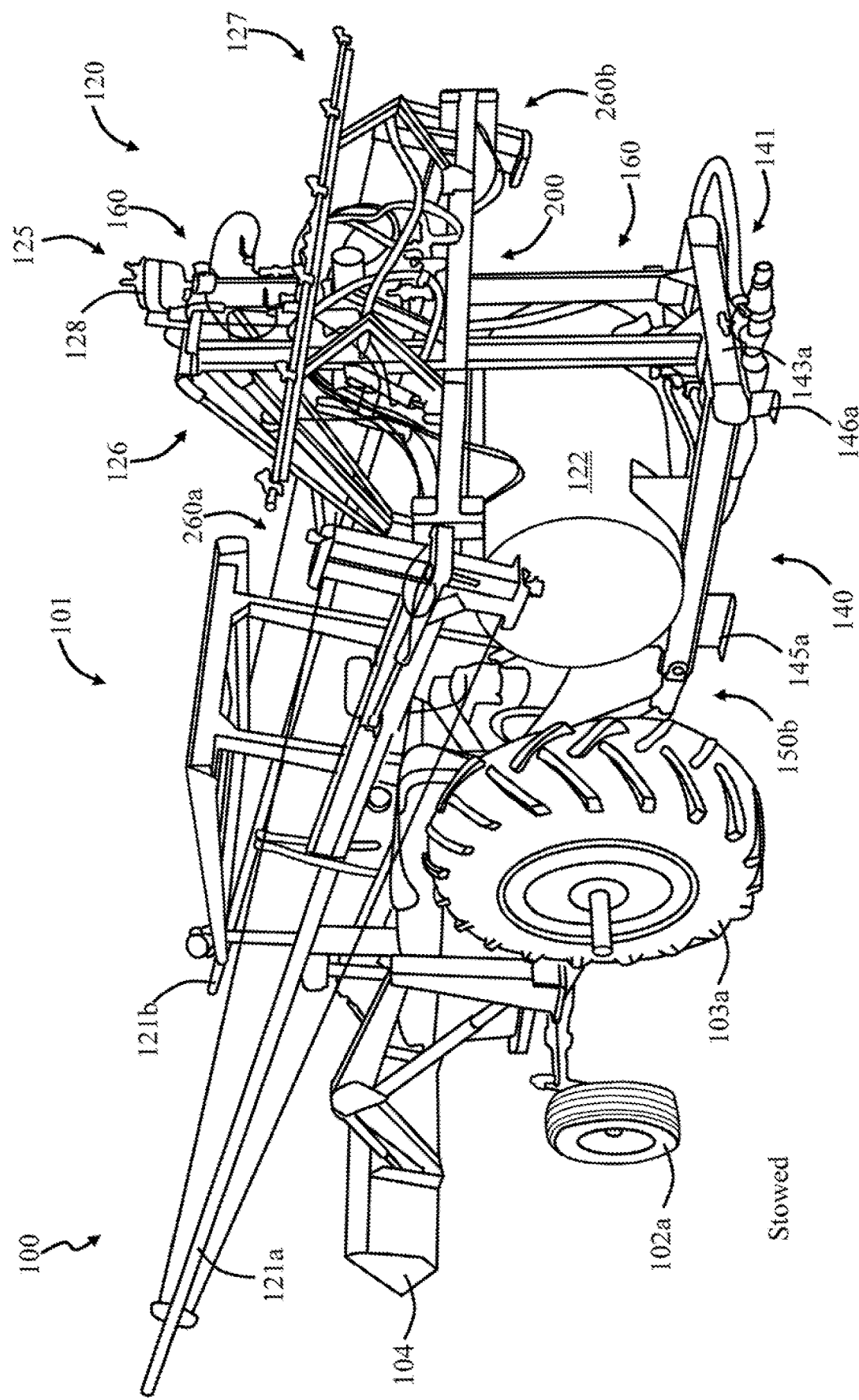
FIG. 1c is a left rear perspective view of the crop spraying vehicle of FIG. 1a, wherein the crop spraying apparatus is in the stowed condition.
Figure 1D:
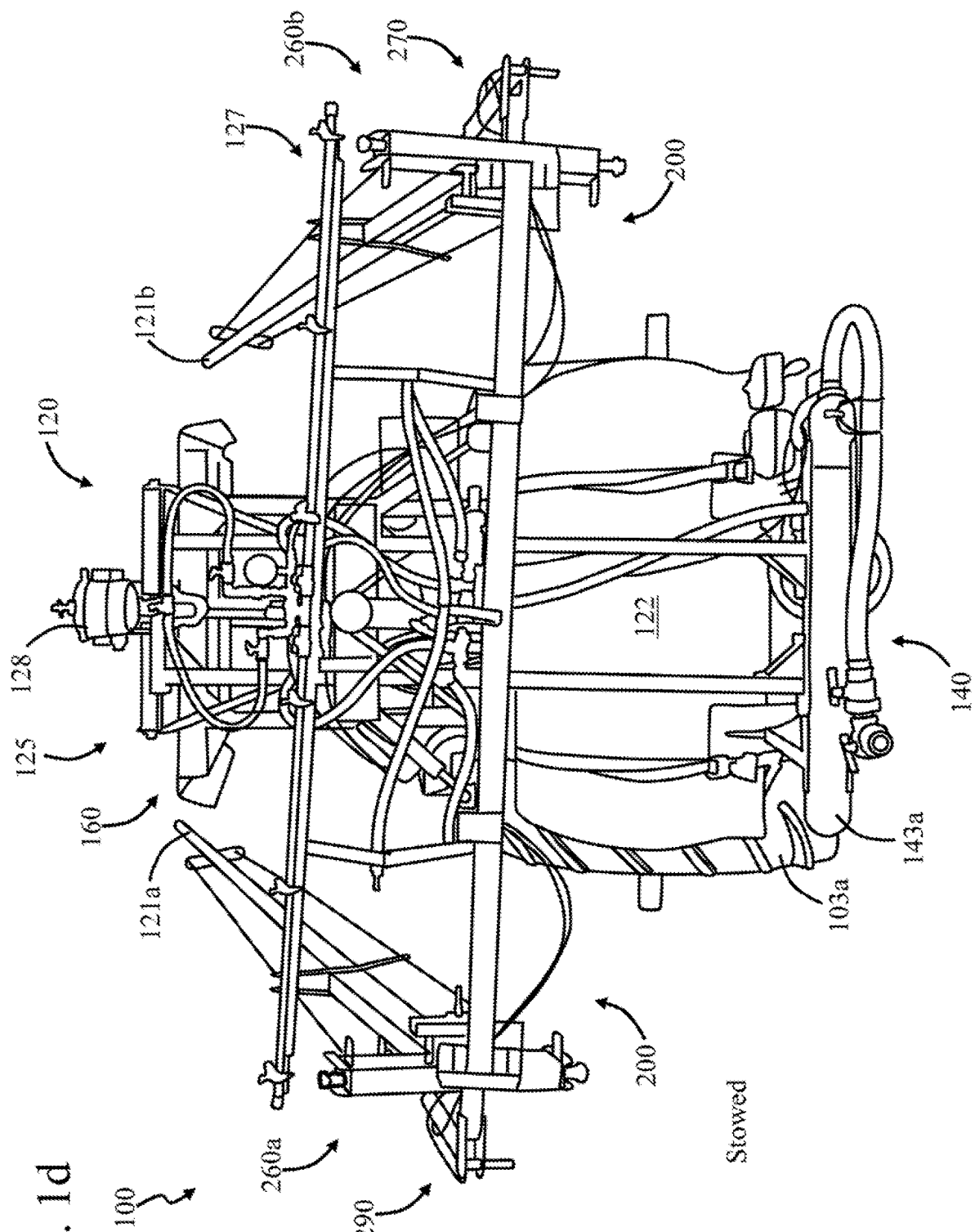
FIG. 1d is a back view of the crop spraying vehicle of FIG. 1a, wherein the crop spraying apparatus is in the stowed condition.
Figure 1E:
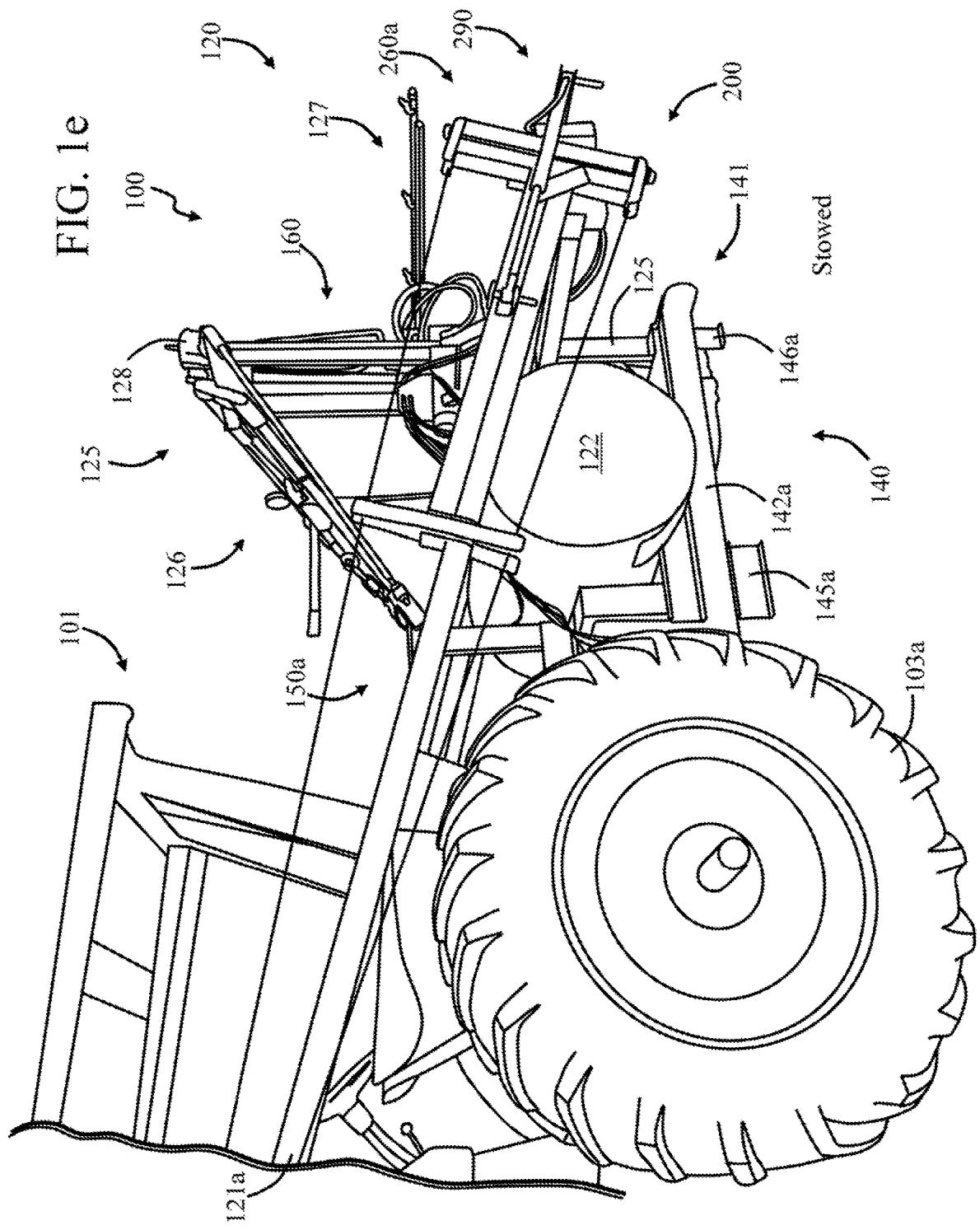
FIG. 1e is a left side perspective view of the crop spraying vehicle of FIG. 1a with the crop spraying apparatus in the stowed condition.
Figure 1G:
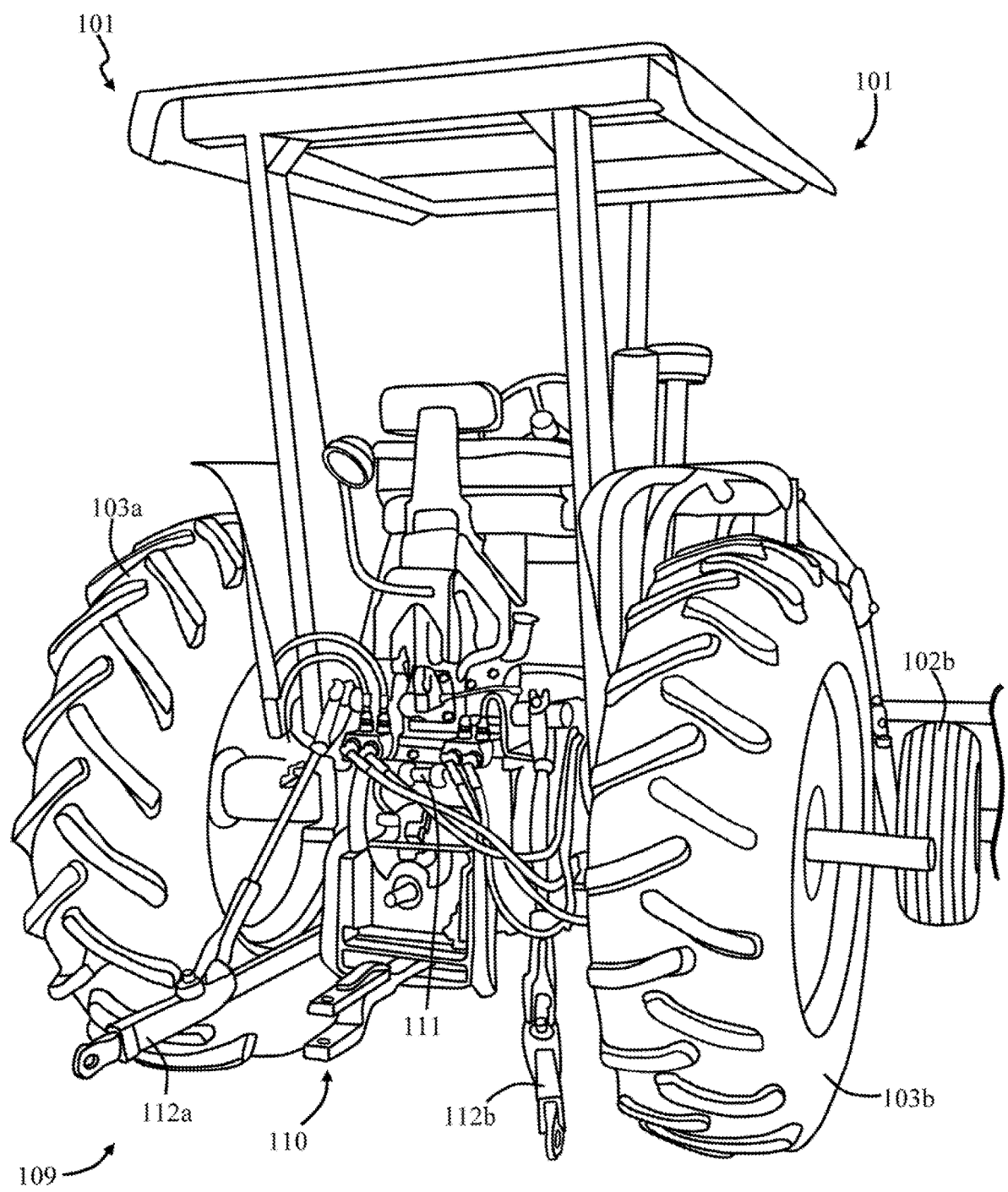
FIG. 1g is a right rear perspective view of the prime mover of FIG. 1a without the crop spraying apparatus of FIG. 1a attached thereto.

FIG. 1a is a left front perspective view of a crop spraying vehicle 100, which includes a crop spraying apparatus 120 carried by a prime mover 101, wherein the crop spraying apparatus 120 is repeatably rotatable relative to the prime mover 101. The crop spraying apparatus 120 is repeatably moveable between stowed and deployed conditions, wherein the crop spraying apparatus is in the stowed condition in FIG. 1a. FIG. 1b is a left side perspective view of the crop spraying vehicle 100, and FIG. 1c is a left rear perspective view of the crop spraying vehicle 100, wherein the crop spraying apparatus 120 is in the stowed condition in FIGS. 1b and 1c. FIG. 1d is a back perspective view of the crop spraying vehicle 100, wherein the crop spraying apparatus 120 is in the stowed condition. FIG. 1e is a left side perspective view of the crop spraying vehicle 100, wherein the crop spraying apparatus 120 is in the stowed condition, and FIG. 1f is a left side perspective view of the crop spraying vehicle 100, wherein the crop spraying apparatus 120 is in the deployed condition. FIG. 1g is a right rear perspective view of the prime mover 101 of FIG. 1a without the crop spraying apparatus 120 attached thereto.

As shown in FIG. 1a, the prime mover 101 includes front wheels 102a and 102b and rear wheels 103a and 103b. As shown in FIG. 1a, a longitudinal axis 117 extends longitudinally through a centerline thereof the prime mover 101. It should be noted that the longitudinal axis 117 is for reference purposes only and is useful when describing the positions of the various components of the prime mover 101 and crop spraying apparatus 120. For example, the front wheels 102a and 102b are positioned on opposed sides of the longitudinal axis 117, and the rear wheels 103a und 103b are positioned on opposed sides of the longitudinal axis 117. It should be noted that the front wheel 102a and rear wheel 103a are on the left side of the crop spraying vehicle 100, and the front wheel 102b and rear wheel 103b are on the right side of the crop spraying vehicle 100.

It is useful for the prime mover 101 to be a tractor that has utility. A prime mover has utility when it can be used for more than one purpose. It may be inconvenient and expensive to buy a dedicated prime mover for crop spraying. Hence, it may be convenient and less expensive to have a prime mover that can be used for other purposes in addition to crop spraying. The prime mover 101 can be of many different types of prime movers, such as a tractor. Tractors are made by many different manufacturers, such as John Deere. Caterpillar, CNH Global N.V., McCormick Tractors International Ltd., AGCO Corporation and Kubota Corporation, among others. It should be noted that the crop spraying vehicle 100 can be a dedicated crop sprayer, such as a SPRACOUPE.

In this embodiment, the prime mover 101 is embodied as a John Deere 4020 tractor. The prime mover 101 is embodied as the John Deere 4020 tractor because such tractors are widely available and have utility, for example, as shown in FIGS. 1a-1c, the prime mover 101 includes a loader bucket 104, which is useful for loading and moving material. Further, as shown in FIG. 1g, the prime mover 101 includes a center drawbar hitch 110, which is useful for hitching a trailer thereto for towing, or a farm implement. Further, the prime mover 101 includes a three-point hitch 109 (FIG. 1g), which can be used to couple the farm implement thereto. In this way, the prime mover 101 can be used for other purposes besides spraying. There are many different types of farm implements that can be coupled to the three-point hitch 109, such as a plow and blade hiller, among others.

Also as shown in FIG. 1g, the three-point hitch 109 includes a top link coupling 111, and the hitch lifting arms 112a and 112b. The top link coupling 111 generally positioned on the longitudinal axis 117, and the hitch lifting arms 112a and 112b are positioned on opposed sides of the longitudinal axis 117. The hitch lifting arms 112a and 112b are positioned proximate to the rear wheels 103a and 103b, respectively, and the center drawbar hitch 110 is positioned below the top link coupling 111.

The crop spraying apparatus 120 includes many inventive features, which will be discussed in more detail below. Briefly, in this embodiment, the crop spraying apparatus 120 includes a frame assembly 140 (FIGS. 1a-1f), wherein the frame assembly 140 includes a support frame 141 (FIGS. 1c and 1e). The support frame 141 is coupled to the three-point hitch 109 (FIG. 1g), as will be discussed in more detail with FIGS. 2a-2d. The three-point hitch 109 can be repeatably raised and lowered to repeatably move the frame assembly 140 to raised and lowered positions, respectively. It should be noted that, in the raised and lowered positions, the frame assembly 140 can be level, tilted downwardly, and tilted upwardly. The frame assembly 140 is shown in the raised position in at least FIGS. 1a-1c, wherein the frame assembly 140 is held substantially level.

The crop spraying apparatus 120 includes a container 122 (FIGS. 1a-1f), which is carried by the frame assembly 140, as will be discussed in more detail with FIGS. 2a-2d. The frame assembly 140 includes a mast assembly 160 (FIGS. 1b-1f), which is carried by the support frame 141, as will be discussed in more detail with FIGS. 2a and 2b and FIGS. 3a-3b.

In this embodiment, the frame assembly 140 carries a carriage assembly 200 (FIGS. 1a-1f), which is slideably coupled to the mast assembly 160, so that the carriage assembly 200 is repeatably moveable between raised and lowered positions, as will be discussed in more detail below. The frame assembly 140 includes it hoist coupling assembly 150a (FIGS. 1e and 1f), which is carried by the support frame 141, as will be discussed in more detail with FIGS. 2a-2d. The crop spraying apparatus 120 includes a hoist apparatus 126 (FIGS. 1b and 1c and FIGS. 1e and 1f), which is coupled between the carriage assembly 200 and hoist coupling assembly 150a. The hoist apparatus 126 moves the carriage assembly 200 between the raised and lowered positions, as will be discussed in more detail below with FIGS. 9a-9d. The frame assembly 140 includes a prime mover coupling assembly 150b (FIGS. 1b and 1c), which is carried by the support frame 141, as will be discussed in more detail with FIGS. 2a-2d. The prime mover coupling assembly 150b can be coupled to the top link coupling 111 and prime mover lifting arms 112a and 112b.

In this embodiment, the crop spraying apparatus 120 includes opposed booms 121a and 121b (FIGS. 1a-1f), which are rotatably coupled to the carriage assembly 200 through boom hinge assemblies 260a and 260b, respectively, as will be discussed in more detail with FIGS. 7a-7f and 8a-8f. The opposed booms 121a and 121b are repeatably moveable between stowed and deployed positions. The crop spraying apparatus 120 includes a center sprayer 127 (FIGS. 1e-1f), which is repeatably moveable between raised and lowered positions. In the lowered position center sprayer sprays a region between the opposed booms 121a and 121b. The crop spraying apparatus 120 includes a hydraulic system 125, which includes a hydraulic fluid reservoir 128 (FIGS. 1b-1f). The hydraulic system 125 provides hydraulic fluid to the hydraulic components of the crop spraying apparatus 120, as will be discussed in more detail below with FIGS. 9h-9j. The hydraulic components include boom locking components, which are capable of repeatably locking and unlocking the opposed booms 121a and 121b. In this way, the boom locking components allows the rotational movement of the crop spraying apparatus 120 to be controlled. One example of a boom locking component is a carriage rotation cylinder. The boom locking components will be discussed in more detail below. It should be noted that the prime mover 101 typically includes its own hydraulic system which is pressurized, and will be referred to herein as the prime mover 101 hydraulic system.

It should be noted that the crop spraying apparatus 120 can include many different types of materials, such as plastic, rubber, carbon fiber and metal. The metal can be of many different types, such as aluminum and steel. The pieces of the crop spraying apparatus 120 can be of many different shapes. For example, some pieces are flat, such as flat stock material. Other pieces can be L-shaped, such as angle iron. Some pieces of the crop spraying apparatus 120 are hollow, such as tubing. The tubing can have many different shapes, such as rectangular tubing and circular tubing. Some pieces of the crop spraying apparatus 120 have a channel extending therethrough, such as channel iron. It should be noted that, in the art, steel is often referred to as iron. It should also be noted that the various pieces of the crop spraying apparatus 120 can be coupled together in many different ways, such as by using fasteners and welding. The fasteners can be of many different types, such as screws and pins.

FIG. 2a is a rear perspective view of the frame assembly 140 of the crop spraying apparatus 120 of FIGS. 1a-1f, and FIG. 2b is an exploded rear perspective view of the frame assembly 140 of FIG. 2a. FIGS. 2c and 2d are opposed side views of the frame assembly 140 of FIG. 2a. It should be noted that the container 122 (FIGS. 1a-1e) is shown as a broken line in FIGS. 2c and 2d to indicate its position with the frame assembly 140. It should be noted that the various components discussed herein can be made from many different types of material, such as channel stock, angle iron, and flat stock material. Further, the various components discussed herein can be of many different shapes, such as a square, rectangular, and circular tubing.

As mentioned above, the frame assembly 140 includes the support frame 141. In this embodiment, the support frame 141 includes longitudinal frame members 142a and 142b, which are spaced apart from each other. The longitudinal frame members 142a and 142b extend parallel to the longitudinal axis 117 (FIG. 1a). The longitudinal frame members 142a and 142b include longitudinal frame member openings 148a (FIGS. 2a, 2b, and 2c) and 148b (FIG. 2d), respectively. As will be discussed in more detail below with FIG. 9a, longitudinal frame member openings 148a and 148b are for coupling the frame assembly 140 to three point hitch 109 (FIGS. 1g and 9a). The longitudinal frame member openings 148a and 148b are positioned towards the prime mover 101, and are for receiving the hitch lifting arms 112a and 112b, respectively. The longitudinal frame members 142a and 142b can include many different types of materials. In this embodiment, the longitudinal frame members 142a and 142b include rectangular iron tubing.

The support frame 141 includes cross frame members 143a and 143b, which are spaced apart from each other and extend between the longitudinal frame members 142a and 142b. The cross frame members 143a and 143b extend perpendicular to the longitudinal axis 117 (FIG. 1a). The cross frame member 143a is positioned proximate to the must assembly 160, and the cross frame member 143b is positioned away from the mast assembly 160. Further, the cross frame member 143b is positioned proximate to the longitudinal frame member openings 148a and 148b, and the cross frame member 143a is positioned away from the longitudinal frame member openings 148a and 148b. The cross frame members 143a and 143b can include many different types of materials. In this embodiment, the cross frame members 143a and 143b include rectangular iron tubing. The cross frame members 143a and 143b can be coupled to the longitudinal frame members 142a and 142b in many different ways, such as by using fasteners and/or welding.

The support frame 141 includes front stands 145a and 145b, which are carried by the longitudinal frame members 142a und 142b, respectively. The front stands 145a and 145b are positioned opposed to each other and proximate to the cross frame member 143b. The front stands 145a and 145b are positioned proximate to the longitudinal frame member openings 148a and 148b, respectively. Further, the support frame 141 includes rear stands 146a and 146b, which are carried by the longitudinal frame members 142a and 142b, respectively. The rear stands 146a and 146b are positioned opposed to each other and proximate to the cross frame member 143a. The front stands 145a and 145b und rear stands 146a und 146b can include many different types of materials. In this embodiment, the front stands 145a and 145b and rear stands 146a and 146b include iron and channel stock material. The front stands 145a and 145b can be coupled to the longitudinal frame members 142a and 142b, respectively, in many different ways, such as by using fasteners and/or welding. Further, the rear stands 146a and 146b can be coupled to the longitudinal frame members 142a and 142b, respectively, in many different ways, such as by using fasteners and/or welding.

The frame assembly 140 includes the prime mover coupling assembly 150b, wherein the prime mover coupling assembly 150b is for coupling the frame assembly 140 to the top link coupling 111 (FIGS. 1g and 9a), as will be discussed in more detail below. In this embodiment, the prime mover coupling assembly 150b includes upright arms 151a and 151b, which extends upwardly from the longitudinal frame members 142a and 142b, respectively. The upright arms 151a and 151b are positioned proximate to the longitudinal frame member openings 148a and 148b, respectively. The upright arm 151a has an end positioned proximate to the intersection of the longitudinal frame member 142a and cross frame member 143b, and extends upwardly therefrom. Further, the upright arm 151b has an end positioned proximate to the intersection of the longitudinal frame member 142b and cross frame member 143b, and extends upwardly therefrom. The upright arms 151a and 151b can include many different types of materials. In this embodiment, the upright arms 151a and 151b include rectangular iron tubing. The upright arms 151a and 151b can be coupled to the longitudinal frame members 142a and 142b, respectively, in many different ways, such as by using fasteners and/or welding.

In this embodiment, the prime mover coupling assembly 150b includes a cross arm 152, which extends between the upright arms 151a and 151b. The cross arm 152 is held by the upright arms 151a and 151b away from the cross frame member 143b, as shown in FIGS. 2a and 2b. The cross arm 152 can include many different types of materials. In this embodiment the cross arm 152 includes rectangular iron tubing. The cross arm 152 can be coupled to the upright arms 151a and 151b in many different ways, such as by using fasteners and/or welding.

In this embodiment, the prime mover coupling assembly 150b includes hitch coupling brackets 153a and 153b, which are carried by the cross arm 152. The hitch coupling brackets 153a and 153b include hitch bracket openings 156a (FIG. 2c) and 156b (FIG. 2d), respectively. As will be discussed in more detail below with FIG. 9a, the hitch bracket openings 156a and 156b are for coupling the frame assembly 140 to the top link coupling 111 (FIGS. 1g and 9a). The hitch coupling brackets 153a and 153b are positioned towards the prime mover 101, and the hitch bracket openings 156a and 156b are for receiving the lop link coupling 111. The hitch coupling brackets 153a and 153b can include many different ty pes of materials. In this embodiment, the hitch coupling brackets 153a and 153b include iron, and can be made from angle iron and flat stock material. The hitch coupling brackets 153a and 153b can be coupled to the cross arm 152 in many different ways, such as by using fasteners and/or welding.

The frame assembly 140 includes the hoist coupling assembly 150a carried by the cross arm 152, wherein the hoist coupling assembly 150a is for coupling the frame assembly 140 to the hoist apparatus 126, as will be discussed in more detail below. In this embodiment, the hoist coupling assembly 150*a* includes a hoist bracket arm 154, which extends upwardly from the cross arm 152. The hitch coupling brackets 153*a* and 153*b* are positioned on opposed sides of the hoist bracket arm 154. The hoist coupling assembly 150*a* includes a hoist bracket 155 with a hoist bracket opening 157 (FIGS. 2*c* and 2*d*) extending therethrough. As will be discussed in more detail below with FIG. 9*a*, the hoist bracket opening 157 is for coupling the frame assembly 140 to the hoist apparatus 126. The hoist bracket arm 154 and hoist bracket 155 can include many different types of materials. In this embodiment, the hoist bracket arm 154 and hoist bracket 155 include rectangular iron tubing. The hoist bracket arm 154 can be coupled to the cross arm 152 in many different ways, such as by using fasteners and/or welding. Further, the hoist bracket 155 can be coupled to the hoist bracket arm 154 in many different ways, such as by using fasteners and/or welding.

In this embodiment, the frame assembly 140 includes the mast assembly 160 (FIGS. 2*a* and 2*b*), which is positioned proximate to the cross frame member 143*a*. The mast assembly 160 includes masts 161*a* and 161*b*, which are carried by the cross frame member 143*a* and extend upwardly therefrom. The masts 161*a* and 161*b* are supported by mast braces 162*a* and 162*b*, respectively. The mast brace 162*a* is coupled to the must 161*a* and cross frame member 143*a*, and the mast brace 162*b* is coupled to the mast 161*b* and cross frame member 143*a*. The mast assembly 160 includes a cross mast member 163, which is carried by the masts 161*a* and 161*b* away from the cross frame member 143*a*.

The mast assembly 160 can include many different types of materials. In this embodiment, the masts 161*a* and 161*b* and cross mast member 163 include channel iron (FIGS. 3*a*, 3*b*, 3*c*, 3*d* and 3*c*). The mast braces 162*a* and 162*b* include iron and can be made from flat stock material. The mast assembly 160 can be coupled to the longitudinal frame members 142*a* in many different ways, such as by using fasteners and/or welding. For example, the masts 161*a* and 161*b* and mast braces 162*a* and 162*b* can be coupled to the cross frame member 143*a* using fasteners and/or welding. Further, the cross mast member 163 can be coupled to the masts 161*a* and 161*b* in many different ways, such as by using fasteners and/or welding.

In this embodiment, the frame assembly 140 includes container braces 144*a* and 144*b*, which are carried by the longitudinal frame members 142*a* and 142*b*, respectively. The container brace 144*a* is positioned proximate to the intersection of the longitudinal frame member 142*a* and cross frame member 143*b*. The container brace 144*b* is positioned proximate to the intersection of the longitudinal frame member 142*b* and cross frame member 143*b*. Further, the frame assembly 140 includes container braces 147*a* and 147*b*, which are carried by the longitudinal frame members 142*a* and 142*b*, respectively. The container braces 147*a* and 147*b* are positioned away from container braces 144*a* and 144*b*, respectively, so that the container 122 can be supported by them, as indicated in FIGS. 2*c* and 2*d*.

The container braces 144*a* and 144*b* and container braces 147*a* and 147*b* restrict the ability of the container 122 to undesirably move, such as when moving the crop spraying apparatus 120 between the raised and lowered positions. Further, the container braces 144*a* and 144*b* and container braces 147*a* and 147*b* restrict the ability of the container 122 to undesirably move, such as when moving the crop spraying apparatus 120 between the level, tilted, and untilted positions. The container braces 144*a*, 144*b*, 147*a* and 147*b* can include many different types of materials. The container braces 144*a*, 144*b*, 147*a* and 147*b* include iron and can be made from flat stock material. The container braces 144*a* and 147*a* can be coupled to the longitudinal frame members 142*a* in many different ways, such as by using fasteners and/or welding. Further, the container braces 144*b* and 147*b* can be coupled to the longitudinal frame members 142*b* in many different ways, such as by using fasteners and/or welding.

Figure 3A:
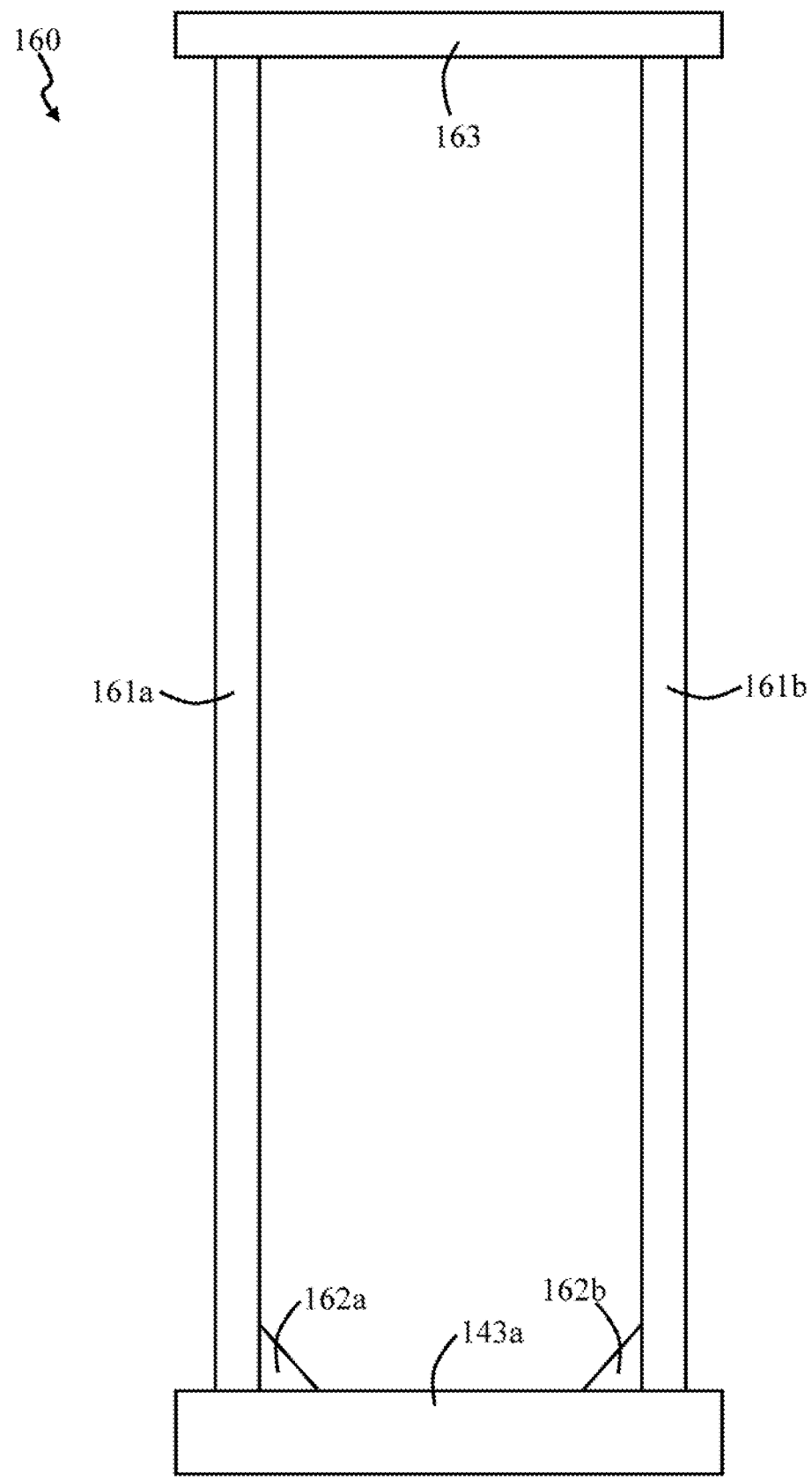
FIG. 3a is a rear view of the mast assembly of the frame assembly of FIGS. 2a and 2b.

FIG. 3*a* is a rear side view of the mast assembly 160 of the frame assembly 140 of FIGS. 2*a* and 2*b*, and FIGS. 3*b* and 3*c* are opposed side views of the mast assembly 160 of FIG. 3*a*. In this embodiment, the mast assembly 160 includes the masts 161*a* and 161*b*, which are carried by the cross frame member 143*a* and extend upwardly therefrom. The masts 161*a* and 161*b* are supported by the mast braces 162*a* and 162*b*, respectively. As mentioned above, the mast brace 162*a* is coupled to the mast 161*a* and cross frame member 143*a*, and the mast brace 162*b* is coupled to the mast 161*b* and cross frame member 143*a*. The mast assembly 160 includes the cross mast member 163, which is earned by the masts 161*a* and 161*b* away from the cross frame member 143*a*. The cross mast member 163 is opposed to the cross frame member 143*a*.

Figure 3D:
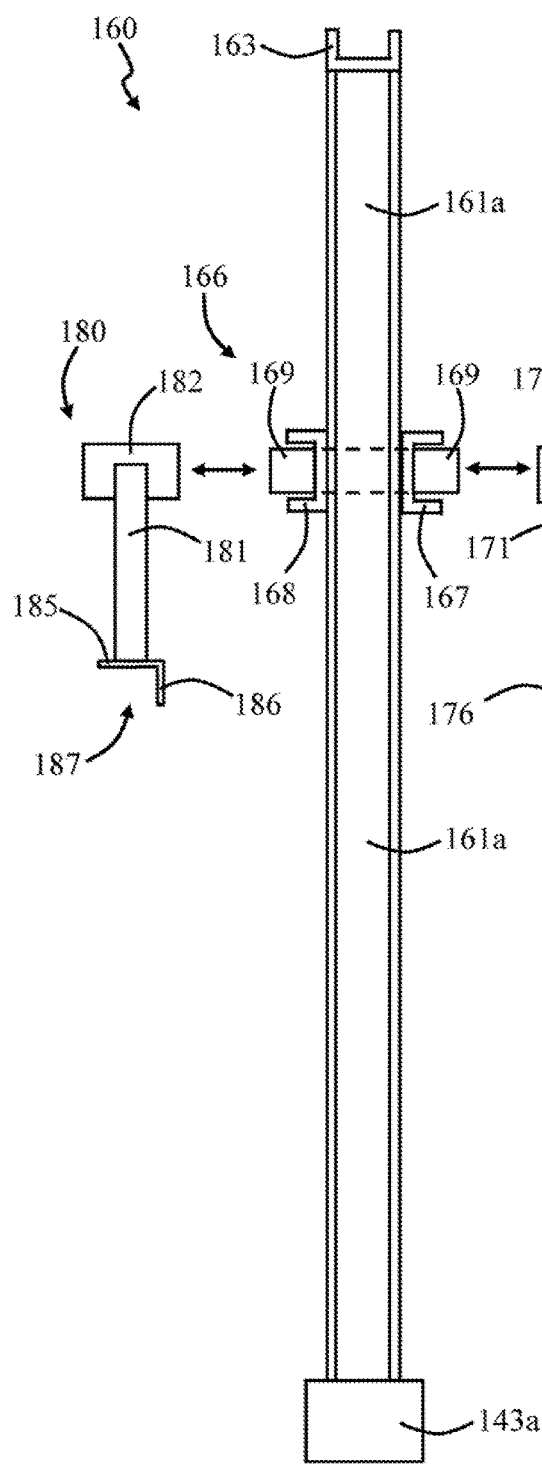
FIG. 3d is an exploded side view of the mast assembly of FIG. 3a with rearward and forward pendulum assemblies.
Figure 3E:
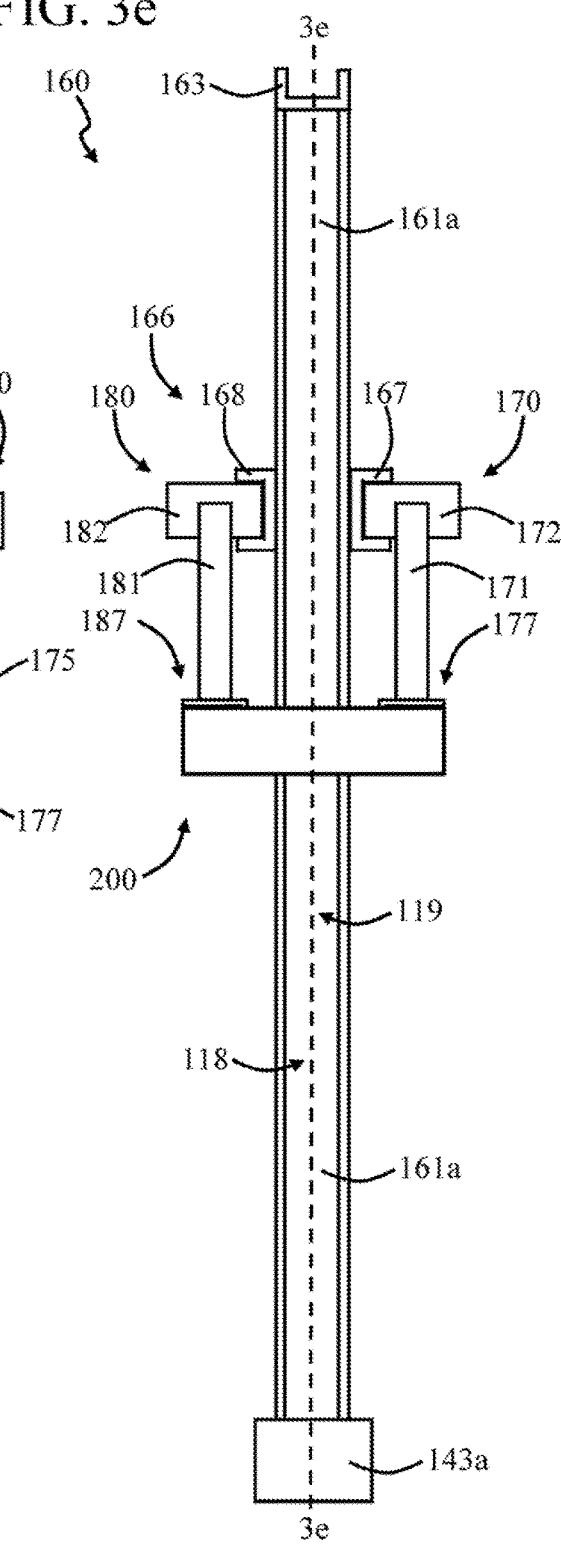
FIG. 3e is a side view of the mast assembly of FIG. 3d with the rearward and forward pendulum assemblies coupled thereto.
Figure 3F:
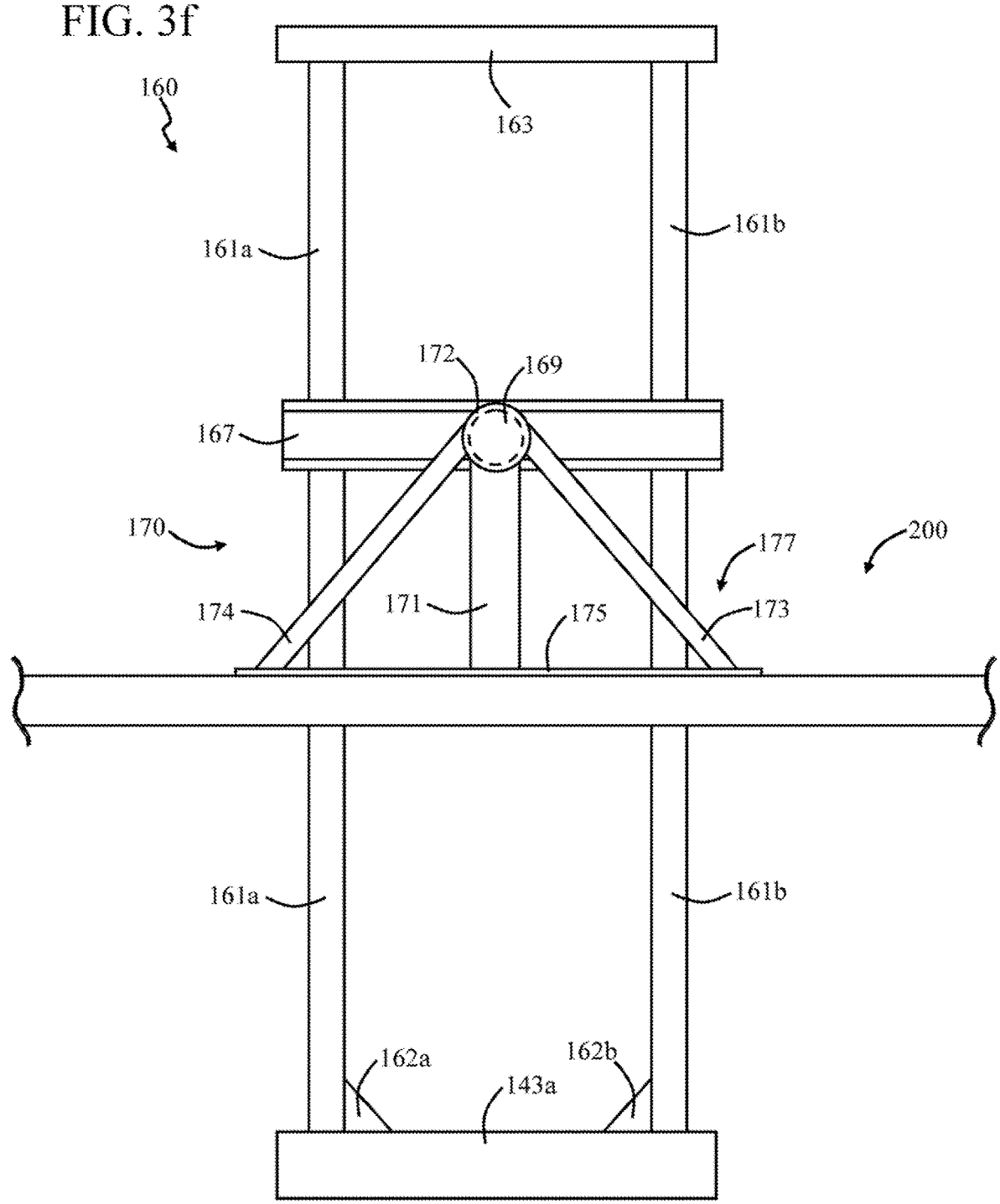
FIG. 3f is a rear view of the mast assembly of FIG. 3e showing the rearward pendulum assembly.
Figure 3I:
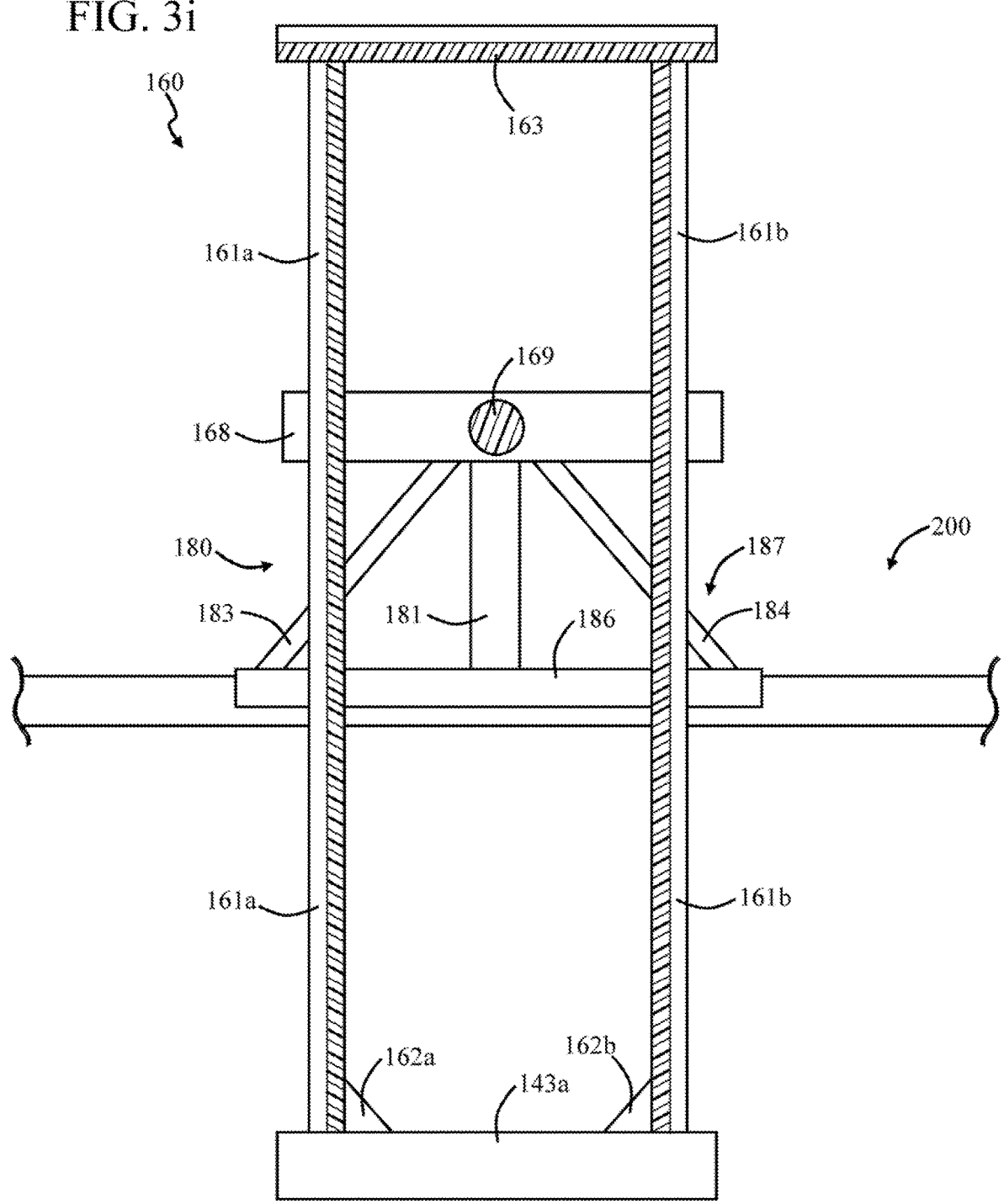
FIG. 3i is a front cut-away view of the mast assembly of FIG. 3b, taken in an opposed direction along a cut-line 3e-3e of FIG. 3e, showing the forward pendulum assembly.

FIG. 3*d* is an exploded side view of the mast assembly 160 of FIG. 3*a* with rearward and forward pendulum assemblies 170 and 180, and FIG. 3*e* is a side view of the mast assembly 160 of FIG. 3*d* with the rearward and forward pendulum assemblies 170 and 180 coupled thereto. FIG. 3*f* is a rear view of the mast assembly 160 of FIG. 3*e* showing the rearward pendulum assembly 170, and FIG. 3*g* is a rear cut-away view of the must assembly 160, taken in a direction 118 along a cut-line 3*e*-3*e* of FIG. 3*e*, showing the rearward pendulum assembly 170. FIG. 3*h* is a front view of the mast assembly 160 of FIG. 3*e* showing the forward pendulum assembly 180, and FIG. 3*i* is a front cut-away view of the mast assembly 160, taken in an opposed direction 119 along a cut-line 3*e*-3*e* of FIG. 3*e*, showing the forward pendulum assembly 180.

In this embodiment, a pendulum carriage 166 (FIGS. 3*d* and 3*e*) is slideably engaged with the masts 161*a* and 161*b*, as will be discussed in more detail below. The pendulum carriage 166 includes opposed rearward and forward pendulum arm frame members 167 and 168, which are positioned on opposed sides of the masts 161*a* and 161*b*. The rearward pendulum arm frame member 167 faces the rearward pendulum assembly 170 and forward pendulum arm frame member 168 faces the forward pendulum assembly 180. The rearward pendulum assembly 170 will be discussed in more detail below with FIGS. 4*a*-4*c*, and the forward pendulum assembly 180 will be discussed in more detail below with FIGS. 5*a*-5*c*. The rearward and forward pendulum arm frame members 167 and 168 can include many different types of materials. In this embodiment, the rearward and forward pendulum arm frame members 167 and 168 include channel iron.

The pendulum carriage 166 includes a pendulum arm 169, which extends through the rearward and forward pendulum arm frame members 167 and 168. The rearward pendulum assembly 170 is coupled to the pendulum arm 169 proximate to the rearward pendulum arm frame member 167 and forward pendulum assembly 180 is coupled to the pendulum arm 160 proximate to the forward pendulum arm frame member 168.

In this embodiment, the rearward pendulum assembly 170 includes a support arm 171 and pendulum arm coupling 172, which are coupled together. The rearward pendulum assembly 170 includes a pendulum bracket 177, which is coupled to the support arm 171 opposed to the pendulum arm coupling 172. In this embodiment, the pendulum bracket 177 includes bracket plates 175 and 176. The bracket plates 175 and 176 are coupled together so that the pendulum bracket 177 is an L-bracket. The bracket plate 176 is shown extending along one edge of the bracket plate 175. However, it should be noted that the bracket plate 176 can extend along Use opposed edge of the bracket plate 175, if desired. The rearward pendulum assembly 170 includes angled support arms 173 and 174, which extend between the bracket plate 175 and pendulum arm coupling 172. The angled support arms 173 and 174 provide support for the support arm 171 and pendulum arm coupling 172.

In this embodiment, the forward pendulum assembly 180 includes a support arm 181 and pendulum arm coupling 182, which are coupled together. The forward pendulum assembly 180 includes a pendulum bracket 187, which is coupled to the support arm 181 opposed to the pendulum arm coupling 182. In this embodiment, the pendulum bracket 187 includes bracket plates 185 and 186. The bracket plates 185 and 186 are coupled together so that the pendulum bracket 187 is an L-bracket. The bracket plate 186 is shown extending along one edge of the bracket plate 185. However, it should be noted that the bracket plate 186 can extend along the opposed edge of the bracket plate 185, if desired. The rearward pendulum assembly 180 includes angled support arms 183 and 184, which extend between the bracket plate 185 and pendulum arm coupling 182. The angled support arms 183 and 184 provide support tor the support arm 181 and pendulum arm coupling 182.

In this embodiment, the carriage assembly 200 is coupled to the rearward and forward pendulum assemblies 170 and 180. In particular, the carriage assembly 200 is coupled to the pendulum brackets 177 and 187. The carriage assembly 200 can be coupled to pendulum brackets 177 and 187 in many different ways, such as by using a fastener and/or welding. It should be noted that the carriage assembly 200 of FIGS. 3e-3i corresponds to the carriage assembly 200 of FIGS. 1e-1f. However, the carriage assembly 200 is shown genetically in FIGS. 3e-3i for simplicity. One embodiment of the carriage assembly 200 is shown in more detail in FIGS. 6a-6j, and will be discussed in more detail therewith.

Figure 4A:
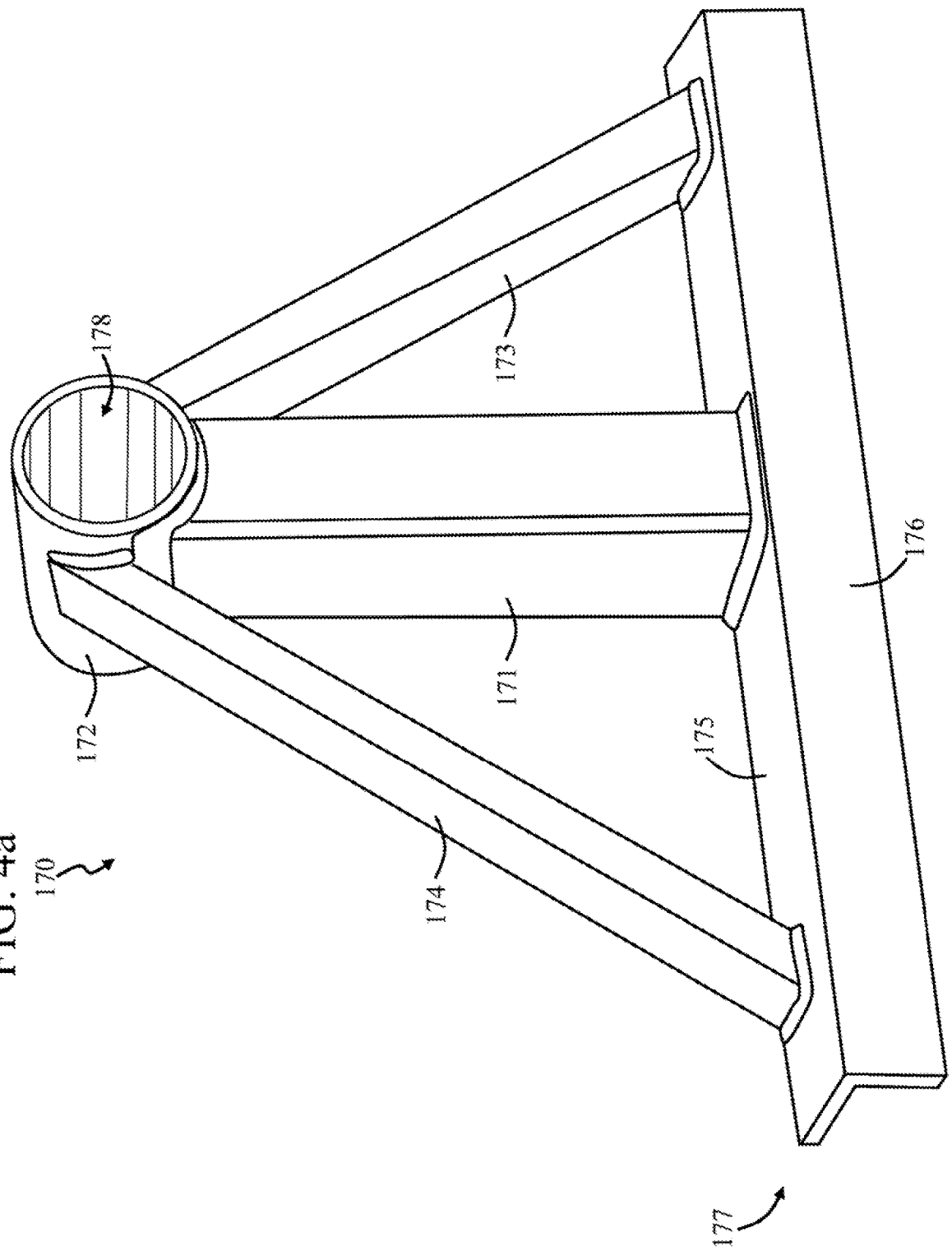
FIG. 4a is a perspective view of the rearward pendulum assembly of FIGS. 3d, 3e, and 3f.

FIG. 4a is a rear perspective view of the rearward pendulum assembly 170 of FIGS. 3d, 3e, and 3f, FIG. 4b is a rear side view of the rearward pendulum assembly 170, and FIG. 4e is a side view of the rearward pendulum assembly 170. As discussed above, the rearward pendulum assembly 170 includes the support arm 171 and pendulum arm coupling 172, which are coupled together. The pendulum arm coupling 172 includes a pendulum arm coupling channel 178, which extends through the pendulum arm coupling 172, as well as opposed channel openings 178a and 178b (FIG. 4c). The pendulum arm coupling channel 178 is sized and shaped to receive the pendulum arm 169 (FIGS. 3d and 3c), wherein the pendulum arm 169 extends through the pendulum arm coupling channel 178 and opposed channel openings 178a and 178b.

The rearward pendulum assembly 170 includes the pendulum bracket 177, which is coupled to the support arm 171 opposed to the pendulum arm coupling 172. In this embodiment, the pendulum bracket 177 includes the bracket plates 175 and 176. The bracket plates 175 and 176 are coupled together so that the pendulum bracket 177 is an L-bracket. The rearward pendulum assembly 170 includes the angled support arms 173 and 174, which extend between the bracket plate 175 and pendulum arm coupling 172. The angled support arms 173 and 174 provide support to the rearward pendulum assembly 170.

The rearward pendulum assembly 170 can include many different types of materials. In this embodiment, the support arm 171 and angled support arms 173 and 174 include rectangular iron tubing. The pendulum arm coupling 172 includes circular iron tubing. Further, the bracket plates 175 and 176 include angle iron.

The various components of the rearward pendulum assembly 170 can be coupled together in many different ways. For example, the support arm 171 and angled support arms 173 and 174 can be coupled to the pendulum arm coupling 172 using fasteners and/or welding. Further, the support arm 171 and angled support arms 173 and 174 can be coupled to the pendulum bracket 177 using fasteners and/or welding.

Figure 5A:
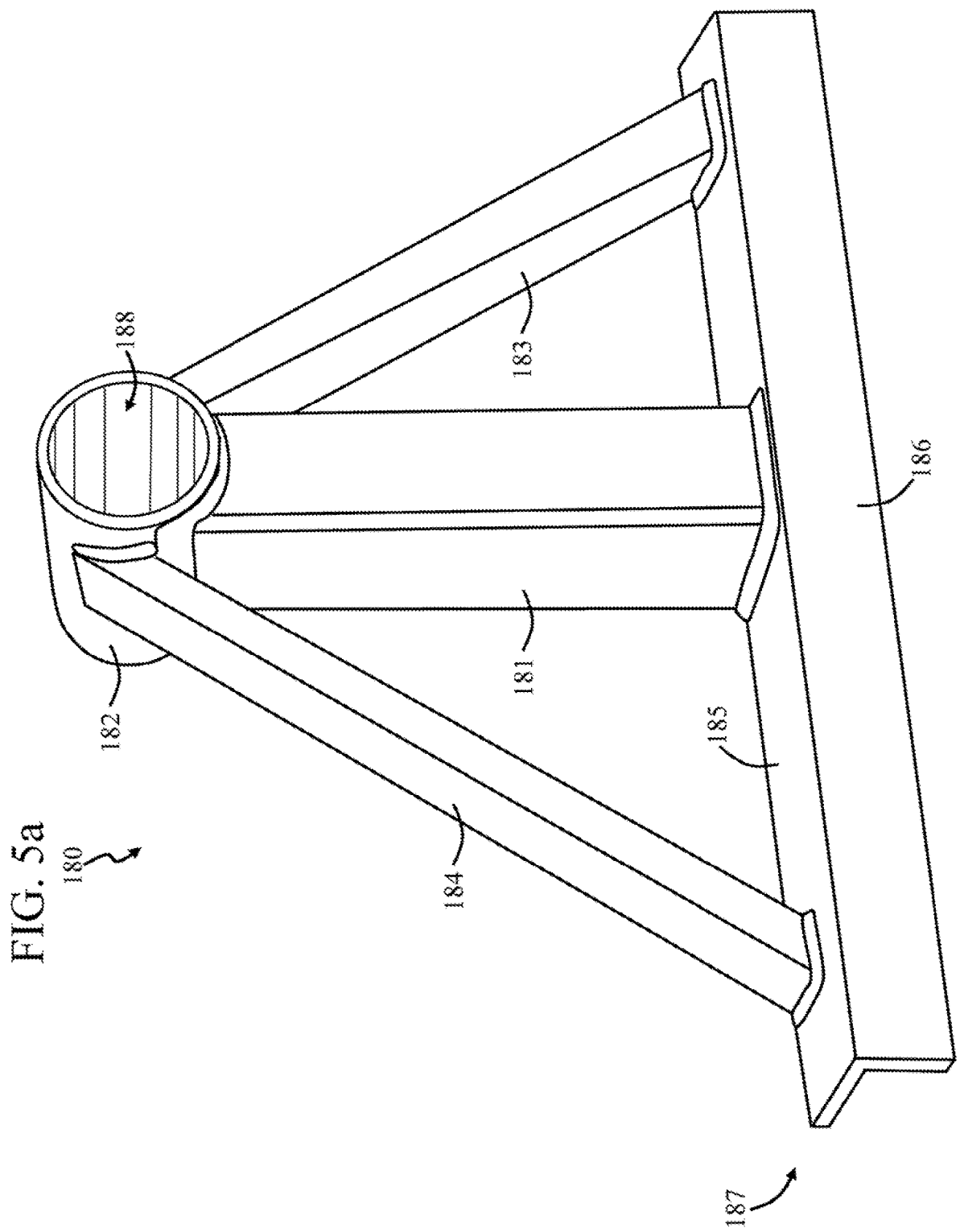
FIG. 5a is a perspective view of the forward pendulum assembly of FIGS. 3d, 3e, and 3i.

FIG. 5a is a rear perspective view of the forward pendulum assembly 180 of FIGS. 3d, 3e, and 3h, FIG. 5b is a rear side view of the forward pendulum assembly 180, and FIG. 5c is a side view of the forward pendulum assembly 180. As discussed above, the forward pendulum assembly 180 includes the support arm 181 and pendulum arm coupling 182, which are coupled together. The pendulum arm coupling 182 includes a pendulum arm coupling channel 188, which extends through the pendulum arm coupling 182, as well as opposed channel openings 188a and 188b (FIG. 4c). The pendulum arm coupling channel 188 is sized and shaped to receive the pendulum arm 169 (FIGS. 3d and 3e), wherein the pendulum arm 169 extends through the pendulum arm coupling channel 188 and opposed channel openings 188a and 188b.

The forward pendulum assembly 180 includes the pendulum bracket 187, which is coupled to the support arm 181 opposed to the pendulum arm coupling 182. In this embodiment, the pendulum bracket 187 includes the bracket plates 185 and 186. The bracket plates 185 and 186 are coupled together so that the pendulum bracket 187 is an L-bracket. The forward pendulum assembly 180 includes the angled support arms 183 and 184, which extend between the bracket plate 185 and pendulum arm coupling 182. The angled support arms 183 and 184 provide support to the forward pendulum assembly 180.

The forward pendulum assembly 180 can include many different types of materials. In this embodiment, the support arm 181 and angled support arms 183 and 184 include rectangular iron tubing. The pendulum arm coupling 182 includes circular iron tubing. Further, the bracket plates 185 and 186 include angle iron.

The various components of the forward pendulum assembly 180 can be coupled together in many different ways. For example, the support arm 181 and angled support arms 183 and 184 can be coupled to the pendulum arm coupling 182 using fasteners and/or welding. Further, the support arm 181 and angled support arms 183 and 184 can be coupled to the pendulum bracket 187 using fasteners and/or welding.

Figure 6G:
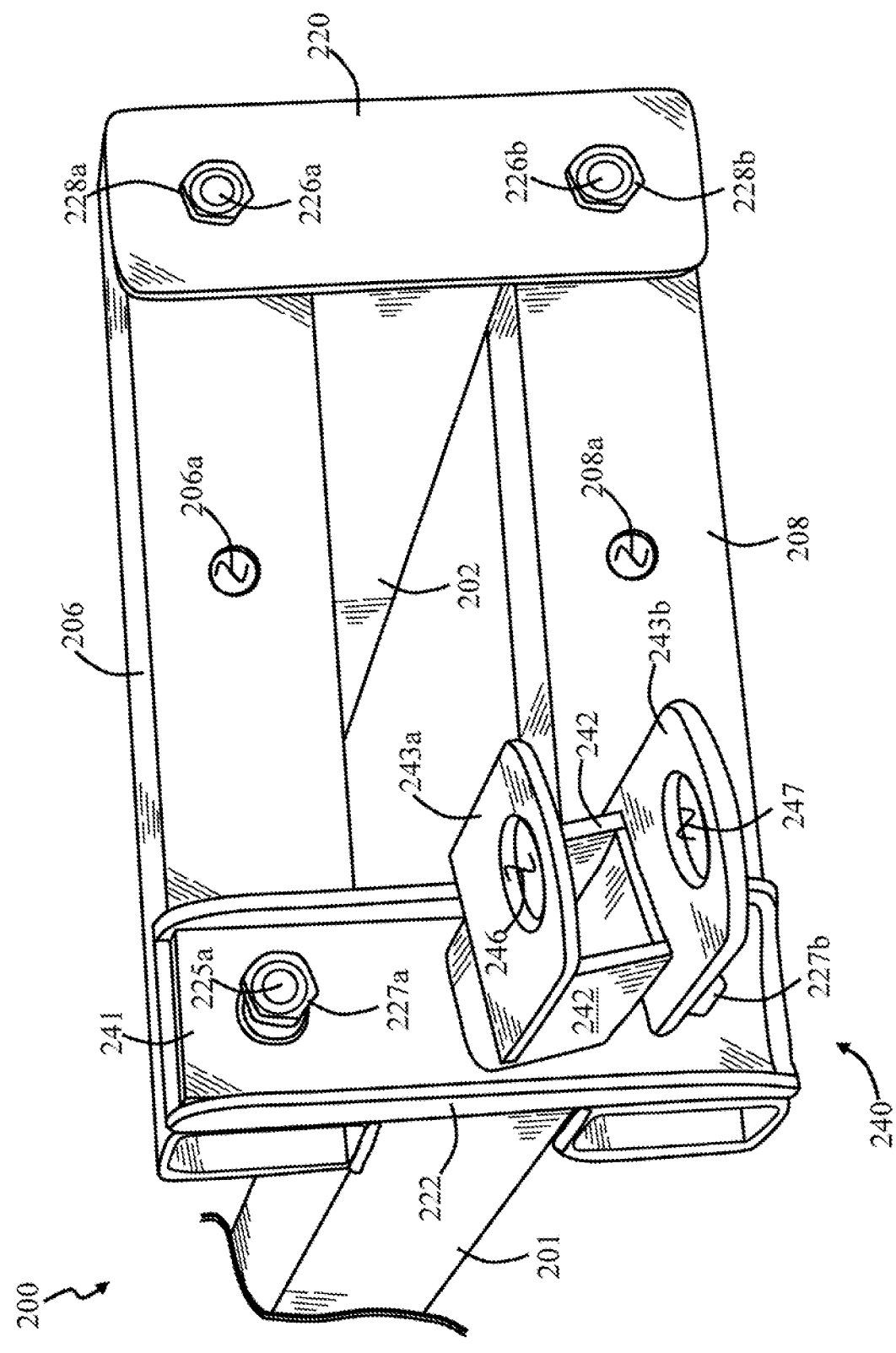
FIG. 6g is a perspective end view of the carriage assembly of FIG. 6e with a boom cylinder coupler coupled thereto.
Figure 6I:
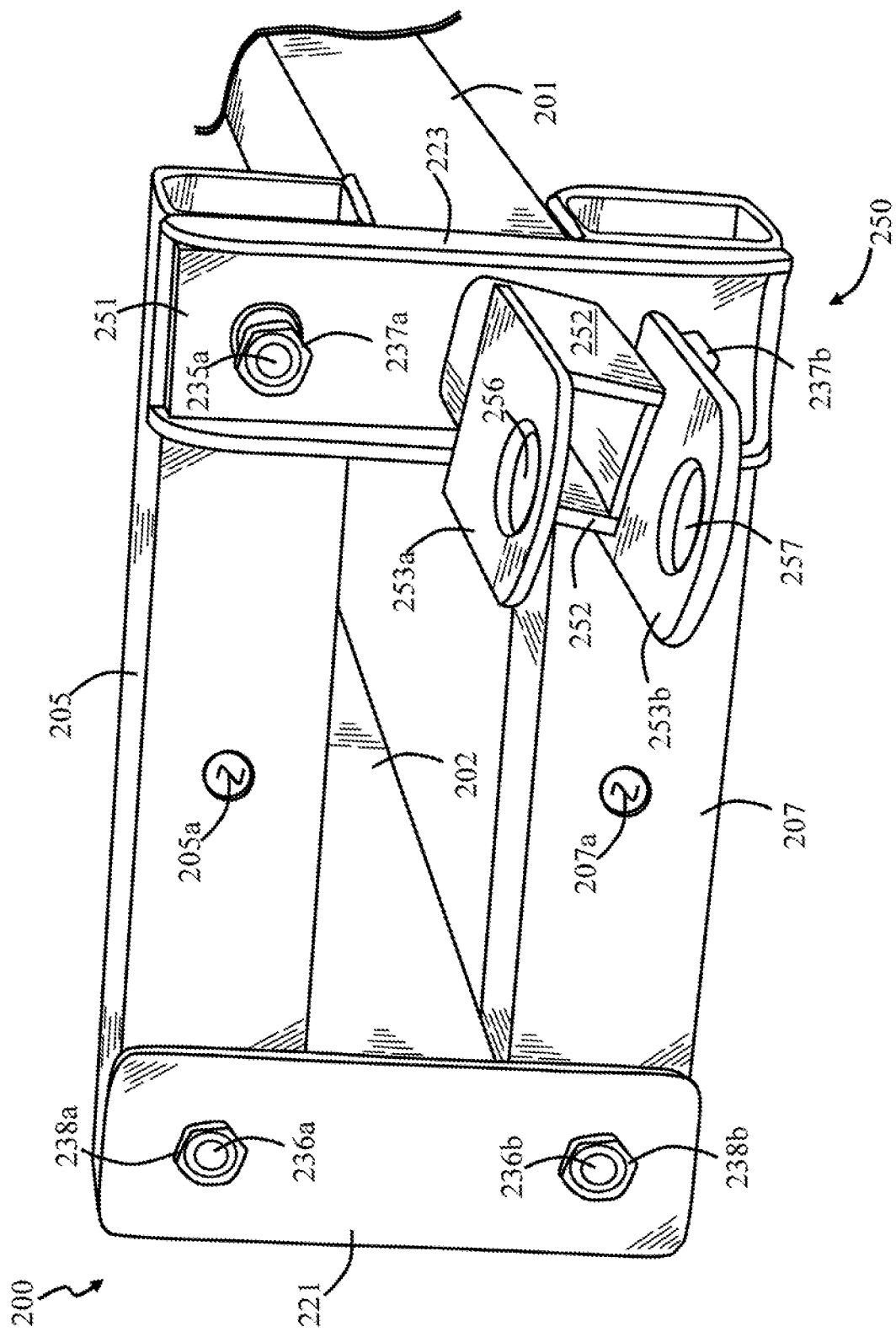
FIG. 6i is a perspective end view of the carriage assembly of FIG. 6f with a boom cylinder coupler coupled thereto.

FIGS. 6a and 6b are top and bottom views, respectively, of the carriage assembly 200 (FIGS. 1a-1f) of the frame assembly 140 of FIGS. 2a-2d. FIG. 6c is a side view of the carriage assembly 200 of FIG. 6a, and FIG. 6d is an opposed side view of the carriage assembly 200. FIG. 6e is an end view of the carriage assembly 200 of FIG. 6a, and FIG. 6f is an opposed end view of the carriage assembly 200. FIG. 6g is a perspective end view of the carriage assembly 200 of FIG. 6e with a boom cylinder coupler 240 coupled thereto, and FIG. 6h is a perspective view of the boom cylinder coupler 240 of FIG. 6g. FIG. 6i is a perspective end view of the carriage assembly 200 of FIG. 6f with a boom cylinder coupler 250 coupled thereto, and FIG. 6*j* is a perspective view of the boom cylinder coupler 250 of FIG. 6*i*.

In this embodiment, the carriage assembly 200 includes lengthened carriage frame members 201 and 202, which are spaced apart from each other. The lengthened carriage frame members 201 and 202 extend parallel to each other. The lengthened carriage frame members 201 and 202 extend substantially perpendicular to the longitudinal axis. 117 (FIG. 1*a*). The carriage assembly 200 includes carriage frame spacers 203 and 204, which are spaced apart from each other and extend between the lengthened carriage frame members 201 and 202. The carriage frame spacers 203 and 204 extend perpendicular to the lengthened carriage frame members 201 and 202. The lengthened carriage frame members 201 and 202 and carriage frame spacers 203 and 204 can include many different types of materials. In this embodiment, the lengthened carriage frame members 201 and 202 and carriage frame spacers 203 and 204 include rectangular iron tubing. The carriage frame spacers 203 and 204 can be coupled to the lengthened carriage frame members 201 and 202 in many different ways, such as by using fasteners and/or welding.

In this embodiment, the carriage assembly 200 includes shortened upper and lower frame members 205 and 207 (FIGS. 6*a*, 6*b*, 6*c*, 6*d*, 6*f* and 6*i*), which are spaced apart from each other by the lengthened carriage frame members 201 and 202. The shortened upper and lower frame members 205 and 207 extend perpendicular to the lengthened carriage frame members 201 and 202 and parallel to the carriage frame spacers 203 and 204. The shortened upper and lower frame members 205 and 207 extend along opposed surfaces of the lengthened carriage frame member 201 (FIGS. 6*c*, 6*d* and 6*i*). Further, shortened upper frame members 205 and 207 extend along opposed surfaces of the lengthened carriage frame member 202 (FIG. 6*d*). The shortened upper and lower frame members 205 and 207 can include many different types of materials. In this embodiment, the shortened upper and lower frame members 205 and 207 include rectangular iron tubing. The shortened upper and lower frame members 205 and 207 can be coupled to the lengthened carriage frame members 201 and 202 in many different ways, such as by using fasteners and/or welding. In this embodiment, the shortened upper and lower frame members 205 and 207 include openings 205*a* and 207*a*, respectively, as shown in FIG. 6*i*.

In this embodiment, the carriage assembly 200 includes shortened upper and lower frame members 206 and 208 (FIGS. 6*a*, 6*b*, 6*c*, 6*d*, 6*e* and 6*g*), which are spaced apart from each other by the lengthened carriage frame members 201 and 202. The shortened upper and lower frame members 206 and 208 extend perpendicular to the lengthened carriage frame members 201 and 202 and parallel to the carriage frame spacers 203 and 204. The shortened upper and lower frame members 206 and 208 extend along opposed surfaces of the lengthened carriage frame member 201 (FIGS. 6*c* and 6*g*). Further, the shortened upper and lower frame members 206 and 208 extend along opposed surfaces of the lengthened carriage frame member 202 (FIGS. 6*b* and 6*g*). The shortened upper and lower frame members 206 and 208 can include many different types of materials. In this embodiment, the shortened upper and lower frame members 206 and 208 include rectangular iron tubing. The shortened upper and lower frame members 206 and 208 can be coupled to the lengthened carriage frame members 201 and 202 in many different ways, such as by using fasteners and/or welding. In this embodiment, the shortened upper and lower frame members 206 and 208 include openings 206*a* and 208*a*, respectively, as shown in FIG. 6*g*.

In this embodiment, the carriage assembly 200 includes a bracket 210 (FIG. 6*a*), which couples the lengthened carriage frame member 202 and shortened upper frame member 206 together and a bracket 211, which couples the lengthened carriage frame member 202 and shortened upper frame member 205 together. In this embodiment, the carriage assembly 200 includes a bracket 212, which couples the lengthened carriage frame member 201 and shortened upper frame member 206 together, and a bracket 213, which couples the lengthened carriage frame member 201 and shortened upper frame member 205 together.

In this embodiment, the carriage assembly 200 includes a bracket 216 (FIG. 6*b*), which couples the lengthened carriage frame member 202 and shortened lower frame member 208 together, and a bracket 217, which couples the lengthened carriage frame member 202 and shortened lower frame member 207 together. In this embodiment, the carriage assembly 200 includes a bracket 214, which couples the lengthened carriage frame member 201 and shortened lower frame member 208 together, and a bracket 215, which couples the lengthened carriage frame member 201 and shortened lower frame member 207 together.

The brackets 210-217 can be of many different types of brackets. In this embodiment the brackets 210-217 are L-brackets, the brackets 210-217 can include many different types of materials. For example, the brackets 210-217 can be made from flat stock material. The brackets 210-217 can be coupled to the lengthened carriage frame members 201 and 202, shortened upper frame members 205 and 206 and shortened lower frame members 207 and 208 in many different ways, such as by using fasteners and/or welding.

In this embodiment, the carriage assembly 200 includes a brace 222, which extends between the shortened upper and lower frame members 206 and 208 (FIGS. 6*e* and 6*g*). The brace 222 includes openings 222*a* and 222*b* (FIG. 6*e*), which are aligned with corresponding openings (not shown) of the shortened upper and lower frame members 206 and 208, respectively. The carriage assembly 200 includes a brace 220 (FIGS. 6*e* and 6*g*), which extends between the shortened upper and lower frame members 206 and 208. The brace 220 includes openings 220*a* and 220*b*, which are aligned with corresponding openings (not shown) of the shortened upper and lower frame members 206 and 208, respectively. The carriage assembly 200 includes a brace 223, which extends between the shortened upper and lower frame members 205 and 207 (FIGS. 6*f* and 6*i*). The brace 223 (FIG. 6*f*) includes openings 223*a* and 223*b*, which are aligned with corresponding openings (not shown) of the shortened upper and lower frame members 205 and 207, respectively. The carriage assembly 200 includes a brace 221 (FIGS. 6*f* and 6*i*), which extends between the shortened upper and lower frame members 205 and 207. The brace 221 includes openings 221*a* and 221*b*, which are aligned with corresponding openings (not shown) of the shortened upper and lower frame members 205 and 207, respectively.

The braces 220-223 can include many different materials. In this embodiment, the braces 222 and 223 include channel iron and the braces 220 and 221 include flat stock material. The braces 220 and 222 can be coupled to the shortened upper and lower frame members 206 and 208 in many different ways, such as by using fasteners and/or welding. Further, the braces 221 and 223 can be coupled to the shortened upper and lower frame members 205 and 207 in many different ways, such as by using fasteners and/or welding.

Referring to FIGS. 6g and 6h, the boom cylinder coupler 240 is coupled to the brace 222 (FIG. 6g). In this embodiment, the boom cylinder coupler 240 includes a coupler support member 241 (FIG. 6h), which includes coupler support member openings 241a and 241b extending therethrough. The boom cylinder coupler 240 includes a support arm 242 with an end coupled to the coupler support member 241. In this embodiment, the support arm 242 is positioned between the coupler support member openings 241a and 241b. The boom cylinder coupler 240 includes upper and lower brace plates 243a and 243b with corresponding ends coupled to opposed sides of the support arm 242. The boom cylinder coupler 240 includes a pin 245 (FIG. 6h), which extends between the upper and lower brace plates 243a and 243b. In particular, the pin 245 extends through upper and lower brace plate openings 246 and 247 (FIG. 6g), and a pin head 244 of the pin 245 is engaged to the upper brace plate 243a (FIG. 6h).

The boom cylinder coupler 240 can include many different types of material. In this embodiment, the support arm 242 includes rectangular channel iron, and the coupler support member 241 and upper and lower brace plates 243a and 243b include flat stock material. The components of the boom cylinder coupler 240 can be coupled together in many different ways. The support arm 242 can be coupled to the coupler support member 241 using fasteners and/or welding. Further, the upper and lower brace plates 243a and 243b can be coupled to the coupler support member 241 using fasteners and/or welding.

The boom cylinder coupler 240 can be coupled to the brace 222 in many different ways. In this embodiment, the coupler support member openings 241a and 241b are aligned with fasteners 225a and 225b (FIG. 6c), respectively, which extend through the openings 222a and 222b (FIG. 6e), respectively, as well as through the corresponding openings of the shortened upper frame member 206 and shortened lower frame member 208, respectively. The fasteners 225a and 225b (FIGS. 6c and 6g) are moved through the coupler support member openings 241a and 241b (FIG. 6h), as shown in FIG. 6g. The nuts 227a and 227b are threadingly engaged with the fasteners 225a and 225b, respectively, so that the coupler support member 241 is held to the brace 222.

In this embodiment, the brace 220 is coupled to the shortened upper and lower frame members 206 and 208 (FIGS. 6e and 6g). The brace 220 can be coupled to the shortened upper and lower frame members 206 and 208 in many different ways. In this embodiment, the openings 220a and 220b (FIG. 6e) are aligned with fasteners 226a and 226b (FIGS. 6d and 6g), respectively. The fasteners 226a and 226b are moved through the openings 220a and 220b, respectively, as shown in FIGS. 6e and 6g, as well as through the corresponding openings of the shortened upper frame member 206 and shortened lower frame member 208, respectively. The nuts 228a and 228b are threadingly engaged with the fasteners 226a and 226b, respectively, so that the brace 220 is held to the shortened upper and lower frame members 206 and 208.

Referring to FIGS. 6i and 6j, a boom cylinder coupler 250 is coupled to the brace 223 (FIG. 6i). In this embodiment, the boom cylinder coupler 250 includes a coupler support member 251 (FIG. 6j), which includes coupler support member openings 251a and 251b extending therethrough (FIG. 6j). The boom cylinder coupler 250 includes a support arm 252 with an end coupled to the coupler support member 251. In this embodiment, the support arm 252 is positioned between the coupler support member openings 251a and 251b. The boom cylinder coupler 250 includes upper and lower brace plates 253a and 253b with corresponding ends coupled to opposed bides of the support arm 252. The boom cylinder coupler 250 includes a pin 255 (FIG. 6j), which extends between upper and lower brace plates 253a and 253b. In particular, the pin 255 extends through upper and lower brace plate openings 256 and 257 (FIG. 6i), and a pin head 254 of the pin 255 is engaged to the upper brace plate 253a (FIG. 6j).

The boom cylinder coupler 250 can include many different types of material. In this embodiment, the support arm 252 includes rectangular channel iron and the coupler support member 251 and upper and lower brace plates 253a and 253b include flat stock material. The components of the boom cylinder coupler 250 can be coupled together in many different ways. The support arm 252 can be coupled to the coupler support member 251 using fasteners and/or welding. Further, upper and lower brace plates 253a and 253b can be coupled to the coupler support member 251 using fasteners and/or welding.

The boom cylinder coupler 250 can be coupled to the brace 223 in many different ways. In this embodiment the coupler support member openings 251a and 251b are aligned with fasteners 235a and 235b (FIG. 6c), respectively, which extend through the openings 223a and 223b (FIG. 6f), respectively, as well as through the corresponding openings of the shortened upper frame member 205 and shortened lower frame member 207, respectively. The fasteners 235a and 235b (FIGS. 6c and 6i) are moved through the coupler support member openings 251a and 251b (FIG. 6j), as shown in FIG. 6i. The nuts 237a and 237b are threadingly engaged with the fasteners 235a and 235b, respectively, so that the coupler support member 251 is held to the brace 223.

In this embodiment, the brace 221 is coupled to the shortened upper and lower frame members 205 and 207 (FIGS. 6f and 6i). The brace 221 can be coupled to the shortened upper and lower frame members 205 and 207 in many different ways. In this embodiment, the openings 221a and 221b are aligned with fasteners 236a and 236b, respectively. The fasteners 236a and 236b are moved through the openings 221a and 221b, respectively, as shown in FIGS. 6f and 6i, as well as through the corresponding openings of the shortened upper frame member 205 and shortened lower frame member 207, respectively. The nuts 238a and 238b are threadingly engaged with the fasteners 236a and 236b, respectively, so that the brace 221 is held to the shortened upper and lower frame members 205 and 207.

Figure 7A:
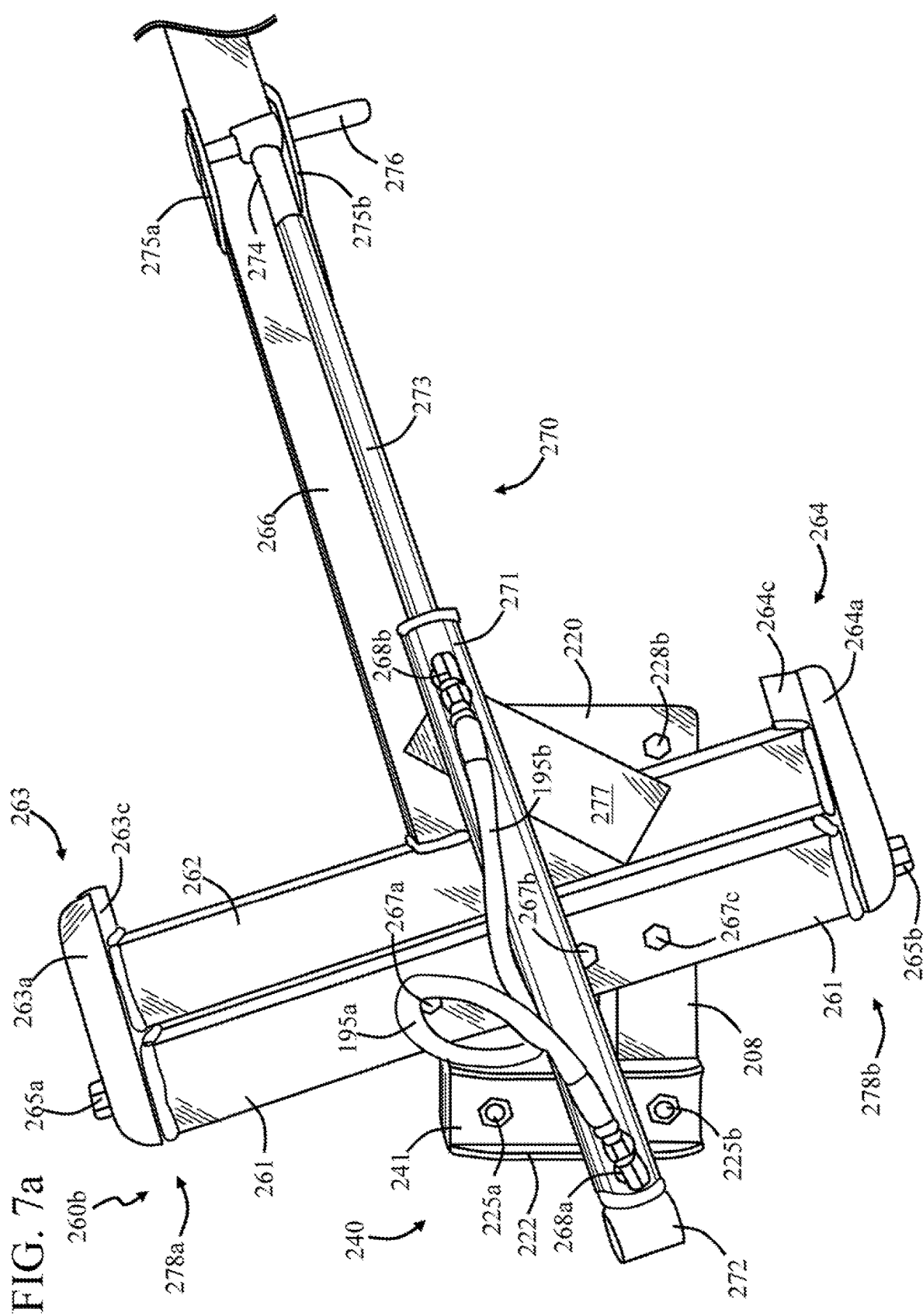
Figure 7B:
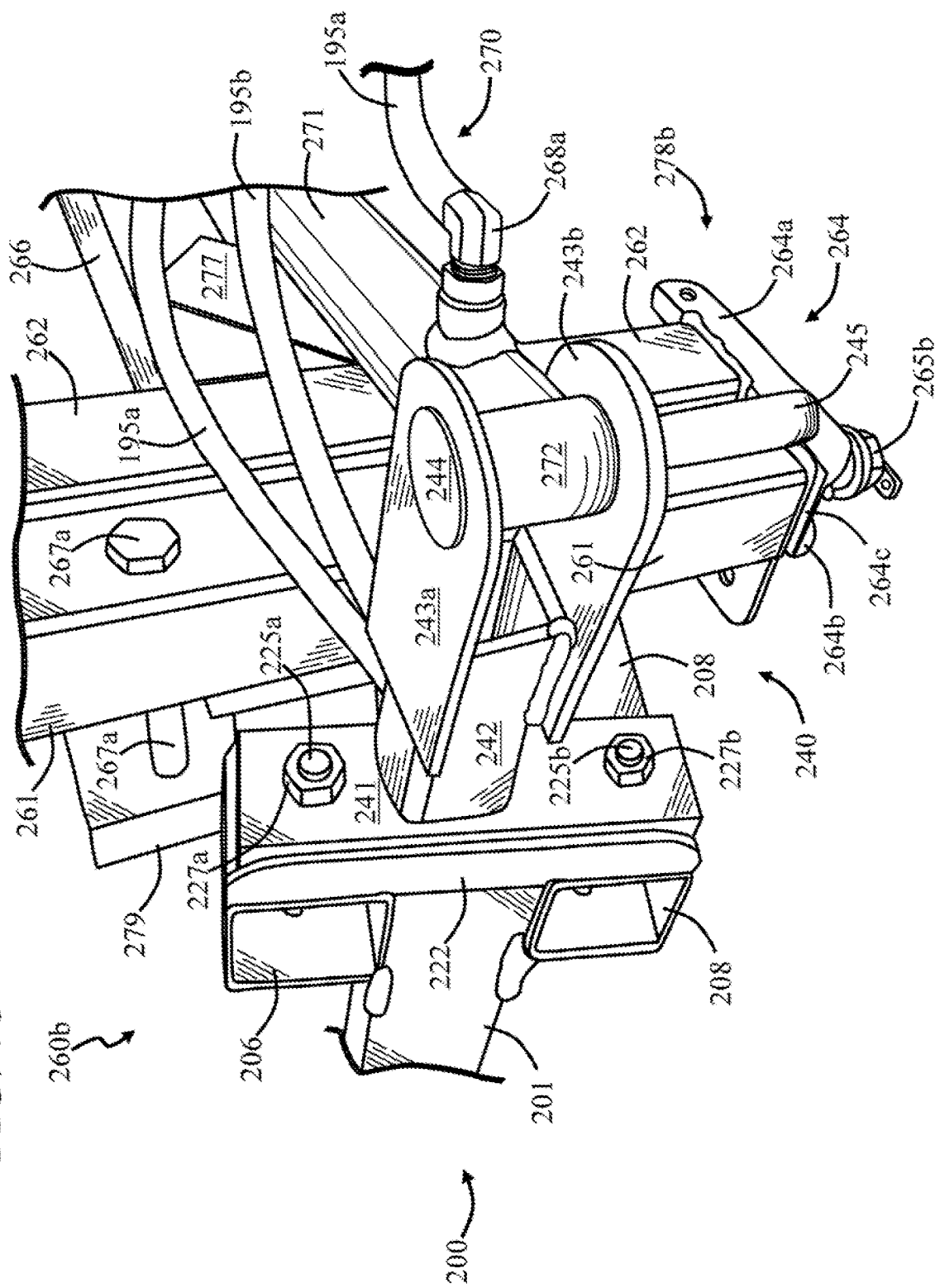

FIG. 7a is a side perspective view of the boom hinge assembly 260b of the crop spraying apparatus 120 of FIG. 1a, and FIG. 7b is a rear perspective view of the boom hinge assembly 260b of FIG. 7a. FIG. 7c is a front perspective view of the boom hinge assembly 260b of FIG. 7a, and FIG. 7d is an opposed rear perspective view of the boom hinge assembly 260b of FIG. 7a.

In this embodiment, the boom hinge assembly 260b includes a hinge support arm 261, which is coupled to the shortened upper and lower frame members 206 and 208. The hinge support arm 261 can include many different types of material. In this embodiment, the hinge support arm 261 includes rectangular tubing. The lunge support arm 261 can be coupled to the shortened upper and lower frame members 206 and 208 in many different ways. In this embodiment, a bracket 276 is positioned adjacent to the shortened upper and lower frame members 206 and 208 at a position opposed to the hinge support arm 261, as shown in FIGS. 7b and 7d. Fasteners 267a and 267b (FIGS. 7a-7d) are extended through the hinge support arm 261 and corresponding openings of the bracket 276. Nuts 259a and 259b (FIG. 7d) are threadingly engaged with fasteners 267a and 267b, respectively, so that the bracket 279 and hinge support arm 261 are held to the shortened upper and lower frame members 206 and 208. It should be noted that the fasteners 267a and 267b extend proximate to opposed sides of the shortened upper frame member 206, wherein the fastener 267b extends between the shortened upper and lower frame members 206 and 208. A fastener 267c (FIGS. 7a, 7b and 7d) extends through the hinge support arm 261 and lower frame member 208. The nut 259c is threadingly engaged with the fastener 267c, as shown in FIG. 7d.

Figure 7D:
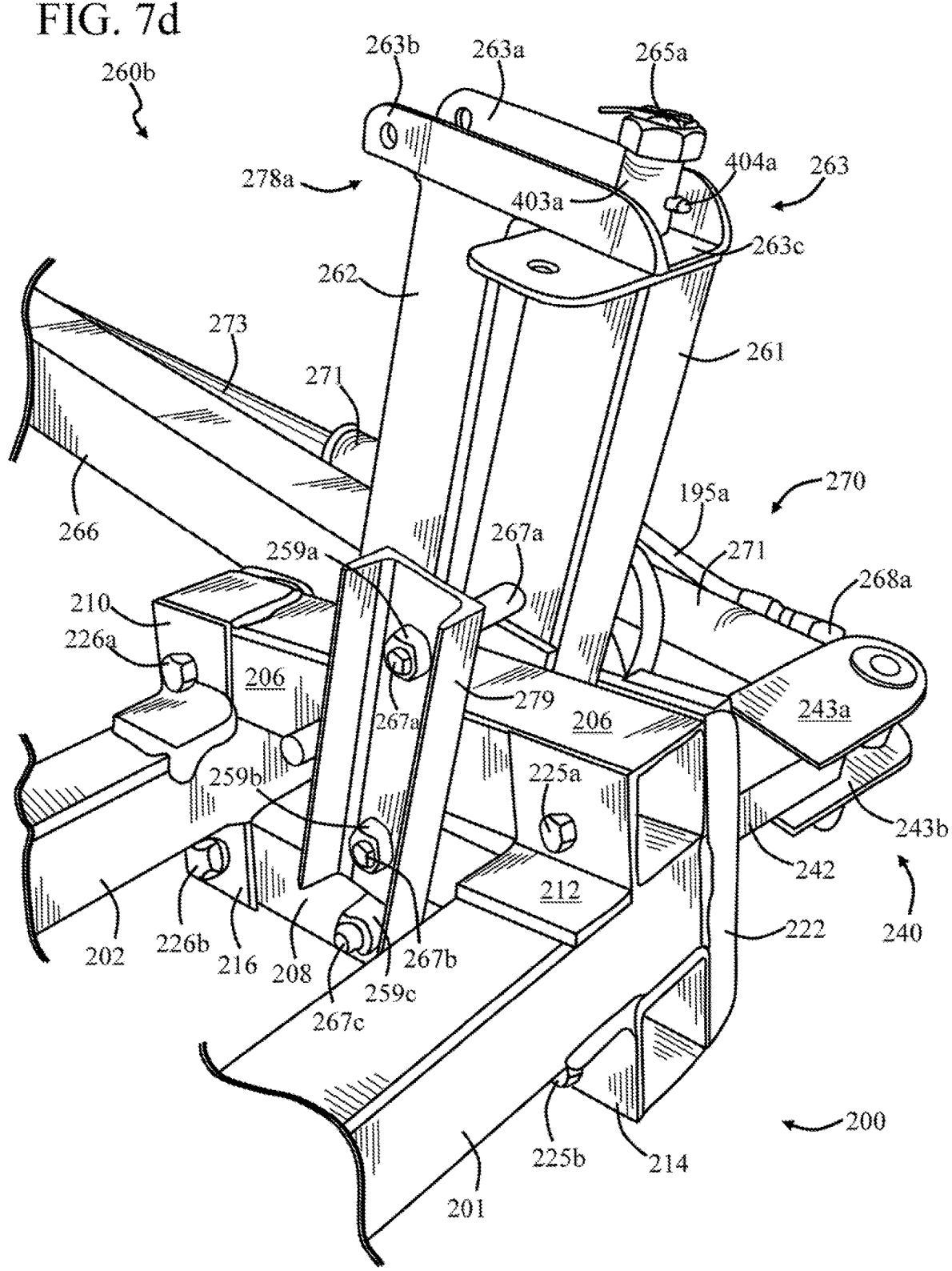

In this embodiment, the boom hinge assembly 260b includes a hinge rotation arm 262, which is coupled to the hinge support arm 261, as shown in FIGS. 7a, 7b and 7d. The hinge rotation arm 262 can include many different types of material. In this embodiment, the hinge rotation arm 262 includes rectangular tubing. The hinge rotation am 262 can be coupled to the hinge support arm 261 in many different ways.

In this embodiment, a coupler 263 (FIGS. 7a and 7d) is fixedly attached to the hinge rotation arm 262, and extends rearwardly proximate to an upper end of the hinge support arm 261. The coupler 263 can have many different structures and include many different types of material. In this embodiment, the coupler 263 is a piece of channel iron and includes opposed sidewalls 263a and 263b and a base plate 263c (FIG. 7d). The base plate 263c is positioned towards corresponding ends of the hinge support arm 261 and hinge rotation arm 262. The opposed sidewalls 263a and 263b are coupled to opposed sides of the base plate 263c and extend away from the hinge support arm 261 and hinge rotation arm 262. In this embodiment, the coupler 263 is fixedly attached to the hinge rotation arm 262 by welding the base plate 263c thereto.

In this embodiment, a coupler 264 (FIGS. 7a and 7b) is fixedly attached to the hinge rotation arm 262, and extends rearwardly proximate to a lower end of the hinge support arm 261. The coupler 264 can have many different structures and include many different types of material. In this embodiment, the coupler 264 is a piece of channel iron and includes opposed sidewalls 264a and 264b, and a base plate 264c (FIGS. 7a and 7b). The base plate 264c is positioned towards corresponding ends of the hinge support arm 261 and hinge rotation arm 262. The opposed sidewalls 264a and 264b are coupled to opposed sides of the base plate 264c and extend away from the hinge support arm 261 and hinge rotation arm 262. In this embodiment, the coupler 264 is fixedly attached to the hinge rotation arm 262 by welding the base plate 264c thereto. It should be noted that the hinge rotation arm 262 extends between couplers 263 and 264.

Figure 7E:
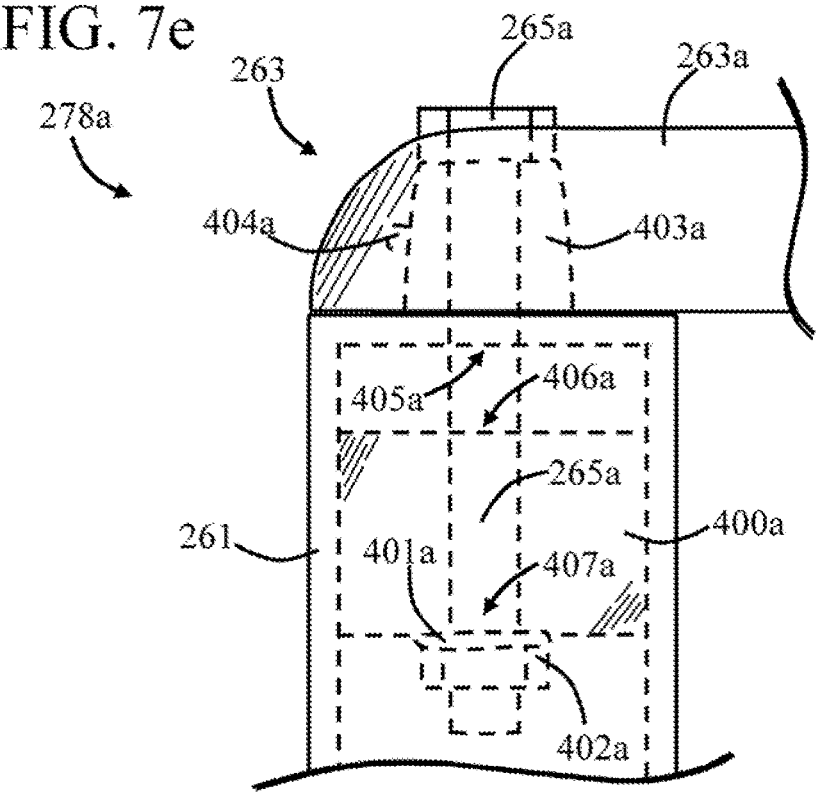
FIG. 7e is a close-up view of a region of FIG. 7a, wherein portions thereof are shown in phantom to show how a first hinge support arm and first coupler are coupled together.

FIG. 7e is a close-up view of a region 278a of FIG. 7a, wherein portions thereof are shown in phantom to show how the hinge support arm 261 and coupler 263 are coupled together. In this embodiment, a support piece 400a is positioned within the hinge support arm 261, wherein the support piece 400a is a piece of rectangular tubing welded to opposed interior sides of the hinge support arm 261. The support piece 400a includes opposed openings 406a and 407a, which are aligned with an opening 405a of the hinge support arm 261. A nut 402a is welded to the support piece 400a proximate to the opening 407a using a weldment 401a, wherein the opening of the nut 402a is aligned with opposed openings 406a and 407a. A support bushing 403a is positioned proximate to the opening 405a and between the opposed sidewalls 263a and 263b, and is welded to the base plate 263c. The support bushing 403a includes an opening that is aligned with the opening 405a. The support bushing 403a includes a grease fitting 404a tor flowing grease into the opening of the support bushing 403a to provide lubricant for a fastener, which extends therethrough, as will be discussed in more detail presently. A fastener 265a (FIGS. 7a, 7d and 7e) is extended through the opening of the support bushing 403a, as well as through openings 405a, 406a and 407a, wherein the fastener 265a is threadingly engaged with the nut 402a. In operation, the support bushing 403a and coupler 263 rotate in response to the rotation of the hinge rotation arm 262. In this way, the hinge rotation arm 262 can rotate relative to the hinge support arm 261.

Figure 7F:
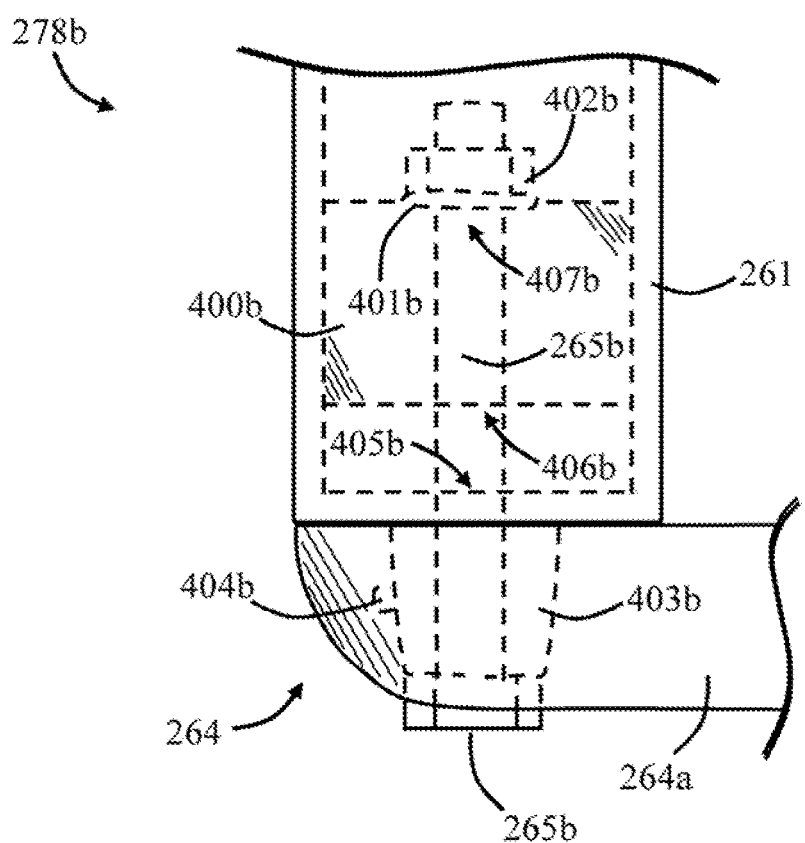
FIG. 7f is a close-up view of a region of FIG. 7a, wherein portions thereof are shown in phantom to show how a second hinge support arm and second coupler are coupled together.

FIG. 7f is a close-up view of a region 278b of FIG. 7a, wherein portions thereof are shown in phantom to show how the hinge support arm 261 and coupler 264 are coupled together. In this embodiment, a support piece 400b is positioned within the hinge support arm 261, wherein the support piece 400b is a piece of rectangular tubing welded to opposed interior sides of the hinge support arm 261. The support piece 400b includes opposed openings 406b and 407b, which are aligned with an opening 405b of the hinge support arm 261. A nut 402b is welded to the support piece 400b proximate to the opening 407b using a weldment 401b, wherein the opening of the nut 402b is aligned with opposed openings 406b and 407b. A support bushing 403b is positioned proximate to the opening 405b and between the opposed sidewalls 264a and 264b. The support bushing 403b includes an opening that is aligned with the opening 405b. The support bushing 403b includes a grease lilting 404b for flowing grease into the opening of the support bushing 403b to provide lubricant for a fastener, which extends therethrough, as will be discussed in more detail presently. A fastener 265b (FIGS. 7a, 7b and 7f) is extended through the opening of the support bushing 403b, as well as through openings 405b, 406b and 407b, wherein the fastener 265b is threadingly engaged with the nut 402b. In operation, the support bushing 403b and coupler 264 rotate in response to the rotation of the hinge rotation arm 262. In this way, the binge rotation arm 262 can rotate relative to the hinge support arm 261.

In this embodiment, and as shown in FIGS. 7a, 7b and 7d, the boom hinge assembly 260b includes a boom support arm 266 coupled to the hinge rotation arm 262. The boom support arm 266 can be coupled to the hinge rotation arm 262 in many different ways. In this embodiment, the boom support arm 266 is welded to the hinge rotation arm 262 so that the boom support arm 266 extends perpendicular to the hinge rotation arm 262 and away from the hinge support arm 261. It should be noted that the boom support arm 266 rotates in response to the rotation of the hinge rotation arm 262, as discussed in more detail above. The boom support arm 266 can include many different types of material. In this embodiment, the boom support arm 266 includes rectangular tubing.

In this embodiment, the boom hinge assembly 260b includes a bracket 277 (FIGS. 7a and 7b), which is coupled to the hinge support arm 261 and hinge rotation arm 262. The bracket 277 can be coupled to the hinge support arm 261 and hinge rotation arm 262 in many different ways. In this embodiment, the bracket 277 is welded to the hinge support arm 261 and hinge rotation arm 262 to provide support thereto. The bracket 277 restricts the ability of the hinge rotation arm 262 to move relative to the hinge support arm 261. The bracket 277 can include many different types of material. In this embodiment, the bracket 277 includes flat stock material.

In this embodiment, the boom hinge assembly 260b includes opposed brackets 275a and 275b (FIG. 7a), which are coupled to opposed sides of the boom support arm 266. A pin 276 extends through openings (not shown) of the opposed brackets 275a and 275b. The opposed brackets 275a and 275b can be coupled to the boom hinge assembly 260b in many different ways, such as by using welding. The opposed brackets 275a and 275b and pin 276 are for coupling a hydraulic cylinder to the hinge support arm 261, as will be discussed in more detail presently.

In this embodiment, the boom hinge assembly 260b includes a boom fold cylinder 270 (FIG. 7a), which includes a boom fold cylinder body 271 and boom fold cylinder arm 273 (FIGS. 7a-7d). The boom fold cylinder 270 is connected to hydraulic line couplers 268a and 268b, and allows hydraulic fluid to flow to and from the boom fold cylinder 270. A boom fold cylinder coupler 274 (FIG. 7a) is coupled to the boom fold cylinder arm 273, and the boom fold cylinder coupler 274 is coupled to the opposed brackets 275a and 275b by extending the pin 276 therethrough. A boom fold cylinder body 271 is coupled to an end of the boom fold cylinder body 271 opposed to the boom fold cylinder arm 273 (FIGS. 7a-7c). The boom fold cylinder body 271 (FIG. 7a) is coupled to the boom cylinder coupler 240 by positioning the boom fold cylinder body 271 between the upper and lower brace plates 243a and 243b, and extending the pin 245 through the boom fold cylinder body 271 (FIGS. 6h and 7b).

It should be noted that the boom fold cylinder 270 can be hydraulically coupled to the hydraulic system of the prime mover 101 (FIGS. 1b, 1c, 1d, 1e, 1f and 9b). In this embodiment, the hydraulic lines 195a and 195b (FIG. 7a) are coupled to the boom fold cylinder 270. The hydraulic lines 195a and 195b are coupled to the hydraulic system of the prime mover 101.

Figure 8A:
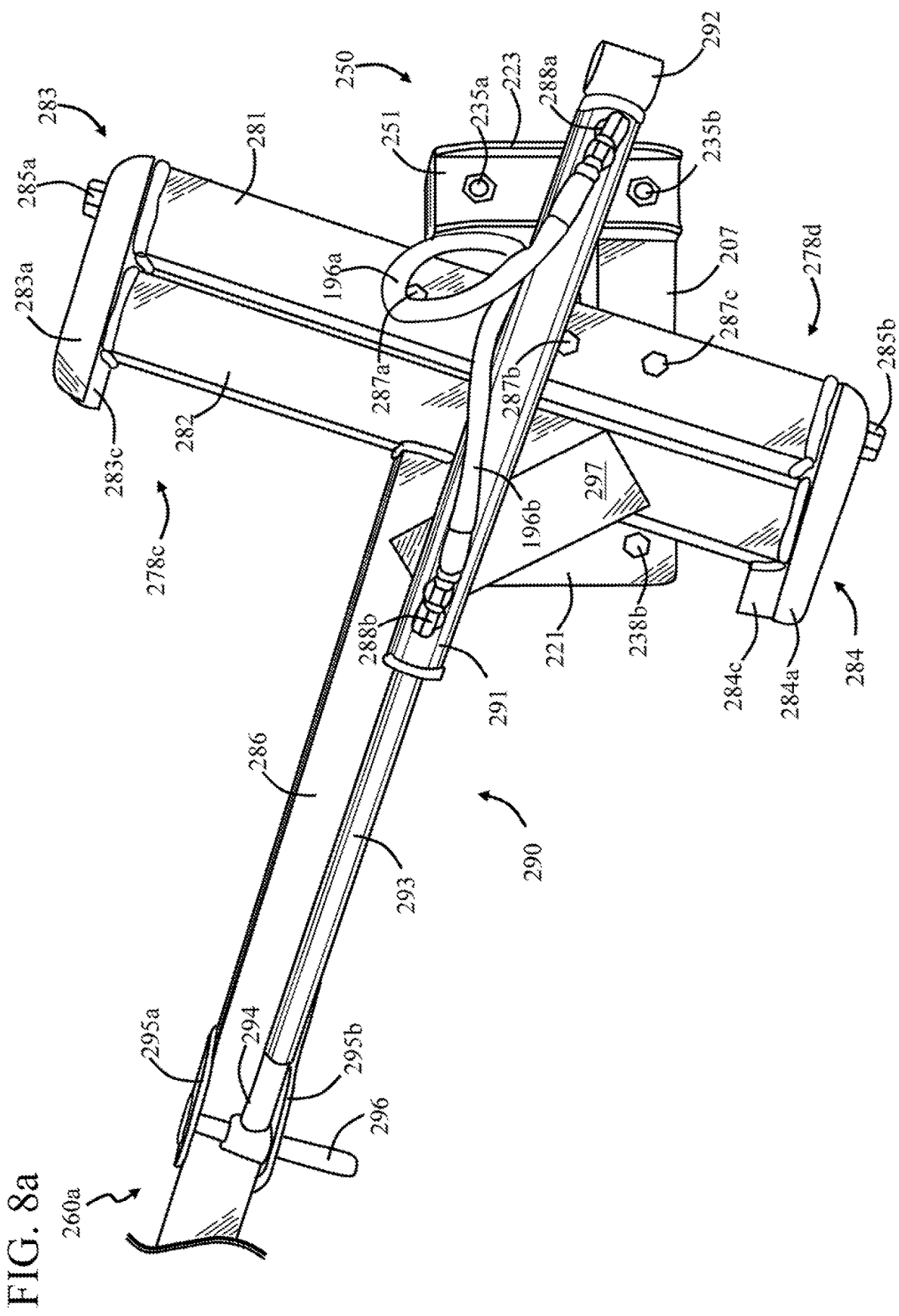
Figure 8B:
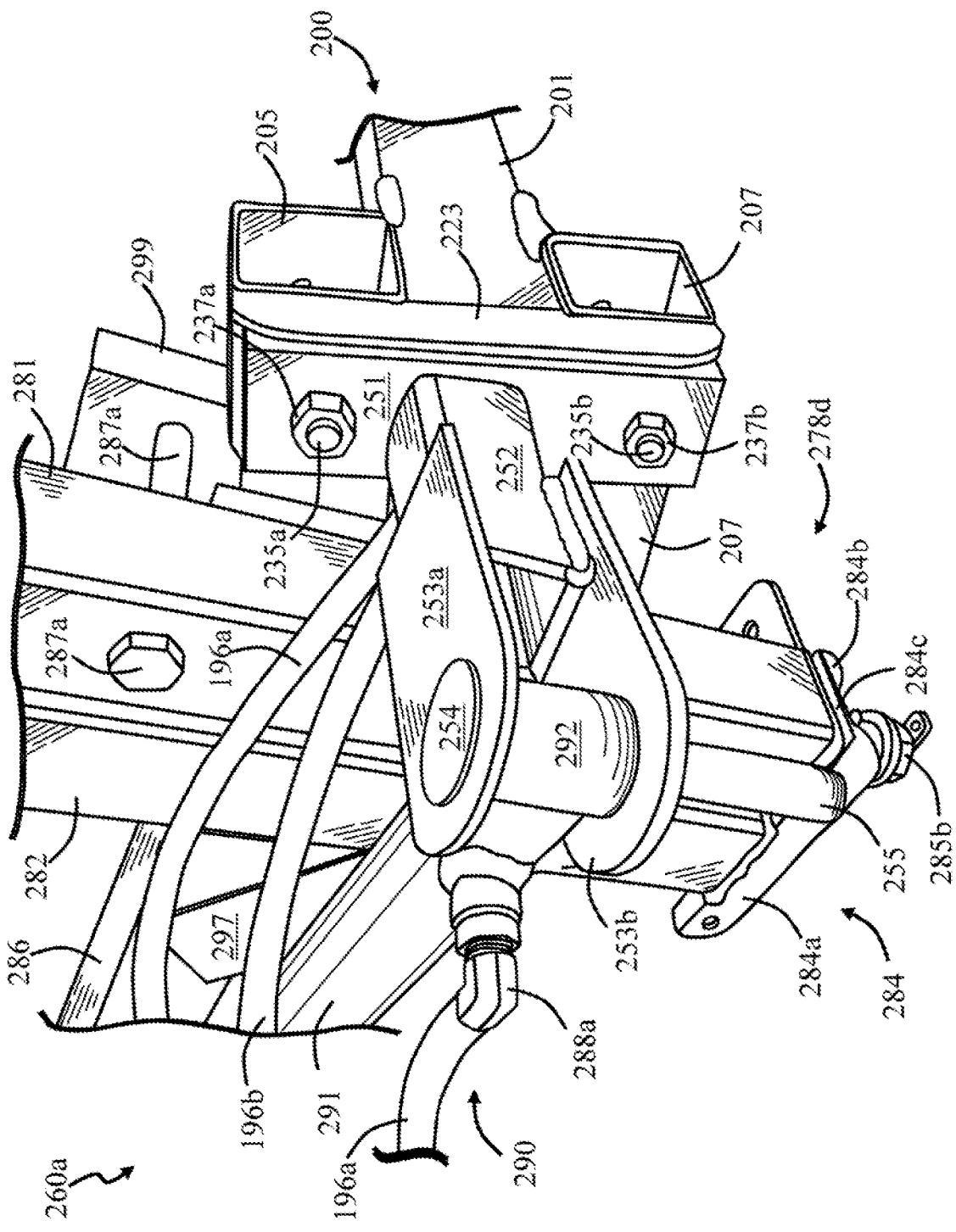
Figure 8C:
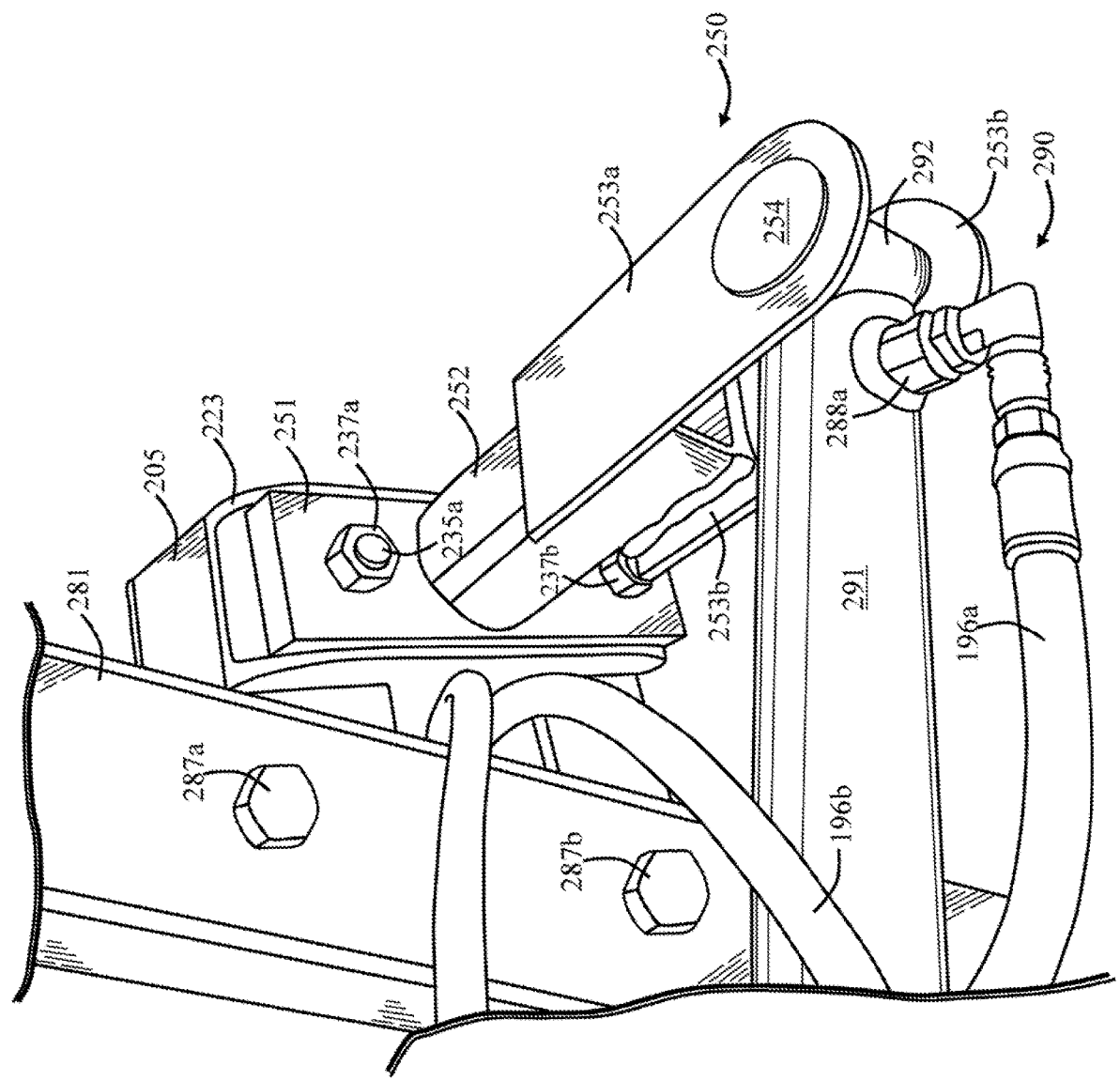

FIG. 8a is a side perspective view of the boom hinge assembly 260a of the crop spraying apparatus 120 of FIG. 1a, and FIG. 8b is a rear perspective view of the boom hinge assembly 260a of FIG. 8a. FIG. 8c is a front perspective view of the boom cylinder coupler 250 of FIG. 8a, and FIG. 8d is an opposed rear perspective view of the boom hinge assembly 260a of FIG. 8a.

In this embodiment, the boom hinge assembly 260a includes a hinge support arm 281, which is coupled to the shortened upper and lower frame members 205 and 207. The hinge support arm 281 can include many different types of material. In this embodiment, the hinge support arm 281 includes rectangular tubing. The hinge support arm 281 can be coupled to the shortened upper and lower frame members 205 and 207 in many different ways. In this embodiment, a bracket 299 is positioned adjacent to the shortened upper and lower frame members 205 and 207 at a position opposed to the hinge support arm 281, as shown in FIGS. 8b and 8d. Fasteners 287a and 287b (FIGS. 8a-8d) are extended through the hinge support arm 281 and corresponding openings of the bracket 299. Nuts 249a and 249b (FIG. 8d) are threadingly engaged with the fasteners 287a and 287b, respectively, so that the bracket 299 and hinge support arm 281 are held to the shortened upper and lower frame members 205 and 207. It should be noted that the fasteners 287a and 287b extend proximate to opposed sides of the shortened upper frame member 205, wherein the fastener 287b extends between the shortened upper and lower frame members 205 and 207. A fastener 287c (FIGS. 8a and 8d) extends through the hinge support arm 281 and lower frame member 207. The nut 249c is threadingly engaged with the fastener 287c, as shown in FIG. 8d.

Figure 8D:
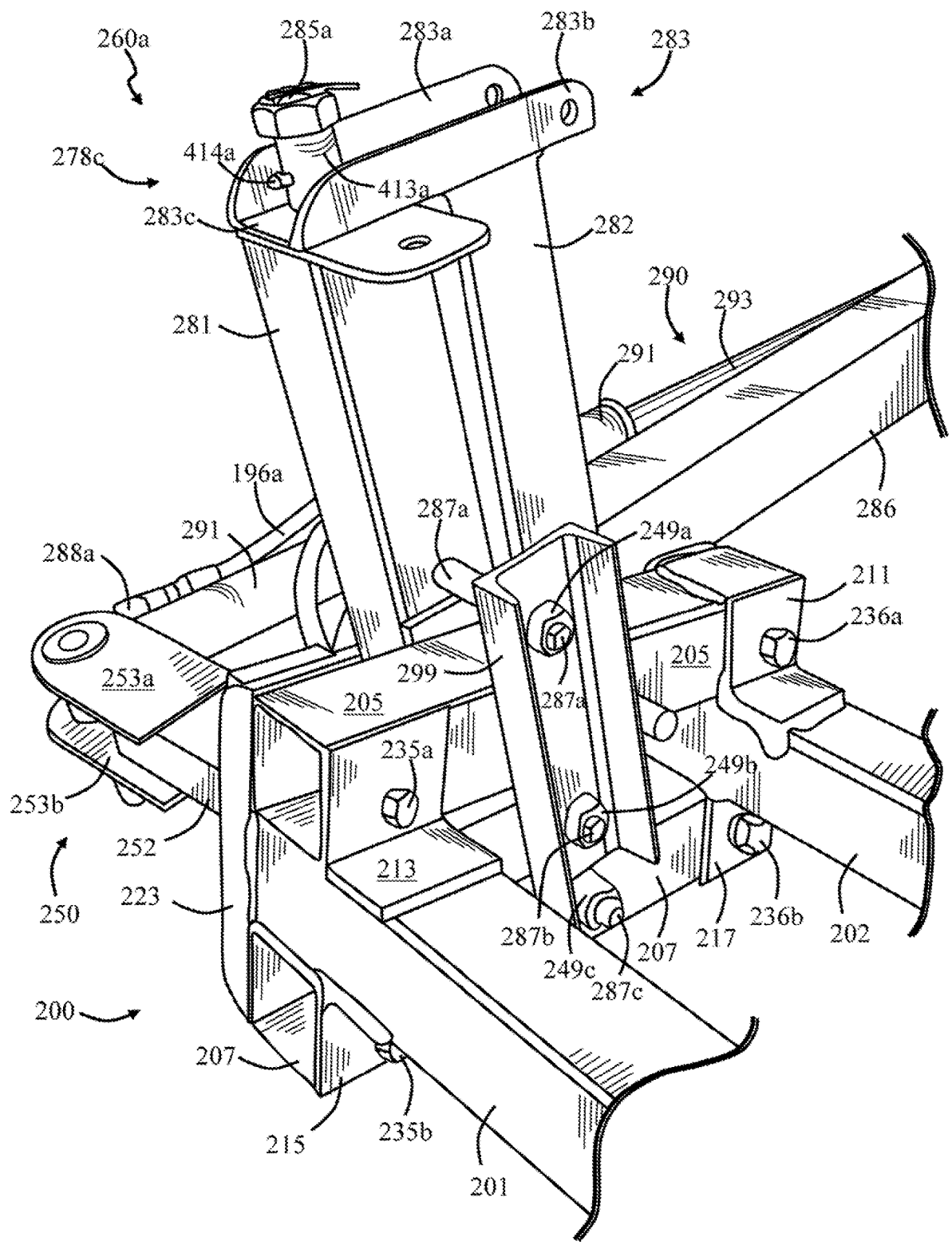

In this embodiment, the boom hinge assembly 260a includes a hinge rotation arm 282, which is coupled to the hinge support arm 281 as shown in FIGS. 8a, 8b and 8d the hinge rotation arm 282 can include mans different types of material. In this embodiment, the hinge rotation arm 282 includes rectangular tubing. The hinge rotation arm 282 can be coupled to the hinge support arm 281 in many different ways. In this embodiment, a coupler 283 (FIGS. 8a and 8b) fixedly attached to the hinge rotation arm 282, and extends rearwardly proximate to an upper end of the hinge support arm 281. The coupler 283 can have many different structures and include many different types of material. In this embodiment, the coupler 283 is a piece of channel iron and includes opposed sidewalls 283a and 283b and a base plate 283c. The base plate 283c is positioned towards corresponding ends of the hinge support arm 281 and hinge rotation arm 282. The opposed sidewalls 283a and 283b are coupled to opposed sides of the base plate 283c and extend away from the hinge support arm 281 and hinge rotation arm 282. In this embodiment, the coupler 283 is fixedly attached to the hinge rotation arm 282 by welding the base plate 283c thereto.

In this embodiment, a coupler 284 (FIGS. 8a and 8b) fixedly attached to the hinge rotation arm 282, and extends rearwardly proximate to a lower end of the hinge support arm 281. The coupler 284 can have many different structures and include many different types of material. In this embodiment, the coupler 284 is a piece of channel iron and includes opposed sidewalls 284a and 284b and a base plate 284c. The base plate 284c is positioned towards corresponding ends of the hinge support arm 281 and hinge rotation arm 282. The opposed sidewalls 284a and 284b are coupled to opposed sides of the base plate 284c and extend away from the hinge support arm 281 and hinge rotation arm 282. In this embodiment, the coupler 284 is fixedly attached to the hinge rotation arm 282 by welding the base plate 284c thereto. It should be noted that the hinge rotation arm 282 extends between couplers 283 and 284.

Figure 8E:
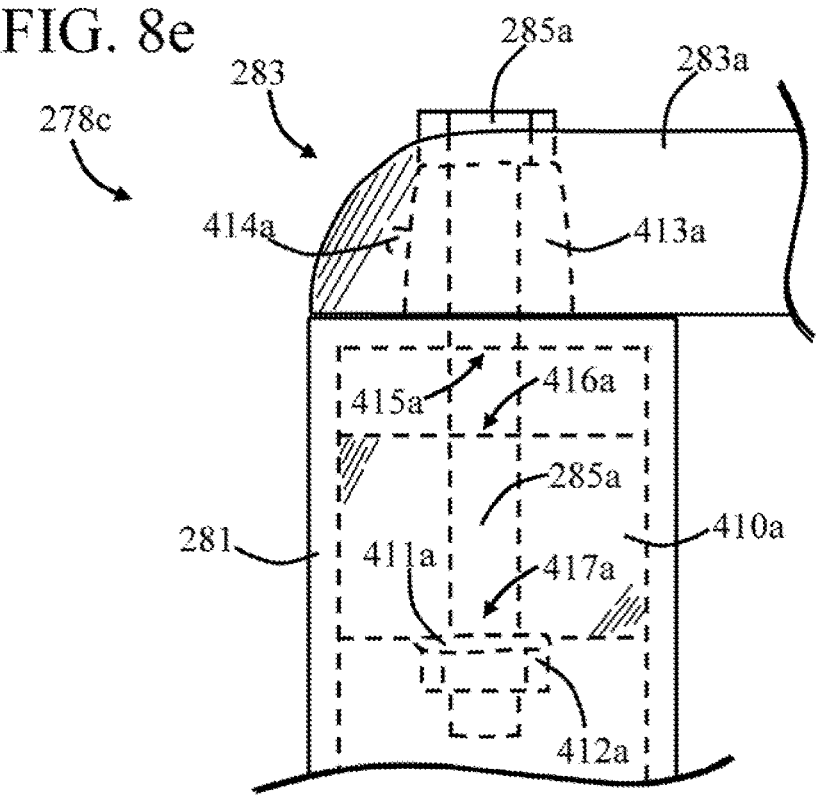
FIG. 8e is a close-up view of a region of FIG. 8a, wherein portions thereof are shown in phantom to show how a third hinge support arm and third coupler are coupled together.

FIG. 8e is a close-up view of a region 278c of FIG. 8d, wherein portions thereof are shown in phantom to show how the hinge support arm 281 and coupler 283 are coupled together. In this embodiment, a support piece 410a is positioned within the hinge support arm 281, wherein the support piece 410a is a piece of rectangular tubing welded to opposed interior sides of the hinge support arm 281. The support piece 410a includes opposed openings 416a and 417a, which are aligned with an opening 415a of the hinge support arm 281. A nut 412a is welded to the support piece 410a proximate to the opening 417a using a weldment 411a, wherein the opening of the nut 412a is aligned with opposed openings 416a and 417a. A support bushing 413a is positioned proximate to the opening 415a and between the opposed sidewalls 283a and 283b, and is welded to the base plate 283c. The support bushing 413a includes an opening that is aligned with the opening 415a. The support bushing 413a includes a grease fining 414a for flowing grease into the opening of the support bushing 413a to provide lubricant for a fastener, which extends therethrough, as will be discussed in more detail presently. A fastener 285a (FIGS. 8a, 8d and 8c) is extended (through the opening of the support bushing 413a, as well as through openings 415a, 416a and 417a, wherein the fastener 285a is threadingly engaged with the nut 412a. In operation, the support bushing 413a and coupler 283 rotate in response to the rotation of the hinge rotation arm 282. In this way, the hinge rotation arm 282 can rotate relative to the hinge support arm 281.

Figure 8F:
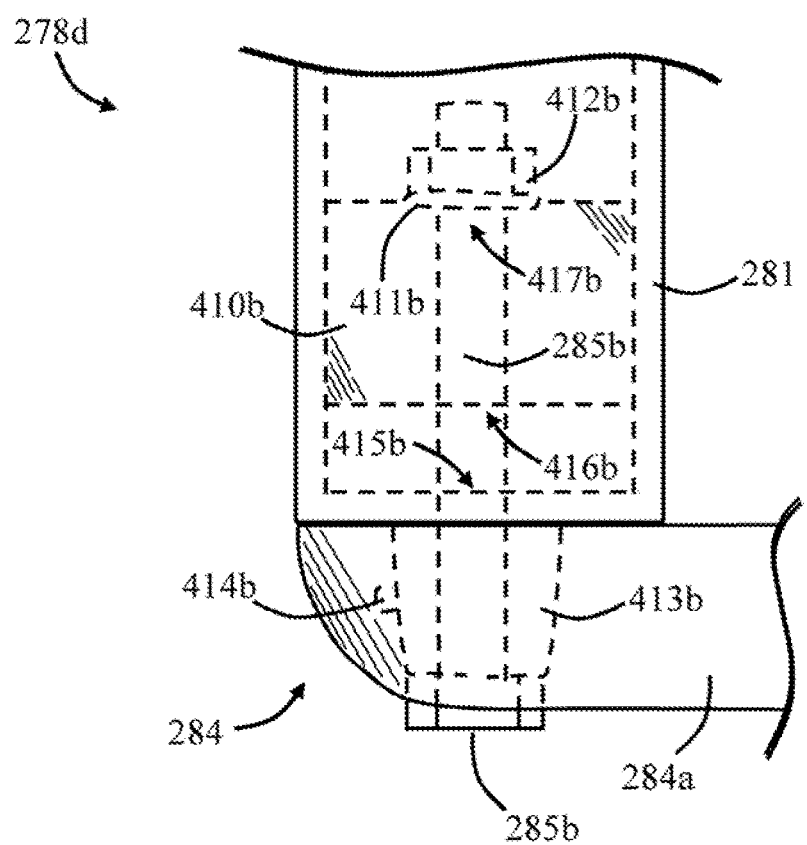
FIG. 8f is a close-up view of a region 278d of FIG. 8a, wherein portions thereof are shown in phantom to show how a fourth hinge support arm and fourth coupler are coupled together.

FIG. 8f is a close-up view of a region 278d of FIG. 8b, wherein portions thereof are shown in phantom to show how the hinge support arm 281 and coupler 284 are coupled together. In this embodiment, a support piece 410b is positioned within the hinge support arm 281, wherein the support piece 410b is a piece of rectangular tubing welded to opposed interior sides of the hinge support arm 281. The support piece 410b includes opposed openings 416b and 417b, which are aligned with an opening 415b of the hinge support arm 281. A nut 412b is welded to the support piece 410b proximate to the opening 417b using a weldment 411b, wherein the opening of the nut 412b is aligned with opposed openings 416b und 417b. A support bushing 413b is positioned proximate to the opening 415b and between the opposed sidewalls 284a and 284b. The support bushing 413b includes an opening that is aligned with the opening 415b. The support bushing 413b includes a grease fitting 414b for flowing grease into the opening of the support bushing 413b to provide lubricant for a fastener, which extends therethrough, as will be discussed in more detail presently. A fastener 285b (FIGS. 8a, 8b and 8f) is extended through the opening of the support bushing 413b, as well as through openings 415b, 416b and 417b, wherein the fastener 285b is threadingly engaged with the nut 412b. In operation, the support bushing 413b and coupler 284 rotate in response to the rotation of the hinge rotation arm 282. In this way, the hinge rotation arm 282 can rotate relative to the hinge support arm 281.

In this embodiment, and as shown in FIGS. 8a, 8b and 8d, the boom hinge assembly 260a includes a boom support arm 286 coupled to the hinge rotation arm 282. The boom support arm 286 can be coupled to the binge rotation arm 282 in many different ways. In this embodiment, the boom support arm 286 is welded to the hinge rotation arm 282 so that the boom support arm 286 extends perpendicular to the hinge rotation arm 282 and away from the hinge support arm 281. It should be noted that the boom support arm 286 rotates in response to the rotation of the hinge rotation arm 282, as discussed in more detail above. The boom support arm 286 can include many different types of material. In this embodiment, the boom support arm 286 includes rectangular tubing.

In this embodiment, the boom hinge assembly 260a includes a bracket 297, which is coupled to the hinge support arm 281 and hinge rotation arm 282. The bracket 297 can be coupled to the boom support arm 286 and hinge rotation arm 282 in many different ways. In this embodiment, the bracket 297 is welded to the hinge support arm 281 and hinge rotation arm 282 to provide support thereto. The bracket 297 restricts the ability of the hinge rotation arm 282 to move relative to the hinge support arm 281. The bracket 297 can include many different types of material. In this embodiment, the bracket 297 includes flat stock material.

In this embodiment, the boom hinge assembly 260a includes opposed brackets 295a and 295b (FIG. 8a), which are coupled to opposed sides of the hinge rotation arm 282. A pin 296 extends through openings (not shown) of the opposed brackets 295a and 295b. The opposed brackets 295a and 295b can be coupled to the boom hinge assembly 260a in many different ways, such as by using welding. The opposed brackets 295a and 295b and pin 296 are for coupling a hydraulic cylinder to the hinge rotation arm 281, as will be discussed in more detail presently.

In this embodiment, the boom hinge assembly 260a includes a boom fold cylinder 290, which includes a boom fold cylinder body 291 and boom fold cylinder arm 293 (FIGS. 8a-8d). The boom fold cylinder 290 is connected to hydraulic line couplers 288a and 288b, and allows hydraulic fluid to flow to and from the boom fold cylinder 290. A boom fold cylinder coupler 294 (FIG. 8a) is coupled to the boom fold cylinder arm 293, and the boom fold cylinder coupler 294 is coupled to the opposed brackets 295a and 295b by extending the pin 296 therethrough. A boom fold cylinder coupler 292 (FIG. 8a) is coupled to an end of the boom fold cylinder body 291 opposed to the boom fold cylinder arm 293. The boom fold cylinder coupler 292 is coupled to the boom cylinder coupler 250 by positioning the boom fold cylinder coupler 292 between upper and lower brace plates 253a and 253b, and extending the pin 255 through the boom fold cylinder coupler 292 (FIGS. 6j and 8b).

It should be noted that the boom fold cylinder 290 is hydraulically coupled to the hydraulic system of the prime mover 101 (FIGS. 1b, 1c, 1d, 1e, 1f and 9b). In this embodiment, hydraulic lines 196a and 196b (FIG. 8a) are coupled to the boom fold cylinder 290. The hydraulic lines 196a and 196b are coupled to the hydraulic system of the prime mover 101.

FIG. 9a is a front perspective view of the frame assembly 140 of FIGS. 2a, 2b and 2c coupled to the prime mover 101 of FIGS. 1a-1g. As mentioned above, the frame assembly 140 of FIGS. 2a and 2b is coupled to the prime mover 101 of FIGS. 1a-1g using the three-point hitch 109 (FIG. 1g). The three-point hitch 109 includes a link portion 115a coupled to the top link coupling 111 (FIG. 1g), and a link portion 115b threadingly engaged with the link portion 115a (FIG. 9a). The link portion 115b is coupled to the hitch coupling buckets 153a and 153b through the hitch bracket openings 156a and 156b. The link portion 115b can be counted to the hitch coupling brackets 153a and 153b in many different ways. In this embodiment, a pin (not shown) is extended through the hitch bracket openings 156a and 156b and link portion 115b. In this way, the link portion 115b is held between the hitch coupling brackets 153a and 153b.

The three-point hitch 109 includes the hitch lifting arm 112a, which is coupled to the longitudinal frame member 142a. The hitch lifting arm 112a can be coupled to the longitudinal frame member 142a in many different ways. In this embodiment, the hitch lifting arm 112a includes a tapered portion 113a, which is positioned proximate to the longitudinal frame member opening 148a. A pin 114a is extended through the tapered portion 113a and longitudinal frame member opening 148a. In this way, the longitudinal frame member 142a is held to the hitch lifting arm 112a.

The three-point hitch 109 includes the hitch lifting arm 112b, which is coupled to the longitudinal frame member 142b. The hitch lifting arm 112b can be coupled to the longitudinal frame member 142b in many different ways. In this embodiment, the hitch lifting arm 112b includes a tapered portion 113b, which is positioned proximate to the longitudinal frame member opening 148b. A pin 114b is extended through the tapered portion 113b and longitudinal frame member opening 148b. In this way, the longitudinal frame member 142b is held to the hitch lifting arm 112b.

Figure 9B:
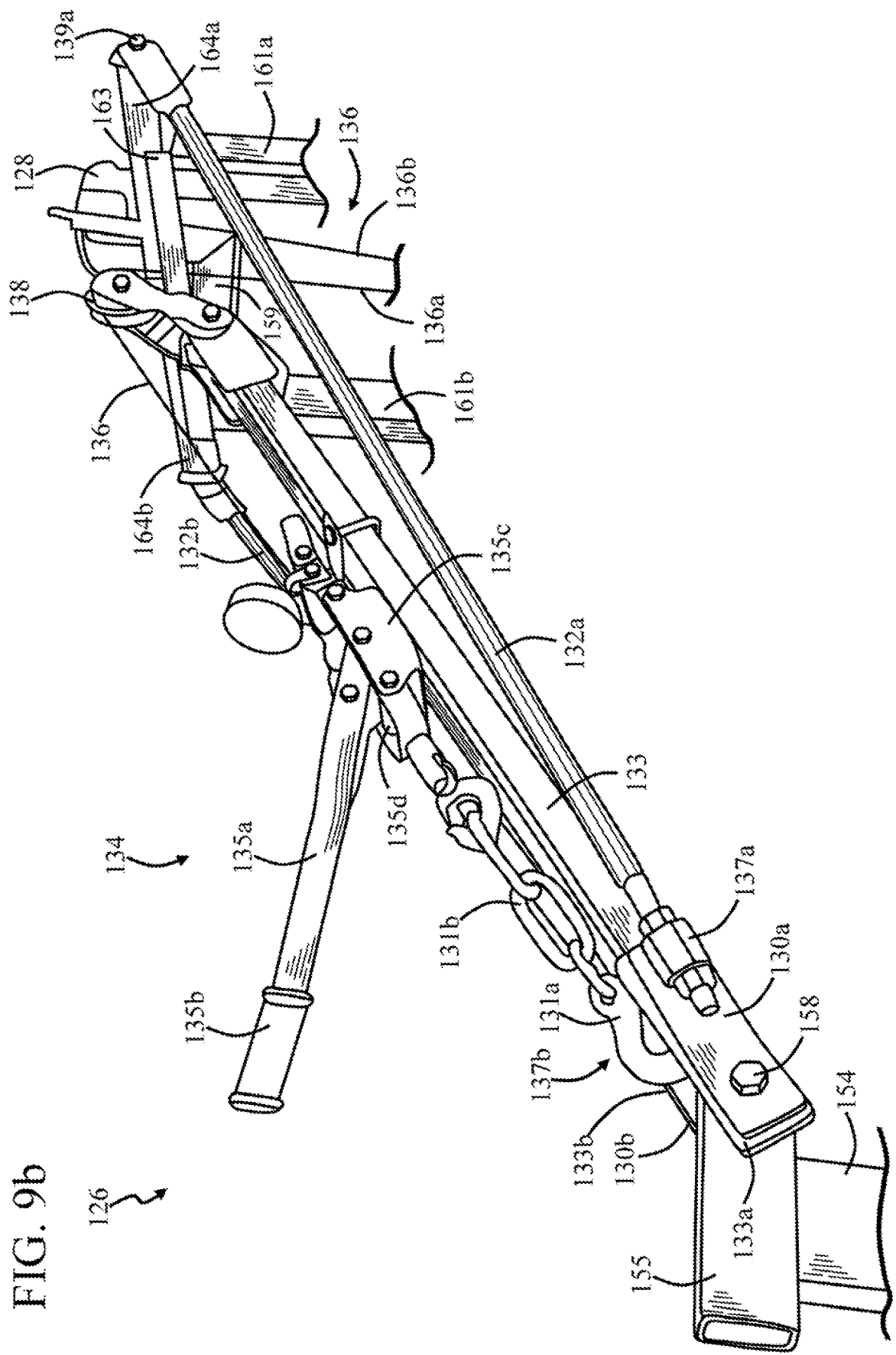
Figure 9C:
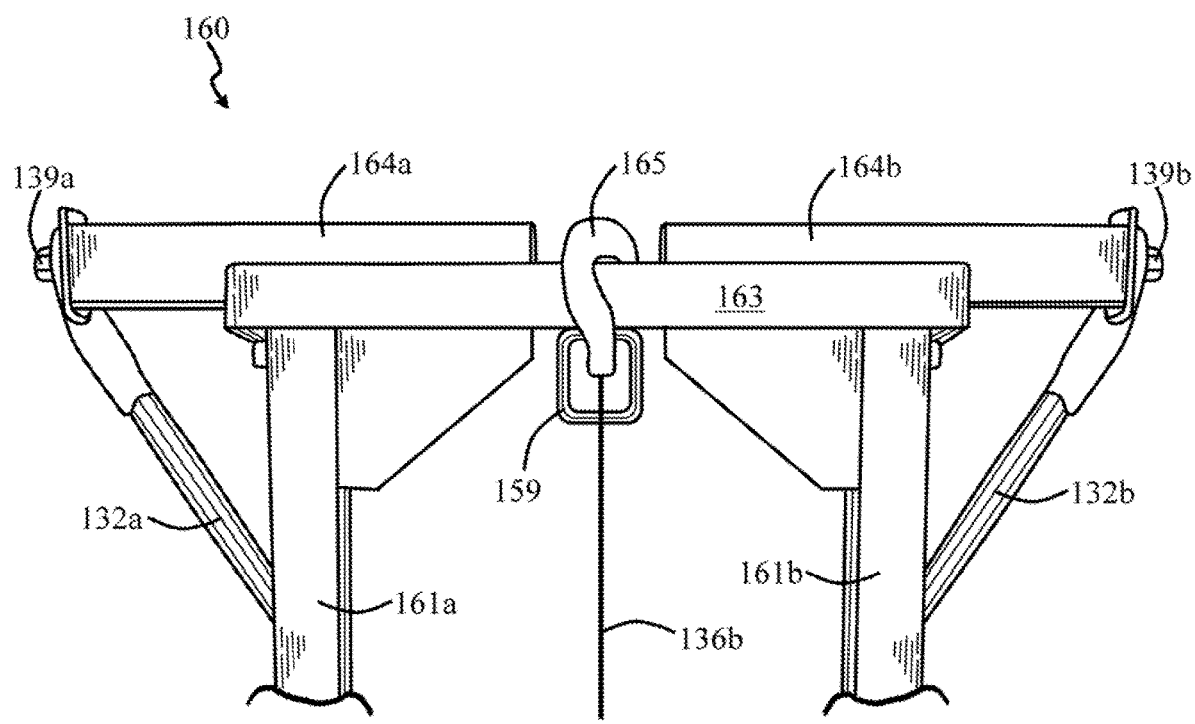
Figure 9D:
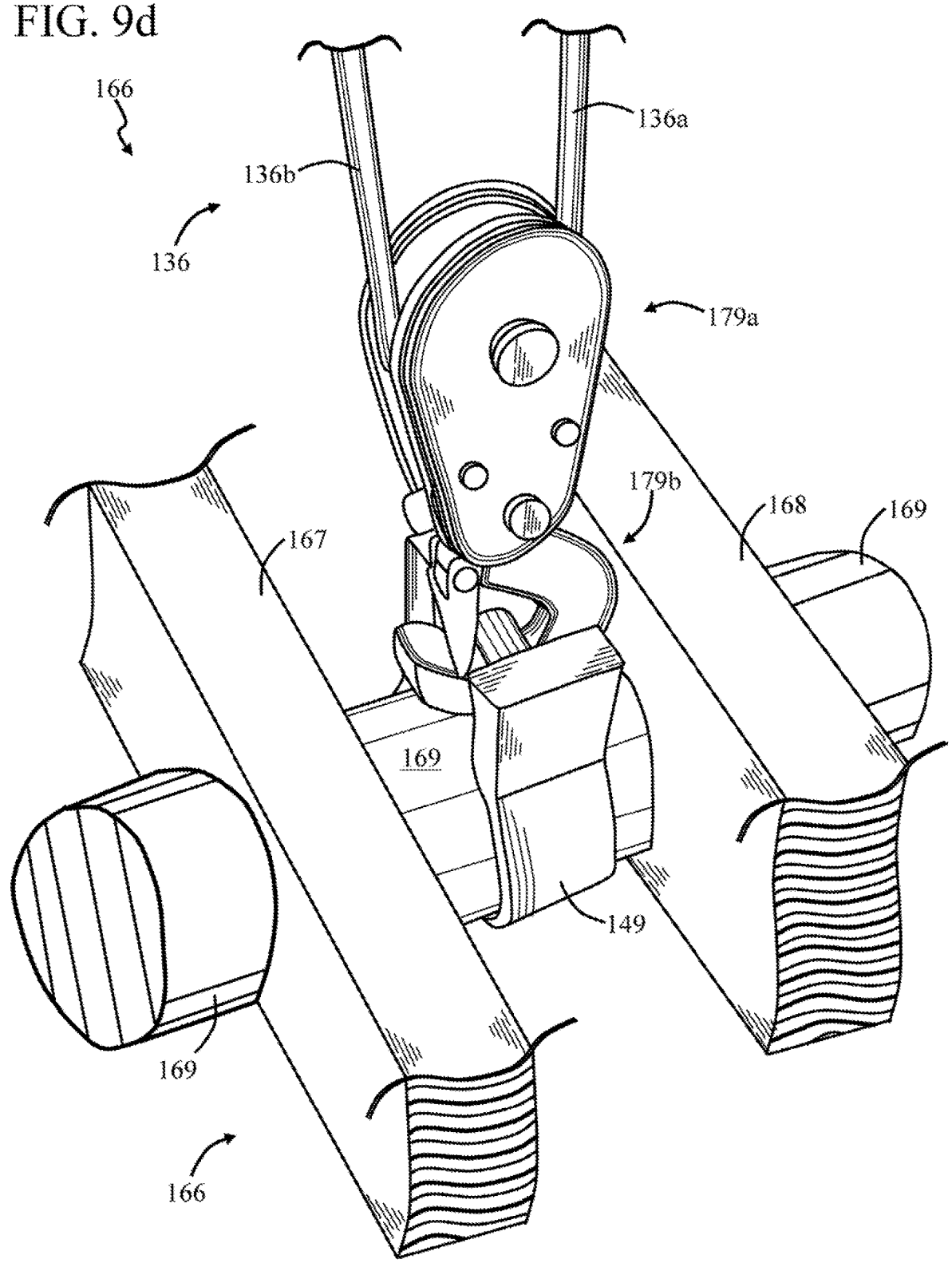
FIG. 9d is a perspective view of opposed pendulum arm frame members of the crop spraying apparatus coupled to a hoist cable of the hoist apparatus of FIG. 9b.

FIG. 9b is a perspective view of the hoist apparatus 126 of the crop spraying apparatus 120 of FIG. 1a, FIG. 9c is a side view of an upper portion of the mast assembly 160 of the frame assembly 140 of FIGS. 2a and 2b, and FIG. 9d is a perspective view of the opposed rearward and forward pendulum arm frame members 167 and 168 of the pendulum carriage 166 (FIGS. 3d and 3e) coupled to a hoist cable 136 of the hoist apparatus 126 of FIG. 9b.

In this embodiment, the hoist apparatus 126 includes a mast support stabilizer 133, which is coupled to the hoist bracket 155 (FIGS. 2a, 2b, 2c, and 2d) and cross mast member 163 (FIGS. 9b and 9c). The mast support stabilizer 133 can be coupled to the hoist bracket 155 in many different ways. In this embodiment, the mast support stabilizer 133 includes opposed anti-sway braces 133a and 133b, which are positioned on opposed sides of the hoist bracket 155. As will be discussed in more detail below, opposed brackets 130a and 130b are positioned adjacent to the opposed anti-sway braces 133a and 133b, respectively. As shown in FIG. 9b, a fastener 158 is extended through opposed brackets 130a and 130b, the opposed anti-sway braces 133a and 133b and hoist bracket opening 157 (FIG. 2c). The mast support stabilizer 133 can be coupled to the cross mast member 163 in many different ways. In this embodiment, a hoist coupling arm 159 (FIGS. 9b and 9c) is coupled, such as by welding, to the cross mast member 163 proximate to a center portion thereof. The mast support stabilizer 133 is coupled to the hoist coupling arm 159. The mast support stabilizer 133 can be coupled to the hoist coupling arm 159 in many different ways, such as by using welding and/or a fastener.

The hoist apparatus 126 includes hoist arms 132a and 132b, which are coupled to the hoist bracket 155 and cross mast member 163 (FIGS. 9b and 9c). The hoist arms 132a and 132b provide stability and support to the mast support stabilizer 133. The hoist arms 132a and 132b can be coupled to the hoist bracket 155 in many different ways. In this embodiment, a bracket 137a is coupled, such as by welding, to the bracket 130a. An end of the hoist arm 132a is positioned so it extends through the bracket 137a and is held thereto, such as by using a fastener. Further, a bracket 137b is coupled, such as by welding, to the bracket 130b. An end of the hoist arm 132b is positioned so it extends through the bracket 137b and is held thereto, such as by using it fastener.

The hoist arms 132a and 132b can be coupled to the cross most member 163 in many different ways. In this embodiment, mast arm brackets 164a and 164b are coupled to the cross mast member 163, such as by using welding and/or a fastener (FIG. 9c). The mast arm brackets 164a and 164b extend outwardly from opposed ends of the cross mast member 163. An opposed end of the hoist arm 132a is positioned proximate to an outer portion of the mast arm bracket 164a, and a fastener 139a is extended therethrough so that the hoist arm 132a is fastened to the mast arm bracket 164a (FIGS. 9b and 9c). Further, an opposed end of the hoist arm 132b is positioned proximate to an outer portion of the mast arm bracket 164b, and a fastener 139b is extended therethrough so that the hoist arm 132b is fastened to the mast arm bracket 164b (FIG. 9c).

The hoist apparatus 126 includes a hoist winch 134 carried by the mast support stabilizer 133. There are many different companies that provide hoist winches, such as Gilmore-Kramer Company of Providence, R.I. The hoist winch 134 can be of many different types of winches. In this embodiment, the hoist winch 134 includes a hoist winch frame 135c, which is coupled to the mast support stabilizer 133. The hoist winch 134 includes a chain 131b coupled to a hook 131a, wherein hook 131a is coupled to the mast support stabilizer 133 between the opposed anti-sway braces 133a and 133b. The hoist winch 134 includes a hoist handle arm 135a, which includes a hoist handle 135b.

The hoist apparatus 126 includes a pulley 138, which is positioned proximate to the hoist coupling arm 159. The hoist cable 136 is coupled to the hoist winch frame 135c opposed to the chain 131b. The hoist cable 136 extends upwardly from the hoist winch frame 135c to the pulley 138, wherein the hoist cable 136 extends downwardly to the rearward and forward pendulum arm frame members 167 and 168, as will be discussed in more detail with FIG. 9d.

The portion of the hoist cable 136 that extends downwardly is denoted as a portion 136a in FIG. 9b. The hoist cable 136 is indirectly coupled to the rearward and forward pendulum arm frame members 167 and 168 and extends upwardly from the rearward and forward pendulum arm frame members 167 and 168 to the cross mast member 163. The portion of the hoist cable 136 that extends upwardly from the rearward and forward pendulum arm frame members 167 and 168 is denoted as a portion 136b in FIGS. 9b, 9c, 9d and 9e. The hoist cable 136 is coupled to the cross mast member 163. The hoist cable 136 can be coupled to the cross mast member 163 in many different ways. In this embodiment, a hook 165 (FIG. 9c) is coupled to an end of the hoist cable 136 and cross mast member 163. The hook 165 is coupled to the cross mast member 163 proximate to the hoist coupling arm 159.

As will be discussed in more detail below, the hoist winch 134 is actuated in response to moving the hoist handle arm 135a. The hoist winch 134 includes a spool 135d around which a portion of the hoist cable 136 is wound for distribution. It should be noted that, in this embodiment, the hoist handle arm 135a can be set to release and winding positions. In the release position, the hoist cable 136 is released from the spool 135d in response to moving the hoist handle arm 135a. In the winding position, the hoist cable 136 is wound around the spool 135d in response to moving the hoist handle arm 135a.

FIG. 9d is a perspective view of the opposed rearward and forward pendulum arm frame members 167 and 168 of the carriage assembly 200 coupled to the hoist cable 136 of the hoist apparatus 126 of FIG. 9b. The hoist cable 136 can be coupled to the rearward and forward pendulum arm frame members 167 and 168 in mans different ways. In this embodiment, a pulley 179a is coupled to a bracket 149 with a hook 179b, wherein the bracket 149 extends around a portion of the pendulum arm 169 between the rearward and forward pendulum arm frame members 167 and 168 (FIGS. 3d-3i and FIGS. 9e-9g). As mentioned above, the downwardly extending portion of the hoist cable 136 is denoted as the portion 136a, and the upwardly extending portion of the hoist cable 136 is denoted as the portion 136b. Hence, the portion 136a of the hoist cable 136 extends downwardly from the pulley 138 (FIG. 9b) to the pulley 179a, wherein the hoist cable 136 extends through the pulley 179a. Further, the portion 136b of the hoist cable 136 extends upwardly from the pulley 179a to the hook 165 (FIG. 9c).

As mentioned above with FIGS. 3d-3i, the pendulum arm 169 extends through the rearward and forward pendulum arm frame members 167 and 168. In this way, the hoist cable 136 is coupled to the rearward and forward pendulum arm frame members 167 and 168. It should be noted that the pulley 179a, the hook 179b and portion 136b of the hoist cable 136 can be seen in FIG. 9e.

In operation, the carriage assembly 200 is repeatably moveable between raised and lowered positions. In this embodiment, the carriage assembly 200 is repeatably moveable between the raised and lowered positions in response to actuating the hoist winch 134. As mentioned above, the hoist winch 134 is actuated in response to moving the hoist handle arm 135a. In this embodiment, the hoist cable 136 is wound, in response to moving the hoist handle arm 135a, when the hoist handle arm 135a is in the winding position.

In response to the hoist cable 136 being wound, the pulley 179a is moved upwardly. As mentioned above, the pulley 179a is coupled to the rearward and forward pendulum arm frame members 167 and 168 through the pendulum arm 169. Hence, the rearward and forward pendulum arm frame members 167 and 168 move upwardly in response to the pulley 179a moving upwardly.

Further, as mentioned above, the rearward and forward pendulum arm frame members 167 and 168 are coupled to the carriage assembly 200 through the rearward and forward pendulum assemblies 170 and 180. Hence, the carriage assembly 200 moves upwardly in response to moving the rearward and forward pendulum arm frame members 167 and 168 upwardly. The carriage assembly 200 is moved to the raised position in response to moving the carriage assembly 200 upwardly. In this way, the carriage assembly 200 is moved to the raised position, in response to actuating the hoist winch 134, when the hoist handle arm 135a is in the winding position.

In this embodiment, the hoist cable 136 is released, in response to moving the hoist handle arm 135a, when the hoist handle arm 135a is in the released position. The hoist cable 136 is released because the hoist cable 136 is released from the spool 135d, in response to moving the hoist handle arm 135a, when the hoist handle arm 135a is in the released position.

In response to the hoist cable 136 being released, the pulley 179a is moved downwardly. As mentioned above, the pulley 179a is coupled to the rearward and forward pendulum arm frame members 167 and 168 through the pendulum arm 169. Hence, the rearward and forward pendulum arm frame members 167 and 168 move downwardly in response to the pulley 179a moving downwardly.

Further, as mentioned above, the rearward and forward pendulum arm frame members 167 and 168 are coupled to the carriage assembly 200 through the rearward and forward pendulum assemblies 170 and 180. Hence, the carriage assembly 200 moves downwardly in response to moving the rearward and forward pendulum arm frame members 167 and 168 downwardly. The carriage assembly 200 is moved to the lowered position in response to moving live carriage assembly 200 downwardly. In this way, carriage assembly is moved to the lowered position, in response to actuating the hoist winch 134, when the hoist handle arm 135a is in the released position.

Figure 9F:
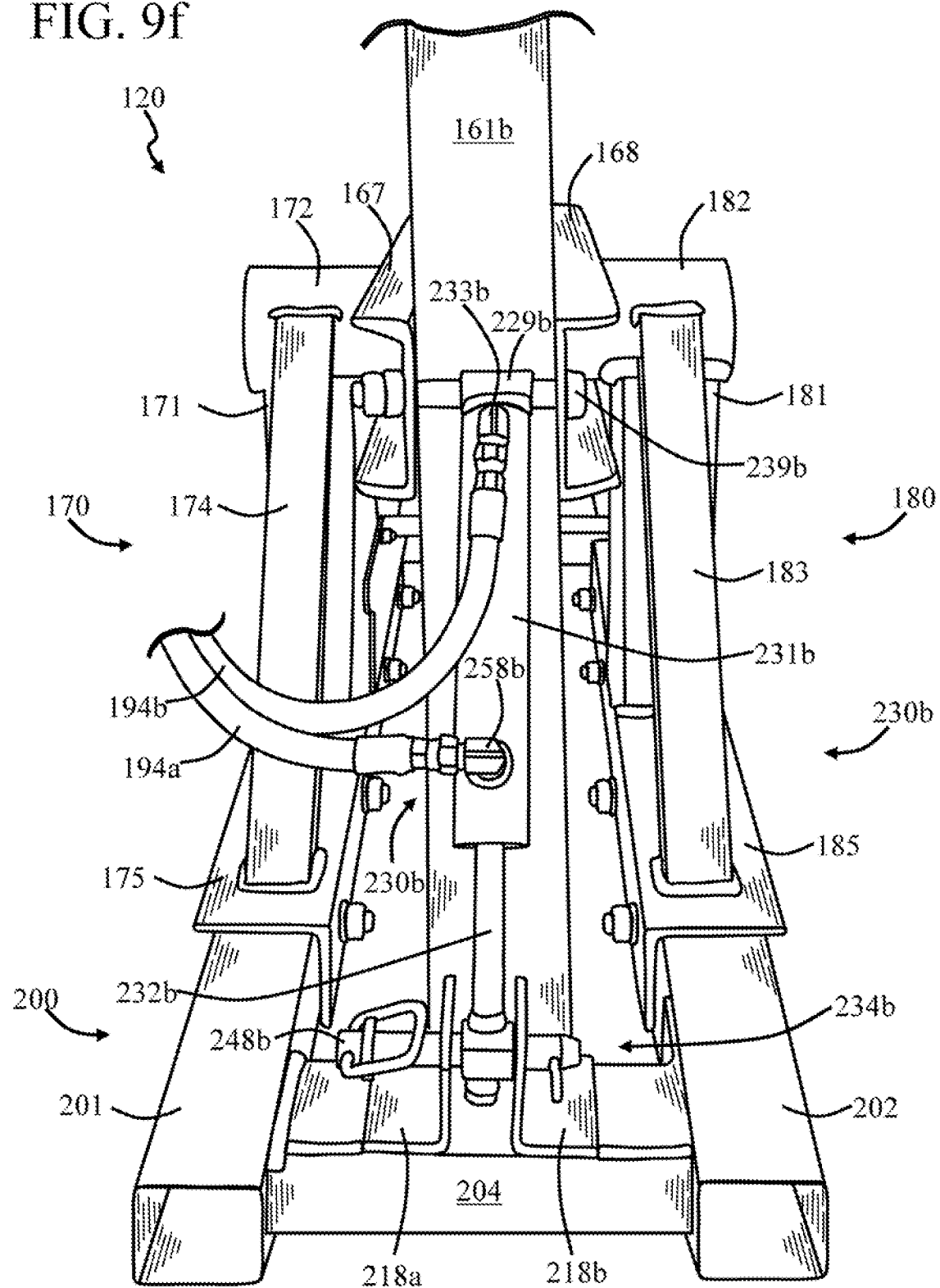
Figure 9G:
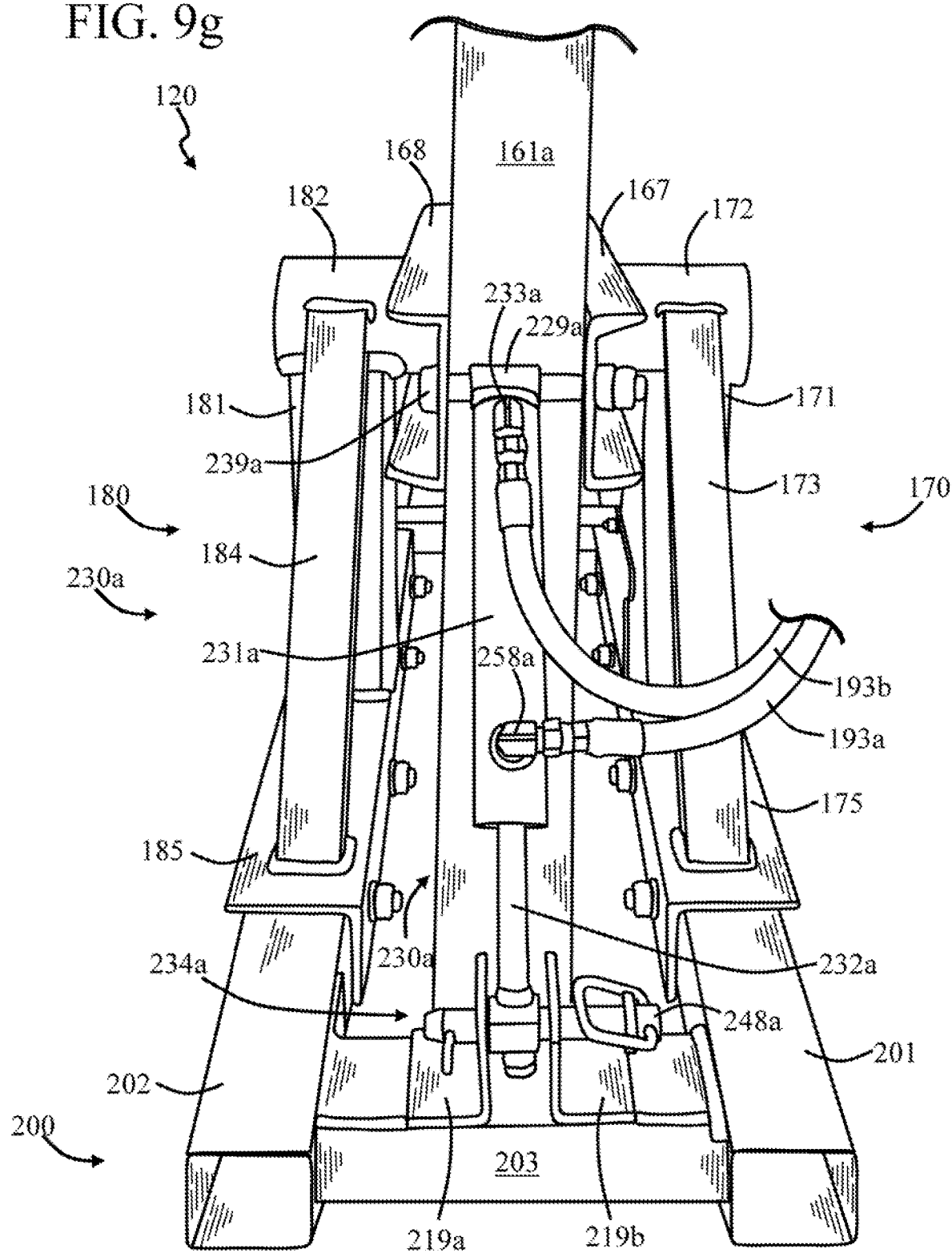

FIG. 9e is a side view of the crop spraying apparatus 120, which includes the carriage assembly 200 carried by the mast assembly 160, and FIGS. 9f and 9g are opposed side views of the carriage assembly 200 of FIG. 9e. In this embodiment, the crop spraying apparatus 120 includes the rearward and forward pendulum assemblies 170 and 180 of FIGS. 3d, 3e, 3f and 3g coupled to the carriage assembly 200 of FIGS. 6a and 6b. FIGS. 9l and 9m are top and bottom views, respectively, of the mast assembly 160 and pendulum carriage 166, wherein the pendulum carriage 166 includes the rearward and forward pendulum arm frame members 167 and 168 of FIG. 9e.

In this embodiment, the opposed rearward and forward pendulum arm frame members 167 and 168 are positioned on opposed sides of the masts 161a and 161b, and the pendulum arm 169 extends therethrough, as described in more detail above with FIGS. 3d-3i, and as shown in FIGS. 9l and 9m. In this embodiment, spacers 300 and 301 are positioned between the opposed rearward and forward pendulum arm frame members 167 and 168 (FIGS. 9e, 9l and 9m). The spacer 300 is positioned proximate to the mast 161a and spacer 301 is positioned proximate to the mast 161b. It should be noted that the masts 161a and 161b are shown in a cut-away view in FIGS. 9l and 9m. The rearward and forward pendulum arm frame members 167 and 168 are held to the spacers 300 and 301 with the fasteners 306, 307, 308 and 309 (FIG. 9e). The fasteners 306, 307, 308 and 309 extend through the rearward and forward pendulum arm frame members 167 and 168 and are held thereto by nuts 302, 303, 304 and 305, respectively. Further, the fasteners 306 and 307 extend through the spacer 300, and the fasteners 308 and 309 extend through the spacer 301 (FIG. 9e). It should be noted that the nuts 302, 303, 304 and 305 are typically tightened to the corresponding fasteners 306, 307, 308 and 309 so that the rearward and forward pendulum arm frame members 167 and 168 are frictionally engaged with the masts 161a and 161b. In this way, the rearward and forward pendulum arm frame members 167 and 168 are allowed to slide relative to the masts 161a and 161b. The friction between the rearward and forward pendulum arm frame members 167 and 168 and masts 161a and 161b increases in response to tightening the nuts 302, 303, 304 and 305. Further, the friction between the rearward and forward pendulum arm frame members 167 and 168 and masts 161a and 161b decreases in response to untightening the nuts 302, 303, 304 and 305. In some embodiments, one or more shims are used to adjust the amount of friction between the rearward and forward pendulum rum frame members 167 and 168 and masts 161a and 161b.

The rearward and forward pendulum assemblies 170 and 180 are coupled to opposed ends of the pendulum arm 160 (FIGS. 3d and 3e). The portion 136b of the hoist cable 136 is coupled to the opposed rearward and forward pendulum arm frame members 167 and 168, as described in more detail above with FIG. 9d. The rearward and forward pendulum assemblies 170 and 180 are coupled to the carriage assembly 200. In particular, the rearward pendulum assembly 170 is coupled to the lengthened carriage frame member 201 and forward pendulum assembly 180 is coupled to the lengthened carriage frame member 202.

In this embodiment, a carriage rotation cylinder 230a (FIGS. 9e and 9g) is coupled between the opposed rearward and forward pendulum arm frame members 167 and 168 and the carriage frame spacer 203 of the carriage assembly 200. The carriage rotation cylinder 230a can be coupled between the opposed rearward and forward pendulum arm frame members 167 and 168 and the carriage frame spacer 203 in many different ways. In this embodiment, the carriage rotation cylinder 230a includes a carriage rotation cylinder body 231a having a hydraulic cylinder coupler 229a (FIG. 9g) positioned between the opposed rearward and forward pendulum arm frame members 167 and 168. A fastener 239a (FIGS. 9e and 9g) extends through the opposed rearward and forward pendulum arm frame members 167 and 168 and hydraulic cylinder coupler 229a of the carriage rotation cylinder body 231a so that the carriage rotation cylinder body 231a is held therebetween.

The carriage rotation cylinder 230a includes a carriage rotation cylinder arm 232a (FIGS. 9e and 9g) hydraulically coupled to the carriage rotation cylinder body 231a. The carriage rotation cylinder arm 232a has an end positioned through a carriage rotation cylinder bracket 234a, wherein the carriage rotation cylinder bracket 234a is coupled to the carriage frame spacer 203. The carriage rotation cylinder bracket 234a can be of many different types. In this embodiment, the carriage rotation cylinder bracket 234a includes opposed L-brackets 219a and 219b (FIG. 9g) spaced apart from each other. A pin 248a extends through the end of the carriage rotation cylinder arm 232a and opposed L-brackets 219a and 219b so that the carriage rotation cylinder arm 232a is held therebetween.

The carriage rotation cylinder 230a is repeatably moveable between extended and retracted conditions. In the extended condition, the carriage rotation cylinder arm 232a is moved outwardly from the carriage rotation cylinder body 231a, and the carriage rotation cylinder bracket 234a and carriage frame spacer 203 are moved downwardly in response. In the retracted condition, the carriage rotation cylinder arm 232a is moved inwardly to the carriage rotation cylinder body 231a, and the carriage rotation cylinder bracket 234a and carriage frame spacer 203 are moved upwardly in response.

In this embodiment a carriage rotation cylinder 230b (FIGS. 9e and 9f) is coupled between the opposed rearward and forward pendulum arm frame members 167 and 168 and carriage frame spacer 204 of the carriage assembly 200. The cartage rotation cylinder 230b can be coupled between the opposed rearward and forward pendulum arm frame members 167 and 168 and carriage frame spacer 204 in many different ways. In this embodiment, the carriage rotation cylinder 230b includes a carriage rotation cylinder bods 231b having a hydraulic cylinder coupler 229b (FIG. 9f) positioned between the opposed rearward and forward pendulum arm frame members 167 and 168. A fastener 239b (FIGS. 9e and 9f) extends through the opposed rearward and forward pendulum arm frame members 167 and 168 and hydraulic cylinder coupler 229b of the carriage rotation cylinder body 231b so that the carriage rotation cylinder body 231b is held therebetween.

The carriage rotation cylinder 230b includes a carriage rotation cylinder arm 232b (FIGS. 9e and 9f) hydraulically coupled to the carriage rotation cylinder body 231b. The carriage rotation cylinder arm 232b has an end positioned through a carriage rotation cylinder bracket 234b. The carriage rotation cylinder bracket 234b can be of many different types. In this embodiment, the carriage rotation cylinder bracket 234b includes opposed L-brackets 218a and 218b (FIG. 9f) spaced apart from each other. A pin 248b extends through the end of the carriage rotation cylinder arm 232b and opposed L-brackets 218a and 218b so that the carriage rotation cylinder arm 232b is held therebetween.

The carriage rotation cylinder 230b is repeatably moveable between extended and retracted conditions. In the extended condition, the carriage rotation cylinder arm 232b is moved outwardly from the carriage rotation cylinder body 231b, and the carriage rotation cylinder bracket 234b and carriage frame spacer 204 are moved downwardly in response. In the retracted condition, the carriage rotation cylinder arm 232b is moved inwardly to the carriage rotation cylinder body 231b, and the carriage rotation cylinder bracket 234b and carriage frame spacer 204 are moved upwardly in response.

In operation, the carriage assembly 200 is rotated counterclockwise (as shown in FIG. 9e) when the carriage rotation cylinder bracket 234a and carriage frame spacer 203 are moved downwardly, and the carriage rotation cylinder bracket 234b and carriage frame spacer 204 are moving upwardly. As mentioned above, the carriage rotation cylinder bracket 234a and carriage frame spacer 203 are moved downwardly in response to the carriage rotation cylinder arm 232a being extended, and the carriage rotation cylinder bracket 234b and carriage frame spacer 204 are moving upwardly in response to the carriage rotation cylinder arm 232b being retracted.

Further, the carriage assembly 200 is totaled clockwise (as shown in FIG. 9e) when the carriage rotation cylinder bracket 234a and carriage frame spacer 203 are moved upwardly, and the carriage rotation cylinder bracket 234b and carriage frame spacer 204 are moving downwardly. As mentioned above, the carriage rotation cylinder bracket 234a and carriage frame spacer 203 are moved upwardly in response to the carriage rotation cylinder arm 232a being retracted, and the carriage rotation cylinder bracket 234b, and the carriage frame spacer 204 are moved downwardly in response to the carriage rotation cylinder arm 232b being extended.

The carriage assembly 200 is rotatable about the pendulum arm 169 because, as discussed in more detail above, the rearward and forward pendulum assemblies 170 and 180 are coupled to the pendulum arm 169 and carriage assembly 200. Hence, in this embodiment, the rearward and forward pendulum assemblies 170 and 180 rotate counterclockwise (as shown in FIG. 9e) when the carriage rotation cylinder bracket 234a and carriage frame spacer 203 are moved downwardly, and the carriage rotation cylinder bracket 234b and carriage frame spacer 204 are moving upwardly. Further, the rearward and forward pendulum assemblies 170 and 180 rotate clockwise (as shown in FIG. 9e) when the carriage rotation cylinder bracket 234a and carriage frame spacer 203 are moved upwardly, and the carriage rotation cylinder bracket 234b and carriage frame spacer 204 are moved downwardly. In this way, the carriage assembly 200 rotates relative to the pendulum arm 169.

It should be noted that the carriage rotation cylinders 230a and 230b are repeatably moveable between locked and unlocked conditions. In the locked condition, the carriage rotation cylinders 230a and 230b are restricted from moving between the extended and retracted conditions. In the locked condition, the carriage rotation cylinders 230a and 230b restrict the ability of the crop spraying apparatus 120 to rotate.

Locking the carriage rotation cylinders 230a and 230b is useful in some situations, such as when turning the crop spraying vehicle 100. For example, the crop spraying vehicle 100 is often turned around when the end of a field is reached during spraying, and it is desirable to spray while moving in the opposite direction. It is undesirable to have the crop spraying apparatus 120 rotate in response to turning the prime mover 101 because it is more likely to experience damage from hitting the ground. It should be noted that booms 121a and 121b are typically moved from the deployed condition to the stowed condition when turning the crop spraying vehicle 100 around. It is also undesirable to have the crop spraying apparatus 120 rotate when moving the crop spraying vehicle 100 on a road, such as a public road. It is also useful to lock the carriage rotation cylinders when moving the booms 121a and 121b between the stowed and deployed positions.

The locking the carriage rotation cylinders 230a and 230b is useful when boom 121a is stowed and boom 121b is deployed. Further, locking the carriage rotation cylinders 230a and 230b is useful when boom 121b is stowed and boom 121a is deployed. When one side of the crop spraying apparatus 120 is stowed and the other side is deployed, the pendulum arm 169 is in an unbalanced condition, and the crop spraying apparatus 120 is biased to undesirably swing away from the deployed side. The deployed side is more likely to experience damage from hitting the ground in response. It should be noted that the carriage rotation cylinders 230a and 230b are typically locked when spraying with one boom deployed and the other boom stowed. For example, it is sometimes desirable to spray with the boom 121a in the deployed condition and the boom 121b in the stowed condition. Further, it is sometimes desirable to spray with the boom 121b in the deployed condition and the boom 121a in the stowed condition.

In the unlocked condition, the crop spraying apparatus 120 is free to rotate in response to an applied force, such as from movement of the prime mover 101. However, the crop spraying apparatus 120 will self-level in response to experiencing the applied force. For example, the crop spraying apparatus 120 resists rotation because of inertia. Further, the crop spraying apparatus resists rotation because of the pendulum affect provided by the booms 121a and 121b, wherein the booms 121a and 121b are chosen to have substantially the same mass. In this way, the crop spraying apparatus 120 is biased to self-level in the unlocked condition. More information regarding the operation of the carriage rotation cylinders 230a and 230b and the rotation and locking of the crop spraying apparatus 120 is provided in the above-referenced U.S. patent application Ser. No. 14/733,914.

It should also be noted that the carriage rotation cylinders 230a and 230b are hydraulically coupled to the hydraulic system 125, as will be discussed in more detail with FIGS. 9h and 9i. In particular, the carriage rotation cylinders 230a and 230b are hydraulically coupled to the hydraulic fluid reservoir 128 (FIGS. 1b, 1c, 1d, 1e, 1f, 9b, and 9h). In this embodiment, hydraulic lines 193a and 193b are coupled to the carriage rotation cylinder 230a and hydraulic fluid reservoir 128 (FIG. 9h). The hydraulic lines 193a and 193b are coupled to the carriage rotation cylinder body 231a through hydraulic line couplers 258a and 233a (FIG. 9e), respectively. Further, hydraulic lines 194a and 194b are coupled to the carriage rotation cylinder 231b and hydraulic fluid reservoir 128 (FIG. 9f) The hydraulic lines 194a and 194b are coupled to the carriage rotation cylinder body 231b through hydraulic line couplers 258b and 233b (FIG. 9f), respectively. In other embodiments, the carriage rotation cylinders 230a and 230b are hydraulically coupled to the hydraulic system of the prime mover 101, as discussed in more detail below with FIGS. 9i and 9j.

FIG. 9h is a perspective view of the hydraulic system 125 of the crop spraying apparatus 120 of FIG. 1a. In this embodiment, the hydraulic system 125 is carried by the crop spraying apparatus 120. In some embodiments, the hydraulic system 125 is not connected to a hydraulic system of the prime mover 101. In other embodiments, the hydraulic system 125 is connected to the hydraulic system of the prime mover 101. More information regarding hydraulic systems that can be included with the crop spraying vehicle disclosed herein can be found in the above-referenced U.S. patent application Ser. No. 14/733,914.

It should be noted that the hydraulic system 125 includes several different types of hydraulic fittings, which are designed to operate at hydraulic pressure. A branch fitting has a center flow path in fluid communication with opposed flow paths. One type of branch fitting is a wye fitting and another type of branch fitting is a tee fitting. In a wye fitting, the opposed flow paths are typically at a non-perpendicular angle to the center flow path. In the tee fitting, the opposed flow paths are at a perpendicular angle to the center flow path.

The hydraulic system 125 includes a branch fitting 350 having a center flow path connected to the hydraulic fluid reservoir 128. The opposed flow paths of the branch fitting 350 are connected to connectors 351 and 352. A flow control valve 355 is connected to the connector 351 through a hydraulic line 353, and a flow control valve 356 is connected to the connector 352 through a hydraulic line 354. The flow control valves 355 and 356 are repeatably moveable between open and closed positions.

A center flow path of a tee fitting 359 is connected to the flow control valve 355 through a hydraulic line 361, and a center flow path of a tee fitting 358 is connected to the flow control valve 356 through a hydraulic line 362. The flow control valve 355 controls the flow of hydraulic fluid through the hydraulic lines 353 and 361, and flow control valve 356 controls the flow of the hydraulic fluid through hydraulic lines 354 and 362. One of the opposed flow paths of the tee fitting 358 is connected to one of the opposed flow paths of a tee fitting 357. The other opposed flow path of the tee fitting 358 is connected to the hydraulic line coupler 258b of the carriage rotation cylinder 230b (FIGS. 9e and 9f) through the hydraulic line 194a. The other opposed flow path of the tee fitting 357 is connected to the hydraulic line coupler 233a of the carriage rotation cylinder 230a (FIGS. 9e and 9g) through the hydraulic line 193b.

A center flow path of the tee fitting 357 is connected to a solenoid valve 369 through a hydraulic line 363. The solenoid valve 369 is connected to a center flow path of a tee fitting 360 through a hydraulic line 364. One of the opposed flow paths of the tee fitting 360 is connected to one of the opposed flow paths of the tee fitting 359. The other opposed flow path of the tee fitting 360 is connected to the hydraulic line coupler 233b of the carriage rotation cylinder 230b through the hydraulic line 194b. The other opposed flow path of the tee fitting 359 is connected to the hydraulic line coupler 258a of the carriage rotation cylinder 230a through the hydraulic line 193a.

In some embodiments, the hydraulic system 125 includes a control box 371 which carries a control lever 370, wherein the solenoid valve 369 is operatively coupled to the control lever 370 through a control wire 372. The solenoid valve 369 controls the flow of hydraulic fluid through hydraulic lines 363 and 364 to control the operation of the carriage rotation cylinders 230a and 230b. It should be noted that some of the connections shown in FIG. 9h are also shown in FIGS. 9g and 9f.

For ease of discussion, a flow Path 1 is established by hydraulic lines 353 and 361, wherein the flow Path 1 is between the hydraulic fluid reservoir 128 and tee fitting 359. A flow Path 2 is established by hydraulic lines 354 and 362, wherein the flow Path 2 is between the hydraulic fluid reservoir 128 and tee fitting 358. A flow Path 3 is established by the hydraulic line 193b, wherein the flow Path 3 is between the tee fitting 357 and hydraulic line coupler 233a. A flow Path 4 is established by the hydraulic line 194a, wherein the flow Path 4 is between the tee fitting 358 and hydraulic line coupler 258b. A flow Path 5 is established by the hydraulic line 193a, wherein the flow Path 5 is between the tee fitting 359 and hydraulic line coupler 258a. A flow Path 6 is established by the hydraulic line 194b, wherein the flow Path 6 is between the tee fitting 360 and hydraulic line coupler 233b. A flow Path 7 is established by hydraulic lines 363 and 364, wherein the flow Path 7 is between tee fittings 357 and 360, and through the solenoid valve 369.

It is useful to open and close the flow control valves 355 and 356 to remove air from the hydraulic system 125. In particular, it is useful to open and close the flow control valves 355 and 356 to remove air from the hydraulic lines 193a, 193b, 194a, 194b, 363, and 364, as well as from the carriage rotation cylinders 230a and 230b. In operation, the hydraulic fluid reservoir 128 supplies the hydraulic fluid to the carriage rotation cylinders 230a and 230b through hydraulic lines 353 and 354 when the flow control valves 355 and 356 are in open positions. The hydraulic fluid flows through the hydraulic system 125 in response to the flow control valves 355 and 356 being in the open position. The hydraulic fluid does not flow through the hydraulic system 125 in response to the flow control valves 355 and 356 being in the closed position.

As discussed in more detail with FIG. 9e, the carriage rotation cylinder 230a is repeatably moveable between extended and retracted conditions. In the extended condition, the carriage rotation cylinder arm 232a is moved outwardly from the carriage rotation cylinder body 231a. In the retracted condition, the carriage rotation cylinder arm 232a is moved inwardly to the carriage rotation cylinder body 231a. Further, the carriage rotation cylinder 230b is repeatably moveable between extended and retracted conditions. In the extended condition, the carriage rotation cylinder arm 232b is moved outwardly from the carriage rotation cylinder body 231b. In the retracted condition, the carriage rotation cylinder arm 232b is moved inwardly to the carriage rotation cylinder body 231b.

In a first mode of operation, and referring to FIG. 9h, the carriage rotation cylinders 230a and 230b are in an unlocked condition in response to moving the control lever 370 to a first position (shown in phantom in FIG. 9h). In the unlocked condition, the carriage rotation cylinders 230a and 230b are free to move between the extended and retracted conditions. In response to moving the control lever 370 to the first position, a first signal is flowed to the solenoid valve 369 through the control wire 372. In response to receiving the first signal, the solenoid valve 369 opens, which allows hydraulic fluid to flow through flow through Path 7 from the tee fitting 357 to the tee fitting 360.

The carriage rotation cylinder arm 232a is moved to the extended condition in response to hydraulic fluid flowing from the hydraulic line coupler 258a of the carriage rotation cylinder 230a through the flow Path 5 to the flow Path 7, and the carriage rotation cylinder arm 232b is moved to the retracted condition in response to hydraulic fluid flowing from the hydraulic line coupler 233b of the carriage rotation cylinder 230b through the flow Path 6 to the flow Path 7. Further, the carriage rotation cylinder arm 232a is moved to the extended condition in response to hydraulic fluid flowing from the flow Path 7 to the hydraulic line coupler 233a of the carriage rotation cylinder 230a through the flow Path 3, and the carriage rotation cylinder arm 232b is moved to the retracted condition in response to hydraulic fluid flowing from the flow Path 7 to the hydraulic line coupler 258b of the carriage rotation cylinder 230b through the flow Path 4. In this way, the carriage assembly 200 is rotated in the counterclockwise direction, as shown in FIG. 9e.

The carriage rotation cylinder arm 232a is moved to the retracted condition in response to hydraulic fluid flowing from the hydraulic line coupler 233a of the carriage rotation cylinder 230a through the flow Path 3 to the flow Path 7, and the carriage rotation cylinder arm 232b is moved to the extended condition in response to hydraulic fluid flowing from the hydraulic line coupler 258b of the carriage rotation cylinder 230b through the flow Path 4 to the flow Path 7. Further, the carriage rotation cylinder arm 232a is moved to the retracted condition in response to hydraulic fluid flowing to the hydraulic line coupler 258a of the carriage rotation cylinder 230a from the flow Path 7 through the flow Path 5, and the carriage rotation cylinder arm 232b is moved to the extended condition in response to hydraulic fluid flowing to the hydraulic line coupler 233b of the carriage rotation cylinder 230b from the flow Path 7 through the flow Path 6. In this way, the carriage assembly 200 is rotated in the clockwise direction, as shown in FIG. 9e.

The carriage rotation cylinders 230a and 230b are free to move between the extended and retracted positions in response to the movement of the control lever 370 to the first position. Hence, the carriage rotation cylinders 232a and 232b are free to move between the extended and retracted positions in response to the control lever 370 being in the first position. In this embodiment, the crop spraying apparatus 120 is capable of self-leveling in response to the control lever 370 being in the first position. The crop spraying apparatus 120 is capable of self-leveling when the carriage rotation cylinders 230a and 230b do not restrict the movement of the carriage assembly 200. When self-leveling, the carriage assembly 200 remains substantially horizontal while the prime mover 101 moves.

In a second mode of operation, and referring to FIG. 9h, the carriage rotation cylinder arms 232a and 232b are locked in response to moving the control lever 370 to a second position (FIG. 9h). In response to moving the control lever 370 to the second position, a second signal is flowed to the solenoid valve 369 through the control wire 372. In response to receiving the second signal, the solenoid valve 369 does not allow hydraulic fluid to flow through the flow Path 7 between the tee fittings 357 and 360. In this way, hydraulic fluid is restricted from flowing through the flow Paths 3, 4, 5 and 6, and carriage rotation cylinder arms 232a and 232b are locked in place. It should be noted that the second position can be a neutral position, and the second signal can be a neutral signal, if desired.

It should also be noted that the carriage rotation cylinders 230a and 230b can be locked so that their ability to move between their extended and retracted conditions is restricted. As mentioned above, there are several situations in which it is desirable to lock the carriage rotation cylinders 230a and 230b. For example, it is also useful to lock the carriage rotation cylinders when moving the booms 121a and 121b between the stowed and deployed positions. Locking the carriage rotation cylinders 230a and 230b is useful when turning the crop spraying vehicle 100. For example, the crop spraying vehicle 100 is often turned around when the end of a field is reached during spraying. It is also useful to lock the carriage rotation cylinders 230a and 230b when moving the crop spraying vehicle 100 on a public road so that the carriage assembly 200 does not rotate in the clockwise and counterclockwise directions. It is also desirable to lock the carriage rotation cylinders 230a and 230b when one boom is deployed and the other boom is stowed.

FIG. 9i is a perspective view of a portion of a hydraulic system 125a which is connected to the prime mover 101 hydraulic system and the carriage rotation cylinders 230a and 230b. It should be noted that the hydraulic system 125a can replace the hydraulic system 125, if desired.

In this embodiment, the prime mover 101 hydraulic system includes a prime mover hydraulic box 390, which includes hydraulic ports 391, 392, 393 and 394. The hydraulic line coupler 233a of the carriage rotation cylinder 230a is connected to a hydraulic line connector 384 through the hydraulic line 193b. The hydraulic line connector 384 is connected to the hydraulic port 392. The hydraulic line coupler 258a of the carriage rotation cylinder 230a is connected to a hydraulic line connector 385 through the hydraulic line 193a. The hydraulic line connector 385 is connected to the hydraulic port 392. The hydraulic line coupler 258b of the carriage rotation cylinder 230b is connected to a hydraulic line connector 386 through the hydraulic line 194a. The hydraulic line connector 386 is connected to the hydraulic port 393. The hydraulic line coupler 233b of the carriage rotation cylinder 230b is connected to a hydraulic line connector 387 through the hydraulic line 194b. The hydraulic line connector 387 is connected to the hydraulic port 394. It should also be noted that some of the connections shown in FIG. 9i are also shown in FIGS. 9e, 9f, 9g, 9h, and 9k.

In operation, the carriage rotation cylinder arm 232a is moved to the extended condition in response to hydraulic fluid flowing from the hydraulic port 391 to the hydraulic line coupler 233a of the carriage rotation cylinder 230a through the hydraulic line 193b and hydraulic line connector 384, and in response to hydraulic fluid flowing from the hydraulic line coupler 258a of the carriage rotation cylinder 230a to the hydraulic port 392 through the hydraulic line 193a and hydraulic line connector 385.

In operation, the carriage rotation cylinder arm 232a is moved to the retracted condition in response to hydraulic fluid flowing from the hydraulic line coupler 233a of the carriage rotation cylinder 230a to the hydraulic port 391 through the hydraulic line 193b and hydraulic line connector 384, and in response to hydraulic fluid flowing from the hydraulic port 392 to the hydraulic line coupler 258a of the carriage rotation cylinder 230a through the hydraulic line 193a and hydraulic line connector 385.

In operation, the carriage rotation cylinder arm 232b is moved to the extended condition in response to hydraulic fluid flowing from the hydraulic port 394 to the hydraulic line coupler 233b of the carriage rotation cylinder 230b through the hydraulic line 194b and hydraulic line connector 387, and in response to hydraulic fluid flowing from the hydraulic line coupler 258b of the carriage rotation cylinder 230b to the hydraulic port 393 through the hydraulic line 194a and hydraulic line connector 386.

In operation, the carriage rotation cylinder arm 232b is moved to the retracted condition in response to hydraulic fluid flowing from the hydraulic line coupler 233b of the carriage rotation cylinder 230b to the hydraulic port 394 through the hydraulic line 194b and hydraulic line connector 387, and in response to hydraulic fluid flowing from the hydraulic port 393 to the hydraulic line coupler 258b of the carriage rotation cylinder 230b through the hydraulic line 194a and hydraulic line connector 386.

The hydraulic system 125a is useful for several reasons. For example, the prime mover hydraulic box 390 provides hydraulic pressure, which allows the booms 121a and 121b to be repeatably moved between the stowed and deployed positions. The prime mover hydraulic box 390 allows the carriage assembly 200 to be hydraulically tilted and locked into a desired position, such as level. The prime mover hydraulic box 390 allows the carriage assembly 200 to float and self-level, as described in more detail above.

FIG. 9j is a perspective view of a hydraulic system 125b, which is connected to the prime mover 101 hydraulic system and the boom fold hydraulic cylinders 270 and 290. It should be noted that the hydraulic system 125b can be used with the hydraulic system 125, if desired.

In this embodiment, the prime mover 101 hydraulic system includes a prime mover hydraulic box 395, which includes hydraulic ports 396, 397, 398 and 399. The hydraulic line coupler 268a of the boom fold cylinder 270 is connected to a hydraulic line connector 374 through a hydraulic line 195a. The hydraulic line connector 374 is connected to the hydraulic port 396. The hydraulic line coupler 268b of the boom fold cylinder 270 is connected to a hydraulic line connector 375 through a hydraulic line 195b. The hydraulic line connector 375 is connected to the hydraulic port 397. The hydraulic line coupler 288b of the boom fold cylinder 290 is connected to a hydraulic line connector 376 through a hydraulic line 196b. The hydraulic line connector 376 is connected to the hydraulic port 398. The hydraulic line coupler 288a of the boom fold cylinder 290 is connected to the hydraulic line connector 377 through a hydraulic line 196a. The hydraulic line connector 377 connected to the hydraulic port 399. It should be noted that some of the connections shown in FIG. 9j are also shown in FIGS. 7a and 8a.

In operation, the boom fold cylinder arm 273 is moved to the extended condition in response to hydraulic fluid flowing from the hydraulic poet 396 to the hydraulic line coupler 268a of the boom fold cylinder 270 through the hydraulic line 195a and hydraulic line connector 374, and in response to hydraulic fluid flowing from the hydraulic line coupler 268b of the boom fold cylinder 270 to the hydraulic port 397 through the hydraulic line 195b and hydraulic line connector 375.

In operation, the boom fold cylinder arm 273 is moved to the retracted condition in response to hydraulic fluid flowing from the hydraulic line coupler 268a of the boom fold cylinder 270 to the hydraulic port 396 through the hydraulic line 195a and hydraulic line connector 374, and in response to hydraulic fluid flowing from the hydraulic port 397 to the hydraulic line coupler 268b of the boom fold cylinder 270 through the hydraulic line 195b and hydraulic line connector 375.

In operation, the boom fold cylinder arm 293 is moved to the extended condition in response to hydraulic fluid flowing from the hydraulic port 399 to the hydraulic line coupler 288a of the boom fold cylinder 290 through the hydraulic line 196a and hydraulic line connector 377, and in response to hydraulic fluid flowing from the hydraulic line coupler 288b of the boom fold cylinder 290 to the hydraulic port 398 through the hydraulic line 196b and hydraulic line connector 376.

In operation, the boom fold cylinder arm 293 is moved to the retracted condition in response to hydraulic fluid flowing from the hydraulic line coupler 288a of the boom fold cylinder 290 to the hydraulic port 399 through the hydraulic line 196a and hydraulic line connector 377, and in response to hydraulic fluid flowing from the hydraulic port 398 to the hydraulic line coupler 288b of the boom fold cylinder 290 through the hydraulic line 196b and hydraulic line connector 376.

Figure 9K:
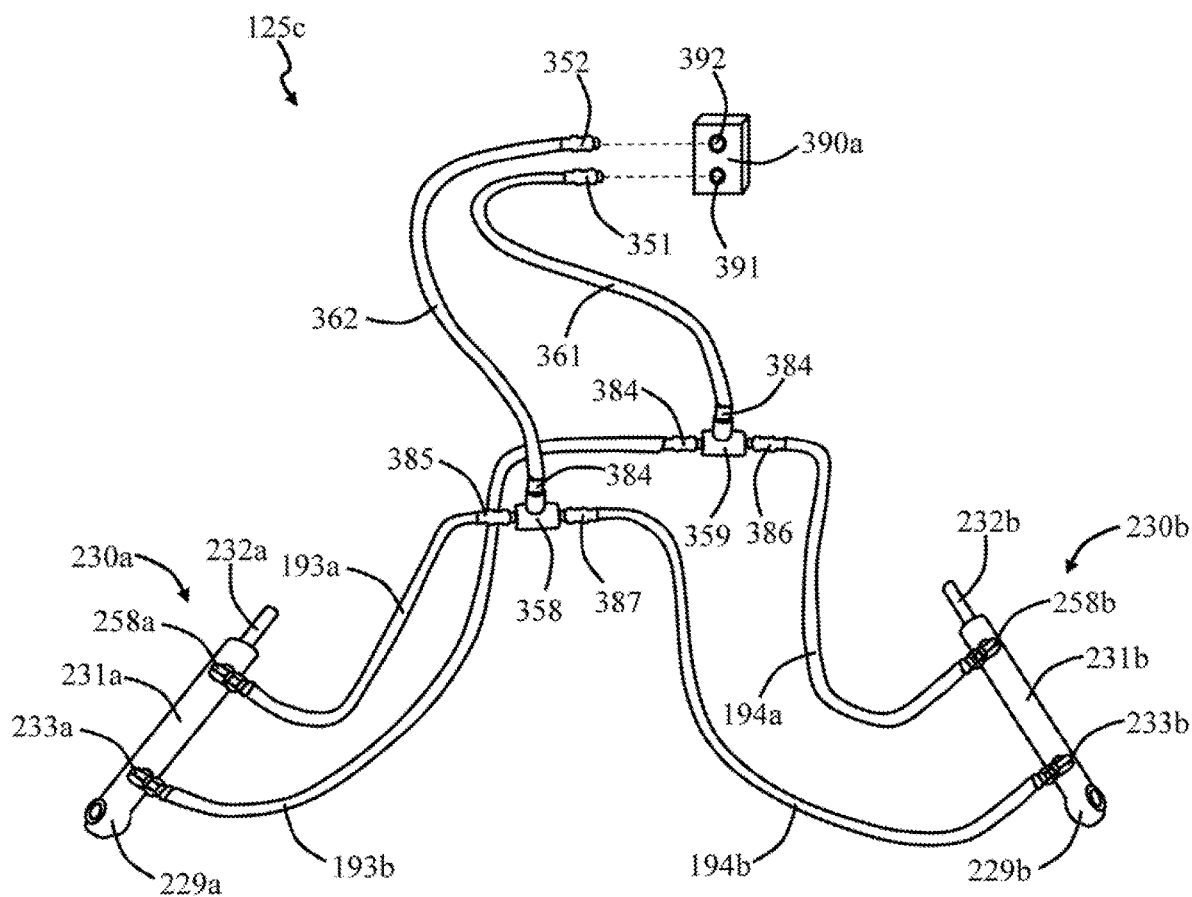
FIG. 9k is a perspective view of an alternative embodiment of a portion of the hydraulic system of FIG. 9h, which is connected to the prime mover hydraulic system and the first and second carriage rotation cylinders.

FIG. 9k is a perspective view of a portion of a hydraulic system 125c which is connected to the prime mover 101 hydraulic system and the carriage rotation cylinders 230a and 230b. It should be noted that the hydraulic system 125c can replace the hydraulic system 125, if desired.

In this embodiment, the prime mover 101 hydraulic system includes a prime mover hydraulic box 390a, which includes the hydraulic ports 391 and 392. The hydraulic line coupler 233a of the carriage rotation cylinder 230a is connected to the hydraulic line connector 384 through the hydraulic line 193b. The hydraulic line connector 384 is connected to one of the opposed flow paths of the tee fitting 359. The hydraulic line coupler 258a of the carriage rotation cylinder 230a is connected to the hydraulic line connector 385 through the hydraulic line 193a. The hydraulic line connector 385 is connected to one of the opposed flow paths of the tee fitting 358. The hydraulic line coupler 258b of the carriage rotation cylinder 230b is connected to the hydraulic line connector 386 through the hydraulic line 194a. The hydraulic line connector 386 is connected to the other opposed flow path of the tee fitting 359. The hydraulic line coupler 233b of the carriage rotation cylinder 230b is connected to the hydraulic line connector 387 through the hydraulic line 194b. The hydraulic line connector 387 is connected to the other opposed flow path of the tee fitting 358.

The hydraulic line 362 is connected to the center flow path of the tee fitting 358 at one end, and the hydraulic line 362 is connected to the connector 352 at an opposed end. The connector 352 is repeatably moveable between connected and unconnected conditions with the hydraulic port 392. The hydraulic line 361 is connected to the center flow path of the tee fitting 359 at one end, and the hydraulic line 361 is connected to the connecter 351 at an opposed end. The connector 351 is repeatably moveable between connected and unconnected conditions with the hydraulic port 391.

It should be noted that the connector 352 is repeatably moveable between connected and unconnected conditions with the hydraulic port 391. Further it should be noted that the connector 321 is repeatably moveable between connected and unconnected conditions with the hydraulic port 392. In general, the connector 351 is connected to one of the ports 391 and 392, and the connector 352 is connected to the other of the ports 391 and 392. It should also be noted that some of the connections shown in FIG. 9k are also shown in FIGS. 9e, 9f, 9g, 9h, and 9i.

In operation, the carriage rotation cylinder arm 232a is moved to the extended condition in response to hydraulic fluid flowing from the hydraulic port 391 to the hydraulic line coupler 233a of the carriage rotation cylinder 230a through the hydraulic line 193b and hydraulic line connector 384, and in response to hydraulic fluid flowing from the hydraulic line coupler 258a of the carriage rotation cylinder 230a to the hydraulic port 392 through the hydraulic line 193a and hydraulic line connector 385.

In operation, the carriage rotation cylinder arm 232a is moved to the retracted condition in response to hydraulic fluid flowing from the hydraulic line coupler 233a of the carriage rotation cylinder 230a to the hydraulic port 391 through the hydraulic line 193b and hydraulic line connector 384, and in response to hydraulic fluid flowing from the hydraulic port 392 to the hydraulic line coupler 258a of the carriage rotation cylinder 230a through the hydraulic line 193a and hydraulic line connector 385.

In operation, the carriage rotation cylinder arm 232b is moved to the extended condition in response to hydraulic fluid flowing from the hydraulic port 392 to the hydraulic line coupler 233b of the carriage rotation cylinder 230b through the hydraulic line 194b and hydraulic line connector 387, and in response to hydraulic fluid flowing from the hydraulic line coupler 258b of the carriage rotation cylinder 230b to the hydraulic port 391 through the hydraulic line 194a and hydraulic line connector 386.

In operation, the carriage rotation cylinder arm 232b is moved to the retracted condition in response to hydraulic fluid flowing from the hydraulic line coupler 233b of the carriage rotation cylinder 230b to the hydraulic port 392 through the hydraulic line 194b and hydraulic line connector 387, and in response to hydraulic fluid flowing from the hydraulic port 391 to the hydraulic line coupler 258b of the carriage rotation cylinder 230b through the hydraulic line 194a and hydraulic line connector 386.

The hydraulic system 125c is useful for several reasons. For example, the prime mover hydraulic box 390a provides hydraulic pressure, which allows the booms 121a and 121b to be repeatably moved between the stowed and deployed positions. The prime mover hydraulic box 390a allows the carriage assembly 200 to be hydraulically tilted and locked into a desired position, such as level. The prime mover hydraulic box 390a allows the carriage assembly 200 to float and self-level, as described in more detail above.

Figure 10A:
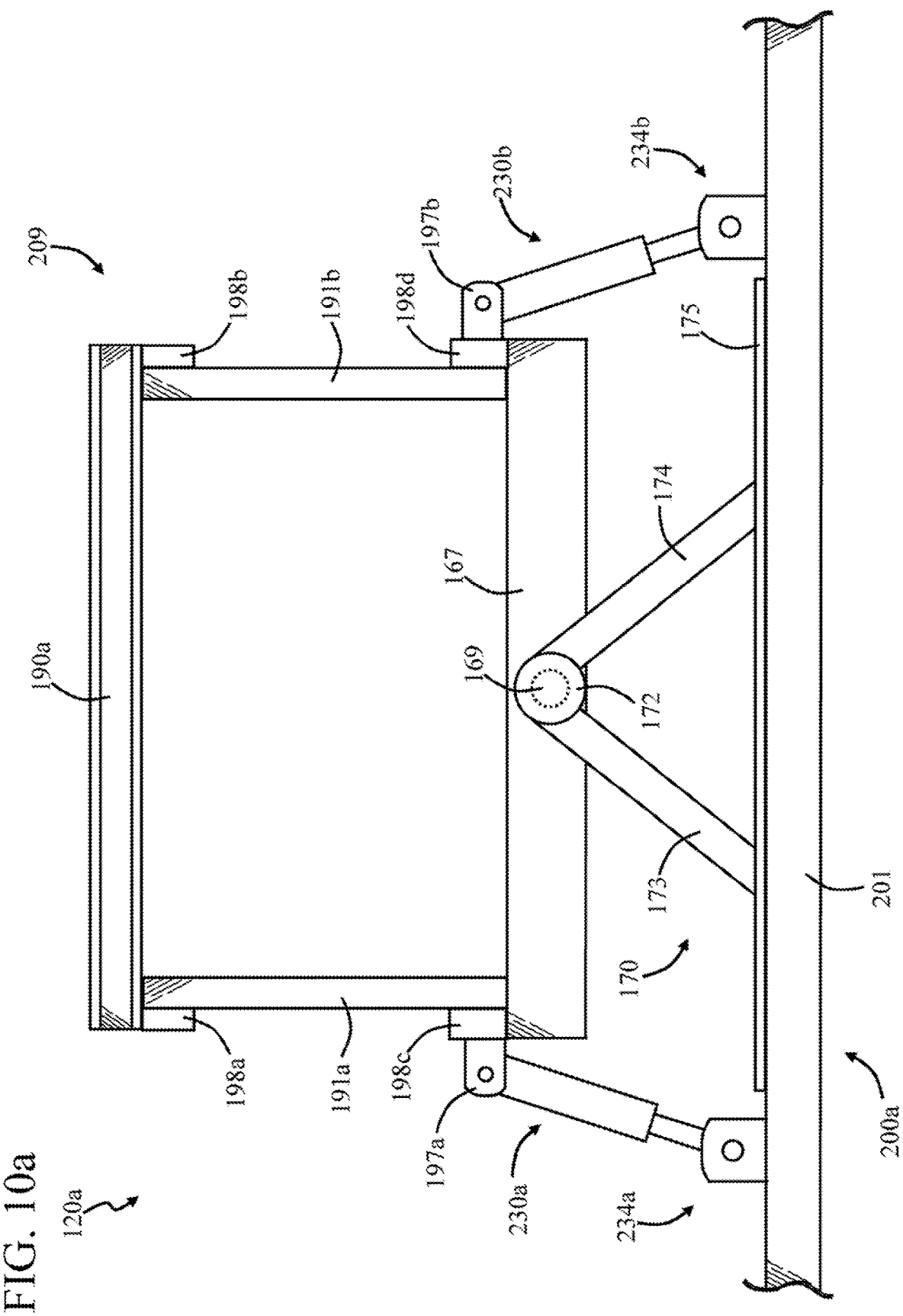
FIGS. 10a and 10b are opposed side views of embodiment of a mastless crop spraying apparatus.
Figure 10B:
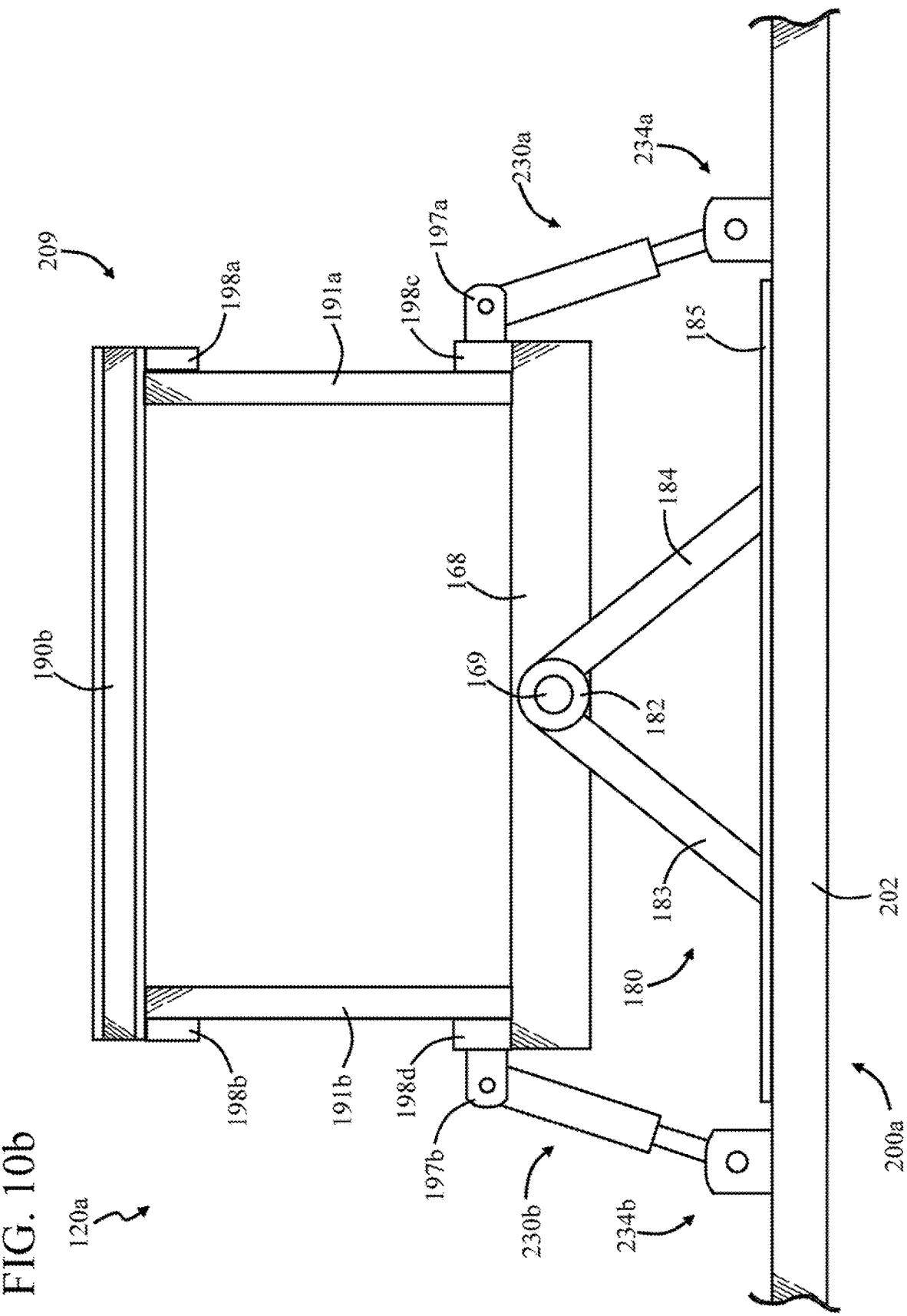
Figure 10D:
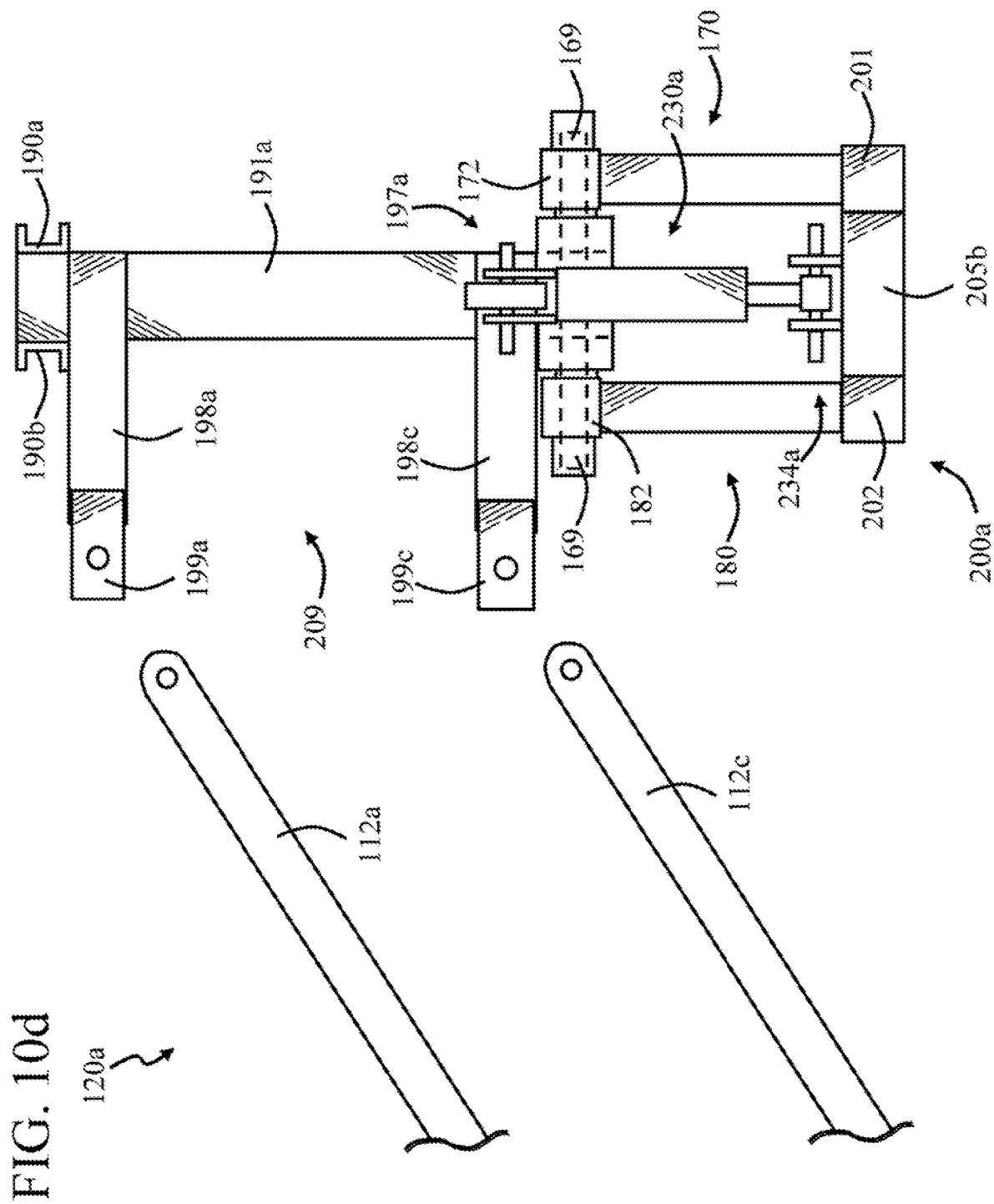
Figure 10E:
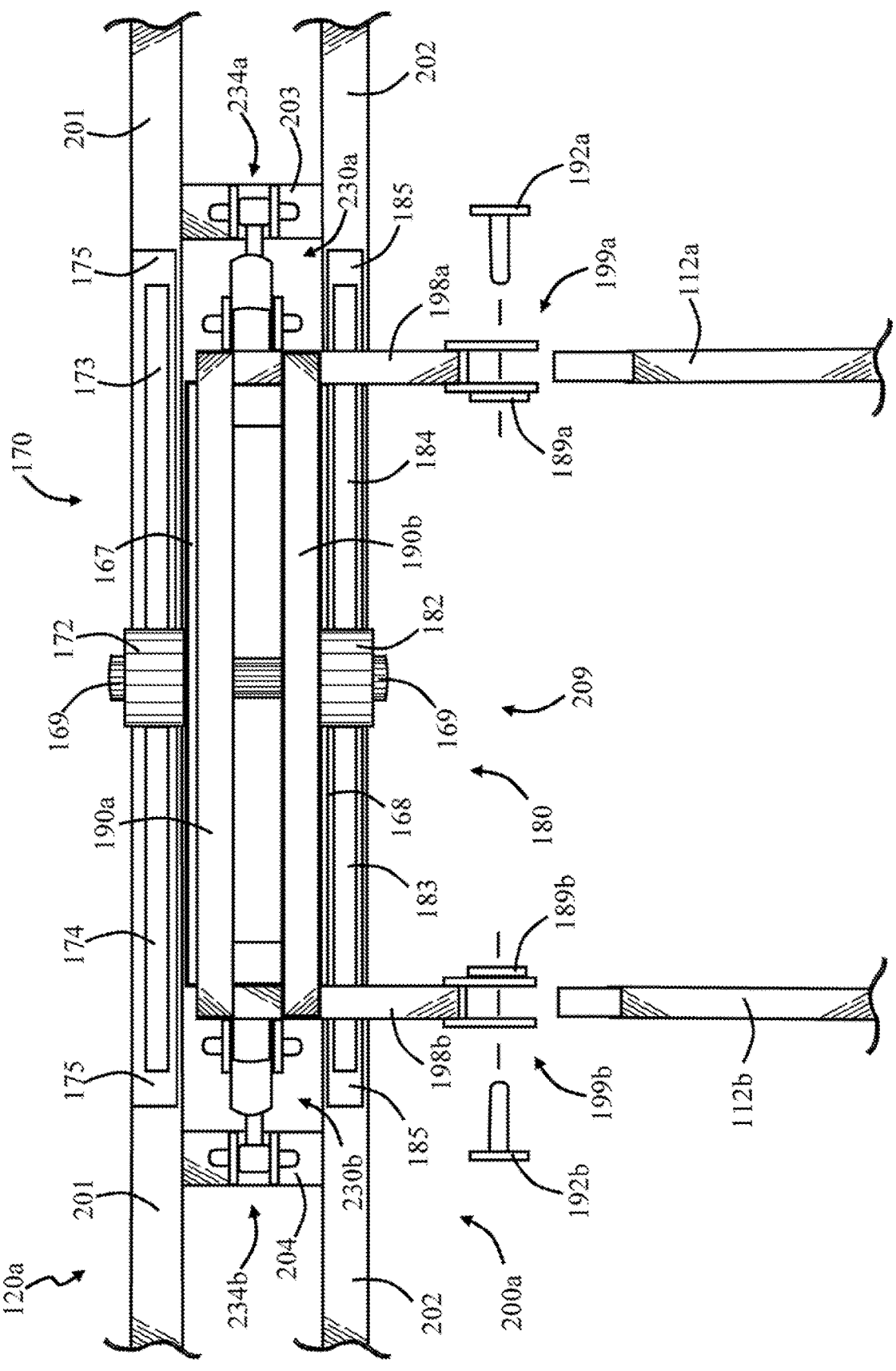
FIG. 10e is a top view of the mastless crop spraying apparatus of FIGS. 10a and 10b.

FIGS. 10a and 10b are opposed back and front side views, respectively, of another embodiment of a crop spraying apparatus 120a. FIGS. 10c and 10d are opposed side views of the embodiment of the crop spraying apparatus 120a of FIGS. 10a and 10b. FIG. 10e is a top view of the crop spraying apparatus 120a of FIGS. 10a and 10b.

In this embodiment the crop spraying apparatus 120a includes a carriage assembly 200a. It should be noted that the carriage assembly 200a can be the same as the carriage assembly 200, which is described in more detail above. The carriage assembly 200a includes lengthened carriage frame members 201 (FIG. 10a) and 202 (FIG. 10b), which are coupled together with shortened frame members 205b (FIG. 10d) and 206b (FIG. 10c). The lengthened carriage frame members 201 and 202 are spaced apart from each other with the carriage frame spacers 203 and 204 (FIG. 10e). It should be noted that the shortened frame members 205b and 206b are positioned at opposed distal ends of the carriage assembly 200a.

In this embodiment, the crop spraying apparatus 120a includes the rearward and forward pendulum assemblies 170 (FIG. 10a) and 180 (FIG. 10b), which are coupled to the carriage assembly 200a, as discussed in more detail above with FIGS. 3d and 3e. In particular, the rearward and forward pendulum assemblies 170 and 180 are coupled to the lengthened carriage frame members 201 and 202, respectively, as described in more detail above with FIGS. 9e, 9f and 9g.

In this embodiment, the crop spraying apparatus 120a includes a carriage assembly support frame 209, which carries the carriage assembly 200a. The carriage assembly support frame 209 includes opposed rearward and forward pendulum arm frame members 167 (FIG. 10a) and 168 (FIG. 10b). The pendulum arm 169 extends therethrough the opposed rearward and forward pendulum arm frame members 167 and 168. The rearward and forward pendulum assemblies 170 and 180 are coupled to opposed ends of the pendulum arm 169, as described in more detail above.

In this embodiment, the carriage assembly support frame 209 includes opposed shortened cross frame members 198c and 198d (FIGS. 10a-10d), which are coupled to the opposed rearward and forward pendulum arm frame members 167 and 168. The carriage assembly support frame 209 includes an upright frame member 191a (FIGS. 10a, 10b and 10d) coupled to the shortened cross frame member 198c proximate to the rearward pendulum frame member 167. The carriage assembly support frame 209 includes an opposed upright frame member 191b (FIGS. 10a, 10c and 10d) coupled to the shortened cross frame member 198d proximate to the rearward pendulum arm frame member 167.

In this embodiment, the carriage assembly support frame 209 includes a lengthened cross frame members 190a and 190b (FIGS. 10a, 10b and 10e) coupled to opposed shortened cross frame members 198a and 198b. The upright frame member 191a is coupled to the shortened cross frame member 198a proximate to the lengthened cross frame members 190a and 190b. The upright frame member 191b is coupled to the shortened cross frame member 198b proximate to the lengthened cross frame members 190a and 190b. In this way, the lengthened cross frame members 190a and 190b are spaced from the rearward and forward pendulum arm frame members 167 and 168 by the upright frame members 191a and 191b. Further, the shortened cross frame members 198a and 198b are spaced from the shortened cross frame members 198c and 198d, respectively, by the upright frame members 191a and 191b. It should be noted that the lengthened cross fame members 190a and 190b are embodied as c-channel pieces. However, the lengthened cross fame members 190a and 190b can be embodied as other pieces, such as channel iron, angle iron, and flat stock material, among others.

In this embodiment, the carriage assembly 200a includes brackets 199a and 199b (FIGS. 10c-10e), which are coupled to the shortened cross frame members 198a and 198b, respectively. Further, the carriage assembly 200a includes brackets 199c (FIG. 10d) and 199d (FIG. 10c), which are coupled to the shortened cross frame members 198c and 198d, respectively. The brackets 199a and 199b are coupled to the hitch lifting arms 112a and 112b, respectively (FIG. 10e). Further, the brackets 199c and 199d are coupled to hitch lifting arms 112c (FIG. 10d) and 112d (FIG. 10c), respectively.

It should be noted that, in some embodiments, the hitch lifting arms 112c and 112d are coupled to the prime mover 101, such as by using the top link coupling 111. In other embodiments, hitch lifting arms 112c and 112d are coupled to the hitch lifting arms 112a and 112b, respectively. It should be noted that the hitch lifting arms 112a, 112b, 112c, and 112d are coupled to the prime mover 101.

In this embodiment, the carriage assembly 200a includes the carriage rotation cylinder brackets 234a (FIGS. 10a and 10d) and 234b (FIGS. 10a and 10c), which are carried by the carriage frame spacers 203 and 204 (FIG. 10e), respectively. Further, the crop spraying apparatus 120a includes the brackets 197a and 197b (FIGS. 10a-10e), which are coupled to the upright frame members 191a and 191b, respectively. The carriage assembly 200a includes the carriage rotation cylinder 230a coupled between the carriage rotation cylinder bracket 234a and bracket 197a (FIGS. 10a, 10b, 10d and 10e). The carriage assembly 200a includes the carriage rotation cylinder 230b coupled between the carriage rotation cylinder bracket 234b and bracket 197b (FIGS. 10a, 10b, 10c and 10e). As discussed in more detail above, the carriage rotation cylinders 230a and 230b are repeatably moveable between extended and retracted conditions. It should be noted that the carriage rotation cylinders 230a and 230b are hydraulically coupled to a hydraulic system, such as those discussed in more detail above.

The carriage assembly 200a is rotatable relative to the pendulum arm 169. In this embodiment, the carriage rotation cylinder 230a moves to the retracted condition, and the carriage rotation cylinder 230b moves to the extended condition in response to the carriage frame spacers 203 and 204 moving upwardly and downwardly, respectively. Further, the carriage rotation cylinder 230a moves to the extended condition, and the carriage rotation cylinder 230b moves to the retracted condition in response to the carriage frame spacers 203 and 204 moving downwardly and upwardly, respectively. In this way, the carriage assembly 200a is rotatably relative to the pendulum arm 169. It should be noted that the carriage rotation cylinders 230a and 230b can be locked so that their ability to move between their extended and retracted conditions is restricted. The locking the carriage rotation cylinders 230a and 230b is useful in some situations, such as when turning the crop spraying vehicle 100. For example, the crop spraying vehicle 100 is often turned around when the end of a field is reached during spraying. It is also useful to lock the carriage rotation cylinders 230a and 230b when moving the crop spraying vehicle 100 on a public road.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A self-leveling apparatus, comprising:
   a mast assembly configured to be coupled to a vehicle, the mast assembly comprising at least one mast;
   a carriage assembly coupled to the at least one mast;
   a first pivot coupled to the carriage assembly;
   a second pivot coupled to the carriage assembly, wherein the first pivot is disposed forward of the at least one mast and the second pivot is disposed rearward of the at least one mast, relative to a direction of travel of the vehicle, wherein the second pivot is coaxial with the first pivot along a longitudinal axis that is parallel to the direction of travel of the vehicle;
   a first support arm having opposed first and second ends, the first end thereof being hingedly coupled to the first pivot;
   a second support arm having opposed first and second ends, the first end thereof being hingedly coupled to the second pivot, wherein the first support arm and the second support arm pendulate about the longitudinal axis of the first and second pivots; and
   a hoist apparatus coupled between the mast assembly and the carriage assembly, wherein the carriage assembly, first and second support arms, and first and second pivots are raised and lowered, relative to the mast assembly, in response to operation of the hoist apparatus.

2. The self-leveling apparatus of claim 1, wherein the carriage assembly comprises:
   an elongate carriage frame having opposed left and right ends and extending along an axis that is transverse to the direction of travel of the vehicle;
   a left boom coupled to the left end of the carriage frame; and
   a right boom coupled to the right end of the carriage frame, wherein each of the left boom and the right boom is movable between a stowed configuration and a deployed configuration.

3. The self-leveling apparatus of claim 1, further comprising at least one hydraulic cylinder coupled between the mast assembly and the carriage assembly, wherein the at least one hydraulic cylinder is extended in response to pendulation of the carriage assembly about the longitudinal axis of the first and second pivots in a first direction and the at least one hydraulic cylinder is retracted in response to pendulation of the carriage assembly about the longitudinal axis of the first and second pivots in a second direction, wherein pendulation of the carriage assembly about the longitudinal axis of the first and second pivots is dampened by the at least one hydraulic cylinder.

4. The self-leveling apparatus of claim 3, further comprising:
   at least one hydraulic line coupled to and in fluid communication with an interior volume of the at least one hydraulic cylinder, wherein fluid flows between the hydraulic line and the interior volume of the at least one hydraulic cylinder in response to expansion or retraction of the at least one hydraulic cylinder; and
   at least one valve coupled to the at least one hydraulic line, wherein fluid flow between the hydraulic line and the interior volume of the at least one hydraulic cylinder is prevented, and pendulation of the carriage assembly about the longitudinal axis of the first and second pivots is prevented, while the at least one valve is closed.

5. The self-leveling apparatus of claim 4, further comprising a hoist apparatus coupled between the mast assembly and the carriage assembly, wherein the carriage assembly, first and second support arms, and first and second pivots are raised and lowered, relative to the mast assembly, in response to operation of the hoist apparatus.

6. A self-leveling apparatus, comprising:
   a carriage assembly configured to be coupled to a vehicle;
   a first pivot coupled to the carriage assembly;
   a second pivot coupled to the carriage assembly, wherein the first pivot is disposed forward of the second pivot, wherein, relative to a direction of travel of the vehicle, the second pivot is coaxial with the first pivot along a longitudinal axis that is parallel to the direction of travel of the vehicle;
   a first support arm having opposed first and second ends, the first end thereof being hingedly coupled to the first pivot;
   a second support arm having opposed first and second ends, the first end thereof being hingedly coupled to the second pivot, wherein the first support arm and the second support arm pendulate about the longitudinal axis of the first and second pivots; and
   a hoist apparatus coupled to the carriage assembly, wherein the carriage assembly, first and second support arms, and first and second pivots are raised and lowered, relative to the vehicle, in response to operation of the hoist apparatus.

7. The self-leveling apparatus of claim 6, wherein the carriage assembly, first and second support arms, and first and second pivots are configured to raise and lower relative to the vehicle.

8. The self-leveling apparatus of claim 6, wherein the carriage assembly comprises:
   an elongate carriage frame having opposed left and right ends and extending along an axis that is transverse to the direction of travel of the vehicle;
   a left boom coupled to the left end of the carriage frame; and
   a right boom coupled to the right end of the carriage frame, wherein each of the left boom and the right boom is movable between a stowed configuration and a deployed configuration.

9. The self-leveling apparatus of claim 6, further comprising at least one hydraulic cylinder coupled to the carriage assembly, wherein the at least one hydraulic cylinder is extended in response to pendulation of the carriage assembly about the longitudinal axis of the first and second pivots in a first direction and the at least one hydraulic cylinder is retracted in response to pendulation of the carriage assembly about the longitudinal axis of the first and second pivots in a second direction, wherein pendulation of the carriage assembly about the longitudinal axis of the first and second pivots is dampened by the at least one hydraulic cylinder.

10. The self-leveling apparatus of claim 9, further comprising:
   at least one hydraulic line coupled to and in fluid communication with an interior volume of the at least one hydraulic cylinder, wherein fluid flows between the hydraulic line and the interior volume of the at least one hydraulic cylinder in response to expansion or retraction of the at least one hydraulic cylinder; and
   at least one valve coupled to the at least one hydraulic line, wherein fluid flow between the hydraulic line and the interior volume of the at least one hydraulic cylinder is prevented, and pendulation of the carriage assembly about the longitudinal axis of the first and second pivots is prevented, while the at least one valve is closed.

* * * * *